& # x20;

United States Patent
Matsuura et al.

(10) Patent No.: US 7,792,637 B2
(45) Date of Patent: Sep. 7, 2010

(54) VISITING PLACE IDENTIFICATION DEVICE AND VISITING PLACE IDENTIFICATION METHOD

(75) Inventors: Satoshi Matsuura, Kyotanabe (JP); Takahiro Kudo, Katano (JP); Jun Ozawa, Nara (JP); Mototaka Yoshioka, Moriguchi (JP)

(73) Assignee: Panasonic Corporation, Osaka (JP)

( * ) Notice: Subject to any disclaimer, the term of this patent is extended or adjusted under 35 U.S.C. 154(b) by 1434 days.

(21) Appl. No.: 10/544,489

(22) PCT Filed: Aug. 23, 2004

(86) PCT No.: PCT/JP2004/012414
§ 371 (c)(1),
(2), (4) Date: Aug. 4, 2005

(87) PCT Pub. No.: WO2005/024688
PCT Pub. Date: Mar. 17, 2005

(65) Prior Publication Data
US 2006/0149684 A1   Jul. 6, 2006

(30) Foreign Application Priority Data
Sep. 5, 2003   (JP) ............................. 2003-314531

(51) Int. Cl.
*G01C 21/00* (2006.01)

(52) U.S. Cl. ...................... 701/207; 701/209; 701/211

(58) Field of Classification Search .............. 701/208, 701/214, 300
See application file for complete search history.

(56) References Cited

U.S. PATENT DOCUMENTS

| | | | |
|---|---|---|---|
| 6,657,666 B1 | 12/2003 | Imagawa et al. | |
| 6,721,633 B2 * | 4/2004 | Funk et al. | 701/1 |
| 7,130,743 B2 * | 10/2006 | Kudo et al. | 701/209 |
| 7,379,812 B2 * | 5/2008 | Yoshioka et al. | 701/208 |
| 7,536,258 B2 * | 5/2009 | Kudo et al. | 701/209 |
| 2002/0120516 A1 | 8/2002 | Sakagami et al. | |
| 2002/0161517 A1 * | 10/2002 | Yano et al. | 701/209 |
| 2008/0262667 A1 * | 10/2008 | Otabe | 701/22 |
| 2009/0105934 A1 * | 4/2009 | Tajima et al. | 701/118 |

FOREIGN PATENT DOCUMENTS

| | | |
|---|---|---|
| JP | 11-015876 | 1/1999 |
| JP | 11-132774 | 5/1999 |
| JP | 11-149596 | 6/1999 |
| JP | 2000-013722 | 1/2000 |
| JP | 2002-048572 | 2/2002 |
| JP | 2002-324079 | 11/2002 |
| JP | 2003-076818 | 3/2003 |
| JP | 2003-187276 | 7/2003 |
| JP | 2003-233752 | 8/2003 |

* cited by examiner

*Primary Examiner*—Khoi Tran
*Assistant Examiner*—Brian J Broadhead
(74) *Attorney, Agent, or Firm*—Wenderoth, Lind & Ponack, L.L.P.

(57) ABSTRACT

A current position determination unit determines a current position of a user; a facility candidate search unit specifies, as a candidate for a visited place, a facility that is located within a predetermined area including the current position determined by the current position determination unit; an electronic money unit and a payment amount calculation unit detect a payment amount of the user; and a most-likely visited facility identification unit identifies a most-likely visited place by selecting from a plurality of facilities a facility corresponding to the payment amount detected by the electronic money unit and the payment amount calculation unit, when the plurality of facilities are specified by the facility candidate search unit.

11 Claims, 40 Drawing Sheets

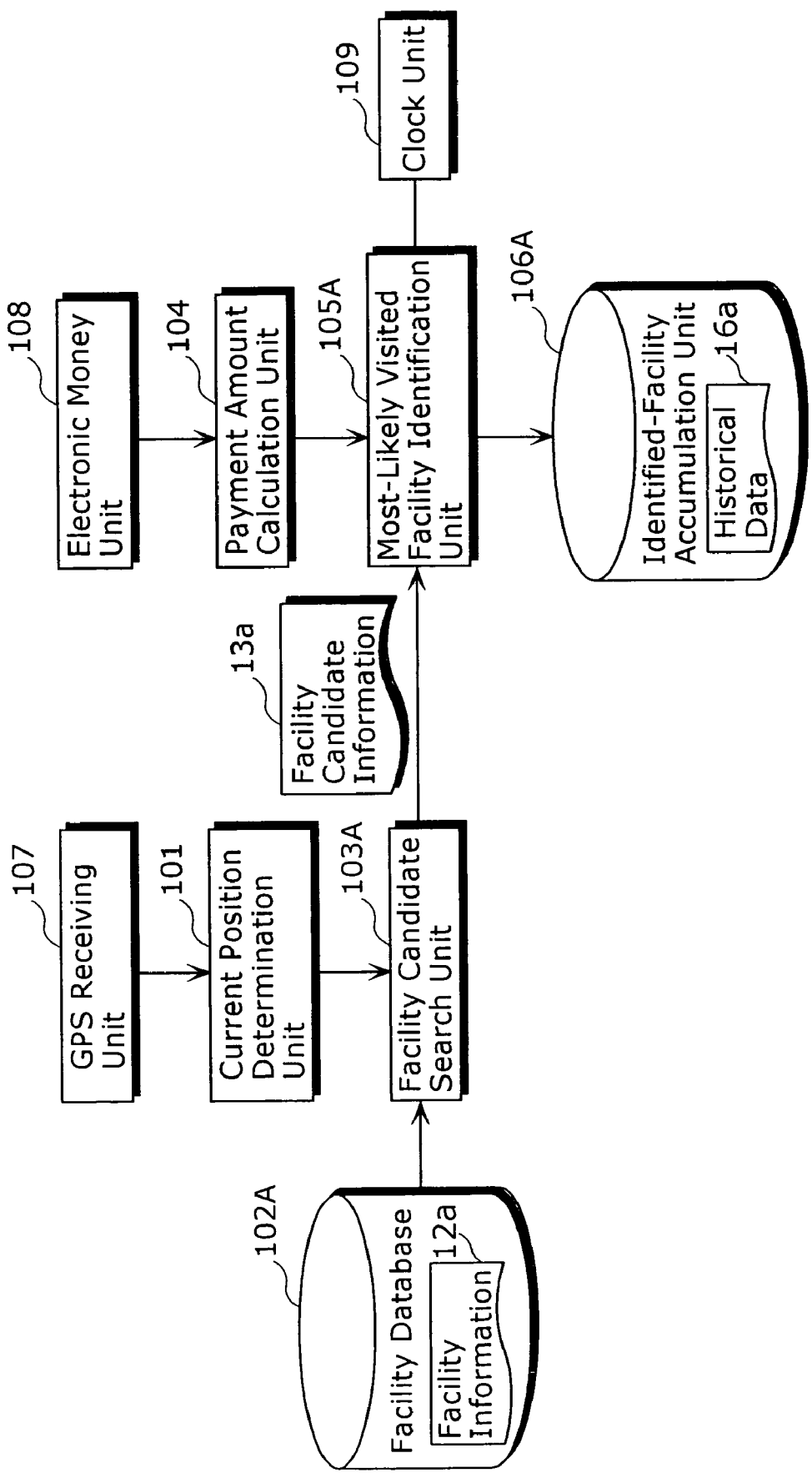

FIG. 2

| | A1 | A2 | A3 | A4 | A5 | A6 |
|---|---|---|---|---|---|---|
| | Position | Facility Identifier | Facility Name | Average Payment Amount (Morning) | Average Payment Amount (Afternoon) | Average Payment Amount (Night) |
| | LAT:1 N / LNG:1 E | Facility1 | Cutt Salon | 3900 yen | 3900 yen | 3900 yen |
| | LAT:2 N / LNG:2 E | Facility 2 | Legalo's Restaurante | 600 yen | 900 yen | 1500 yen |
| | LAT:3 N / LNG:3 E | Facility 3 | Bos Berger | 400 yen | 800 yen | 800 yen |
| | | Facility 4 | Citi Cinema | 1800 yen | 1800 yen | 1800 yen |
| | | Facility 5 | ConveniP-Mart | 300 yen | 600 yen | 1000 yen |
| | LAT:4 N / LNG:4 E | Facility 6 | Noodle Stand | — | 200 yen | 200 yen |
| | | Facility 7 | Botanic Garden | 100 yen | 100 yen | — |

| | | B3 | B4 | B5 |
|---|---|---|---|---|
| Facility Identifier | Facility Name | Average Payment Amount (Morning) | Average Payment Amount (Afternoon) | Average Payment Amount (Night) |
| Facility 2 | Legalo's Restaurante | 600 yen | 900 yen | 1500 yen |
| Facility 3 | Bos Berger | 400 yen | 800 yen | 800 yen |
| Facility 4 | Citi Cinema | 1800 yen | 1800 yen | 1800 yen |
| Facility 5 | ConveniP-Mart | 300 yen | 600 yen | 1000 yen |

| | C1 | C2 | C3 |
|---|---|---|---|
| | Date / Time | Payment Amount (Yen) | Facility Identifier |
| | April 6, 2003, 7:00 | 250 | Facility 5 |
| | April 6, 2003, 12:05 | 820 | Facility 3 |
| | April 6, 2003, 12:15 | 100 | Facility 7 |
| | April 6, 2003, 19:30 | 3200 | Facility 0 |
| | | | |

| D1 | D2 | D3 | D4 | D5 | D6 |
|---|---|---|---|---|---|
| Position | Facility Identifier | Facility Name | Average Stay Time (Morning) | Average Stay Time (Afternoon) | Average Stay Time (Night) |
| LAT:1 N / LNG:1 E | Facility 1 | Cutt Salon | 60 min | 60 min | 60 min |
| LAT:2 N / LNG:2 E | Facility 2 | Legalo's Restaurante | 30 min | 45 min | 90 min |
| LAT:3 N / LNG:3 E | Facility 3 | Bos Berger | 20 min | 30 min | 45 min |
| | Facility 4 | Citi Cinema | 120 min | 120 min | 120 min |
| | Facility 5 | ConveniP-Mart | 5 min | 10 min | 15 min |
| LAT:4 N / LNG:4 E | Facility 6 | Noodle Stand | — | 15 min | 15 min |
| | Facility 7 | Park | 30 min | 45 min | — |

| Facility Identifier | Facility Name | Average Stay Time (Morning) | Average Stay Time (Afternoon) | Average Stay Time (Night) |
|---|---|---|---|---|
| Facility 1 | Cutt Salon | 60 min | 60 min | 60 min |
| Facility 6 | Noodle Stand | — | 15 min | 15 min |
| Facility 7 | Park | 30 min | 45 min | — |

| | F1 | F2 | F3 |
|---|---|---|---|
| | Date / Time | Stay Time (min) | Facility Identifier |
| | April 6, 2003, 7:00 | 10 | Facility 5 |
| | April 6, 2003, 10:05 | 60 | Facility 1 |
| | April 6, 2003, 12:15 | 30 | Facility 3 |
| | April 6, 2003, 19:30 | 120 | Facility 4 |
| | ... | | |

| | Position | Facility Identifier | Facility Name | Facility Category |
|---|---|---|---|---|
| | LAT:1 N / LNG:1 E | Facility 1 | Cutt Salon | Barbershop/Beauty Salon |
| | LAT:2 N / LNG:2 E | Facility 2 | Legalo's Restaurante | Restaurant |
| | LAT:3 N / LNG:3 E | Facility 3 | Bos Berger | Fast food |
| | | Facility 4 | Citi Cinema | Movie Theater |
| | | Facility 5 | ConveniP-Mart | Convenience Store |
| | | Facility 6 | Noodle Stand | Fast food |
| | LAT:4 N / LNG:4 E | Facility 7 | Park | Recreation |

| H1 | H2 | H3 | H4 |
|---|---|---|---|
| Facility Category | Average Payment Amount (Morning) | Average Payment Amount (Afternoon) | Average Payment Amount (Night) |
| Restaurant | — | 1000 yen | 2000 yen |
| Fast food | 400 yen | 800 yen | — |
| Movie Theater | — | 1800 yen | 1800 yen |
| Convenience Store | 300 yen | 200 yen | 400 yen |
| Recreation | — | 1000 yen | 2000 yen |
| Barbershop/Beauty Salon | 3900 yen | 3900 yen | — |

| I1 | I2 | I3 |
|---|---|---|
| Facility Identifier | Facility Name | Facility Category |
| Facility 2 | Legalo's Restaurante | Restaurant |
| Facility 3 | Bos Berger | Fast food |
| Facility 4 | Citi Cinema | Movie Theater |
| Facility 5 | ConveniP-Mart | Convenience Store |

| Facility Category | Average Stay Time (Morning) | Average Stay Time (Afternoon) | Average Stay Time (Night) |
|---|---|---|---|
| Restaurant | — | 45 min | 90 min |
| Fast food | 30 min | 45 min | — |
| Movie Theater | — | 120 min | 120 min |
| Convenience Store | 5 min | 10 min | 20 min |
| Recreation | — | 60 min | 90 min |
| Barbershop/Beauty Salon | 60 min | 60 min | — |

FIG. 18

| K1 | K2 | K3 |
|---|---|---|
| Facility Identifier | Facility Name | Facility Category |
| Facility 1 | Cutt Salon | Barbershop/Beauty Salon |
| Facility 6 | Noodle Stand | Fast food |
| Facility 7 | Park | Recreation |

|  | Latitude | Longitude |
|---|---|---|
| Shop A | ... | ... |
| Shop B | ... | ... |
| Shop C | ... | ... |
| Shop D | ... | ... |
| Shop E | ... | ... |
| Shop F | ... | ... |
| Shop G | ... | ... |
| Shop H | ... | ... |
| ... | ... | ... |

| | Estimated Time Required to Get to Public Parking Lot | |
|---|---|---|
| Shop A | 10 min | ~2104b |
| Shop B | 15 min | |
| Shop C | 18 min | |
| Shop D | 10 min | |
| Shop E | 18 min | |
| Shop F | 15 min | |
| Shop G | 15 min | |
| Shop H | 10 min | |
| ... | ... | |

FIG. 33
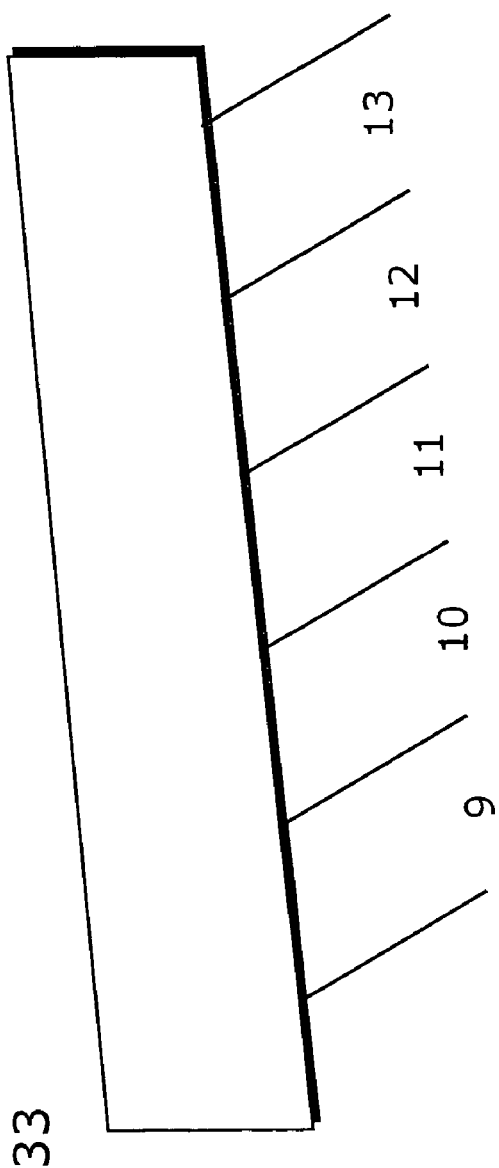
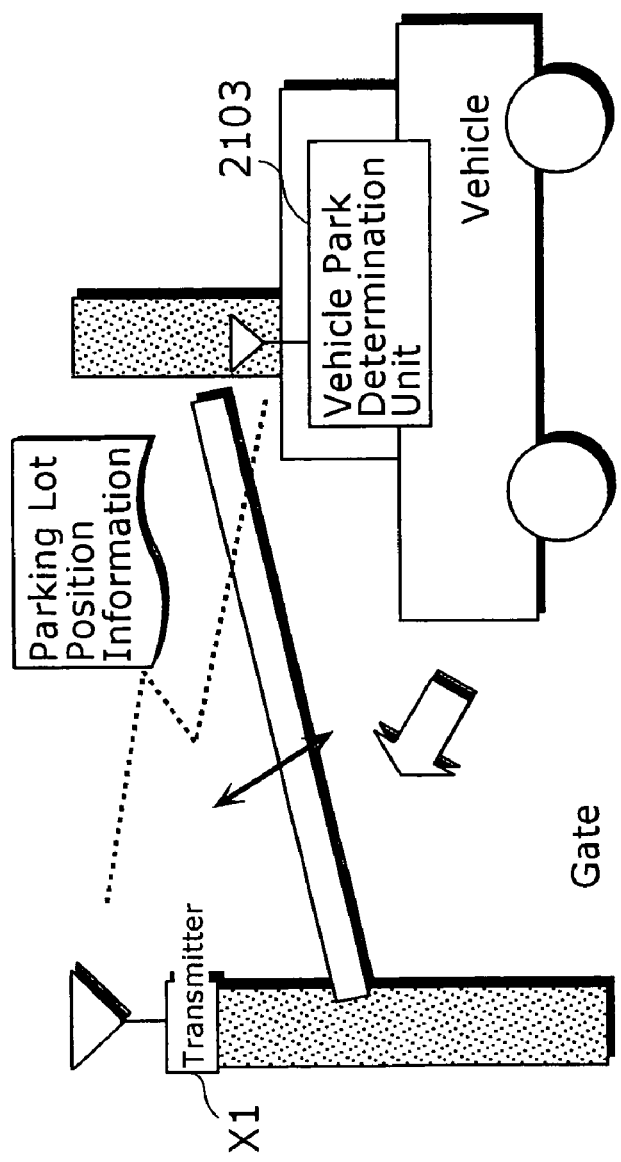

FIG. 37

| Facility | (LAT/LNG) | Key Word | URL |
|---|---|---|---|
| Restaurant 「GASTOM」 | (…,…) | Menu、Today's Specials、Hamburger Steak、Menu in Season…… | http:www.gustom.co.jp/menu.htm |
| CD Shop 「CD-top10」 | (…,…) | Top 10、The Best…… | http:www.cd_top10.co.jp/ |
| Movie Theater 「The movie」 | (…,…) | Top Movies、Approximate Run Time…… | http:www.movie.co.jp/ |
| Portable Phone Shop「UA」 | (…,…) | Portable phone、Special Offers、Price Plan…… | http:www.ua.co.jp/ |
| … | … | … | … |

2704a

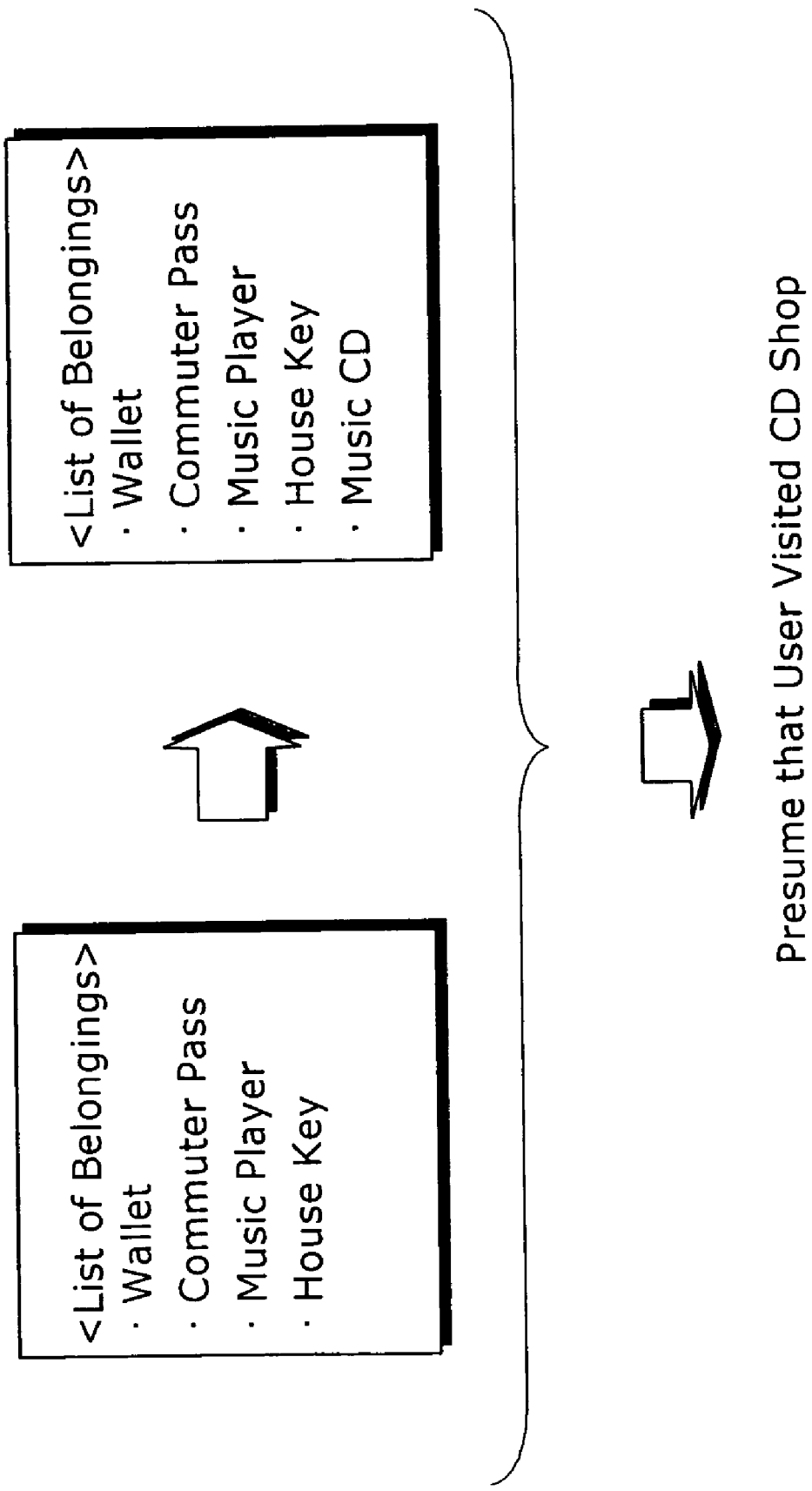

VISITING PLACE IDENTIFICATION DEVICE AND VISITING PLACE IDENTIFICATION METHOD

BACKGROUND OF THE INVENTION

1. Technical Field

The present invention relates to an apparatus and a method for identifying a place where a user has visited.

2. Background Art

In recent years, various mobile terminals have been utilized. These mobile terminals include a vehicle navigation apparatus that determines a user's position using the Global Positioning System (GPS) and guides the user to a destination, a portable telephone that provides a user with information regarding facilities in the vicinity of a user's current position using a positioning system with a base station, and the like.

Under such circumstances, technologies have been proposed for modeling the user's behavior and travel patterns, using a history of the position information obtained by such mobile terminals (for example, refer to Japanese Laid-Open Patent Application No. 11-149596 publication, FIG. 1).

The above patent document discloses that a vehicle-equipped information apparatus accumulates beforehand time-series information regarding a driver's driving history (such as visited places) determined by the GPS positioning, then presumes a place to which the user is supposed to get (a destination) based on the accumulated information, and provides the user with a name of the destination, an estimated time required to get there, and the like.

Besides the above patent document, another technology discloses that it determines a user's visiting place using a base station which a user's carrying PHS or portable telephone makes contact with, accumulates time-series information of the visited places, then presumes a likely destination of the user based on the accumulated information, and provides the user with information regarding the destination.

However, there is a problem: The base station of the portable telephone or PHS suffers from a positional error of several dozen meters even with the best accuracy for determining the visiting place so that it cannot pinpoint a specific facility where the user is visiting although it can determine an area in which the facility exists.

In the above patent document, the GPS accuracy is several meters so that the technology enables to determine the user's position more accurate than the technology using the portable telephone and PHS with the base station does. However, the problem still remains that it cannot pinpoint which facility the user is visiting, when the user visits a shopping mall that packs a plurality of facilities or a multi-tenant building that accommodates a plurality of independent shops.

Thus, the conventional mobile terminals cannot determine a user's visiting place with high accuracy so that it is impossible to model the user's behavior patterns, let alone presume the user's destination.

The present invention addresses the above problem and provides an apparatus and method for identifying a visited place in order to identify with high accuracy where the user has exactly visited.

SUMMARY OF INVENTION

The present invention accomplishes the above object by providing a visited-place identification apparatus for identifying a visited place of a user, including: a position determination unit operable to determine a position of the user; a candidate specification unit operable to specify, as a candidate for the visited place, a facility that is located within a predetermined area including the position determined by the position determination unit; a behavior detection unit operable to detect a behavior of the user; and a most-likely facility identification unit operable to identify a most-likely visited place by selecting from a plurality of facilities a facility corresponding to the behavior detected by the behavior detection unit, when the plurality of facilities are specified by the candidate specification unit. For example, the behavior detection unit is operable to detect a payment amount that the user has paid at the facility, and the most-likely facility identification unit is operable to identify the most-likely visited place by selecting from the plurality of facilities a facility corresponding to the payment amount detected by the behavior detection unit, when the plurality of facilities are specified by the candidate specification unit. Alternatively, the behavior detection unit is operable to detect stay time that is a time period the user spent at a facility, and the most-likely facility identification unit is operable to select, from the plurality of facilities, a facility corresponding to the stay time detected by the behavior detection unit, when the plurality of facilities are specified by the candidate specification unit.

Accordingly, the candidate specification unit chooses candidates for the visited place of the user, based on the position of the user determined by the position determination unit, and a facility corresponding the behavior detected by the behavior detection unit is identified as the most-likely visited place from a plurality of facilities when the plurality of facilities are chosen as the candidates so that it is possible to identify with high accuracy the user's visited place. For example, when the user visits a shopping mall that packs a plurality of facilities, a multi-tenant building that accommodates a plurality of independent shops, or the like, it is difficult to identify, based on only a user's current position determined by the GPS and the like, which facility the user has visited. However, it is possible even in such a case to identify accurately the visited facility, by detecting user's behavior, such as a payment amount and a stay time of the user.

Here, the visited-place identification apparatus may include a storage unit having an area for storing the information of facility identified by the most-likely facility identification unit, wherein the most-likely facility identification unit is operable to cause the storage unit to store, as a history, information of the facility that is identified as the most-likely visited place.

Accordingly, the storage unit stores the information of the identified visited place as a history, which enables to learn accurately the user's behavior patterns, so that it is possible to provide the user with useful information by presuming future behaviors of the user.

Further, the candidate specification unit may include: a facility information storage unit operable to previously store identification information for identifying the plurality of facilities, facility position information indicating positions of the respective facilities, and payment amount information regarding the payment amounts that are paid at the respective facilities; and a candidate extraction unit operable to search the facilities whose information are stored in the facility information storage unit for the facility whose position indicated in the facility position information is within the predetermined area including the position determined by the position determination unit, and to extract the identification information and the payment amount information of the searched facility, and the most-likely facility identification unit may be operable to select the identification information of the facility whose payment amount information corresponds to the payment amount detected by the behavior detection unit, when the identification information and the payment amount information regarding a plurality of facilities are extracted by the candidate extraction unit.

Accordingly, the candidate specification unit extracts the identification information and the payment amount information of the plurality of facilities, so that, even when the plurality of facilities are chosen as the candidates, the most-likely facility identification unit selects identification information of a facility corresponding to the payment amount of the user, which enables to identify with high accuracy the user's visited facility according to the user's payment behavior at each facility.

Still further, the candidate specification unit may include: a facility information storage unit operable to previously store identification information for identifying the plurality of facilities, facility position information indicating positions of the respective facilities, and categories of the respective facilities; and a candidate extraction unit operable to search the facilities whose information are stored in the facility information storage unit for the facility whose position indicated by the facility position information is within a predetermined area including the position determined by the position determination unit, and to extract the identification information and the category of the searched facility, and the most-likely facility identification unit may include: a category storage unit operable to previously store the categories of the plurality of facilities and category payment amount information regarding payment amounts that are paid at facilities belonging to the respective categories; a category extraction unit operable to extract, from the categories stored by the category storage unit, a category whose category payment amount information corresponds to the payment amount detected by the behavior detection unit; and a selection unit operable to select the identification information of a facility whose category corresponds to the category extracted by the category extraction unit, when the identification information and the categories of a plurality of facilities are extracted by the candidate extraction unit.

Accordingly, the candidate specification unit extracts the identification information and the categories of the plurality of facilities, so that, even when the plurality of facilities are chosen as the candidates, the most-likely facility identification unit selects identification information of a category corresponding to the payment amount of the user, which enables to identify with high accuracy, based on the category of the facility, the user's visited facility according to the user's payment behavior at each facility.

Here, the candidate specification unit may include: a facility information storage unit operable to previously store identification information for identifying the plurality of facilities, facility position information indicating positions of the respective facilities, and stay time information regarding stay time at the respective facilities; and a candidate extraction unit operable to search the facilities whose information are stored in the facility information storage unit for a facility whose position indicated in the facility position information is within a predetermined area including the position determined by the position determination unit, and to extract the identification information and the stay time information of the searched facility, and the most-likely facility identification unit may be operable to select the identification information of a facility whose stay time information corresponds to the stay time detected by the behavior detection unit, when the identification information and the stay time information of a plurality of facilities are extracted by the candidate extraction unit.

Accordingly, the candidate specification unit extracts the identification information and the stay time information of the plurality of facilities, so that, even when the plurality of facilities are chosen as the candidates, the most-likely facility identification unit selects identification information of a facility corresponding to the stay time of the user, which enables to identify with high accuracy the user's visited facility according to the user's stay behavior at each facility.

Still further, the candidate specification unit may include: a facility information storage unit operable to previously store identification information for identifying the plurality of facilities, facility position information indicating positions of the respective facilities, and categories of the respective facilities; and a candidate extraction unit operable to search the facilities whose information are stored in the facility information storage unit for a facility whose position indicated in the facility position information is within a predetermined area including the position determined by the position determination unit, and to extract the identification information and the category of the searched facility, and the most-likely facility identification unit may include: a category storage unit operable to previously store the categories of the plurality of facilities and category stay information regarding stay time at facilities belonging to the respective categories; a category extraction unit operable to extract, from the categories stored by the category storage unit, a category whose category stay information corresponds to the stay time detected by the behavior detection unit; and a selection unit operable to select the identification information of a facility whose category corresponds to the category extracted by the category extraction unit, when the identification information and the categories of a plurality of facilities are extracted by the candidate extraction unit.

Accordingly, the candidate specification unit extracts the identification information and the categories of the plurality of facilities, so that, even when the plurality of facilities are chosen as the candidates, the most-likely facility identification unit selects identification information of a category corresponding to the stay time of the user, which enables to identify with high accuracy, based on the category of the facility, the user's visited facility according to the user's stay behavior at each facility.

Furthermore, the present invention provides a method for identifying a visited place or a program for executing the above visited-place identifying apparatus.

BRIEF DESCRIPTION OF DRAWINGS

FIG. 1 is a block diagram that depicts a structure of the visited-place identification apparatus according to the first embodiment of the present invention.

FIG. 2 is a diagram that depicts details of facility information stored in a facility database according to the first embodiment of the present invention.

FIG. 3 is a diagram that depicts details of facility candidate information which is notified to a most-likely visited facility identification unit by a facility candidate search unit according to the first embodiment of the present invention.

FIG. 4 is a diagram that depicts details of historical data stored in an identified-facility accumulation unit according to the first embodiment of the present invention.

FIG. 7 is a diagram that depicts details of facility information stored in a facility database according to the second embodiment of the present invention.

FIG. 8 is a diagram that depicts details of facility candidate information which is notified to a most-likely visited facility identification unit by a facility candidate search unit according to the second embodiment of the present invention.

FIG. 9 is a diagram that depicts details of historical data stored in an identified-facility accumulation unit according to the second embodiment of the present invention.

FIG. 12 is a diagram that depicts details of facility information stored in a facility database according to the third embodiment of the present invention.

FIG. 13 is a diagram that depicts details of category payment amount information stored in a facility payment amount storage unit according to the third embodiment of the present invention.

FIG. 14 is a diagram that depicts details of facility candidate information which is notified to a most-likely visited facility identification unit by a facility candidate search unit according to the third embodiment of the present invention.

FIG. 17 is a diagram that depicts details of category stay information stored in a facility stay time storage unit according to the fourth embodiment of the present invention.

FIG. 18 is a diagram that depicts details of facility candidate information which is notified to a most-likely visited facility identification unit by a facility candidate search unit according to the fourth embodiment of the present invention.

FIG. 22 is a diagram that depicts details of facility information according to the fifth embodiment of the present invention.

FIG. 29 is a diagram that depicts details of information of required time in the second variation according to the fifth embodiment of the present invention.

FIG. 33 is a diagram illustrating how a vehicle park determination unit obtains parking lot position information in the fourth variation according to the fifth embodiment of the present invention.

FIG. 37 is a diagram that depicts details of facility information according to the sixth embodiment of the present invention.

FIG. 40 is a diagram illustrating an example of a change in the user's belongings according to the sixth embodiment of the present invention.

DETAILED DESCRIPTION OF THE INVENTION

First Embodiment

Figure 5:
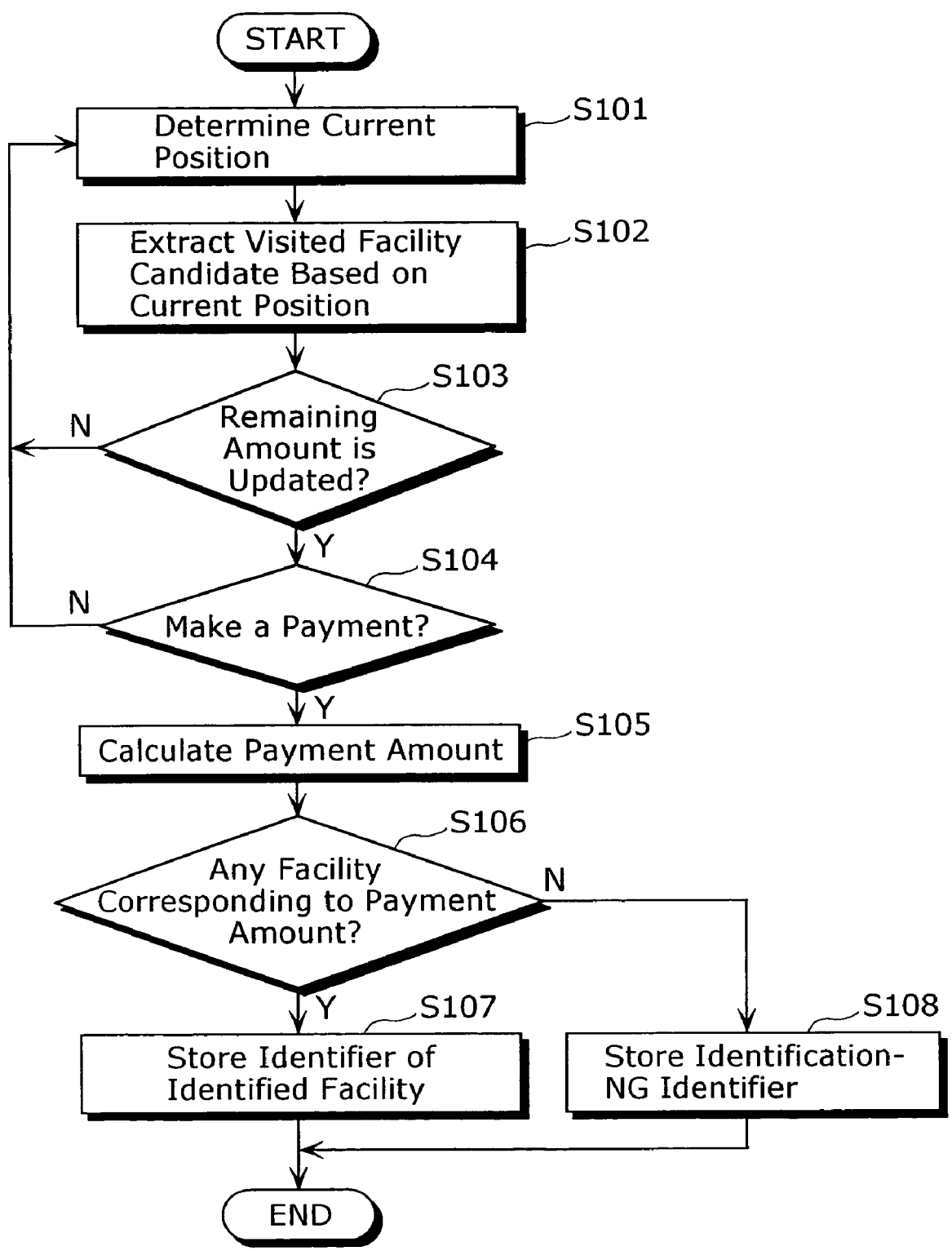
FIG. 5 is a flowchart that depicts steps performed in the visited-place identification apparatus according to the first embodiment of the present invention.

The following describes the first embodiment according to the present invention with reference to the drawings.

FIG. 1 is a block diagram that depicts a structure of the visited-place identification apparatus according to the first embodiment of the present invention.

The visited-place identification apparatus according to the first embodiment identifies a user's visited facility with high accuracy, and then accumulates a history of such identified visited facilities. The visited-place identification apparatus includes a GPS receiving unit 107, a current position determination unit 101, a facility database 102A, a facility candidate search unit 103A, an electronic money unit 108, a payment amount calculation unit 104, a most-likely visited facility identification unit 105A, a clock unit 109 and an identified-facility accumulation unit 106A. Note that the visited-place identification apparatus according to the first embodiment is embedded in portable terminals, such as a portable telephone, a Personal Digital Assistant (PDA), and the like, and carried by the user.

The GPS receiving unit 107 receives position information regarding a current position from the GPS satellites.

The current position determination unit 101 obtains the position information from the GPS receiving unit 107, and determines, based on the position information, a current position of the visited-place identification apparatus, which is a user's current position.

The facility database 102A stores beforehand facility information 12a that indicates a position, an average payment amount, and the like for each facility.

The facility candidate search unit 103A searches, based on the current position determined by the current position determination unit 101, the facility information 12a stored in the facility database 102A for facilities that are located within a predetermined area measured from the current position as its center. The above predetermined area is assumed to have been set with an appropriate value according to positioning accuracy of the GPS. The facility candidate search unit 103A retrieves, from the facility information 12a, information such as an average payment amount for the searched facilities, and notifies the most-likely visited facility identification unit 105A of the facility candidate information 13a indicating the retrieved results.

In summary, the facility candidate search unit 103A chooses candidates for a user's visited facility using the GPS positioning, and outputs the results as the facility candidate information 13a.

The electronic money unit 108 includes a function serving as a so-called prepaid card that is used to make a payment at a railway ticket gate or a convenience store, and another function notifying the payment amount calculation unit 104 of remaining amounts before and after the payment when the remaining amount is changed.

More specifically, the user has deposited beforehand a predetermined amount of money, and the electronic money unit 108 stores the amount as the remaining amount. Then, when the user makes a payment at a facility such as a shop, the electronic money unit 108, communicating with a POS terminal equipped in the shop, updates the remaining amount by subtracting an amount of the payment from the stored remaining amount, and notifies the payment amount calculation unit 104 of the remaining amounts before and after the update. Note that the remaining amounts are stored and updated using a principle of electromagnetic induction, for example.

The payment amount calculation unit 104 determines, based on the remaining amounts before and after the update which are notified by the electronic money unit 108, whether or not the user has made a payment. More specifically, if the remaining amount after the update is less than the remaining amount before the update, then the payment amount calculation unit 104 determines that the user has made a payment, and calculates an amount of the payment=[the remaining amount before the update]−[the remaining amount after the update]. If the remaining amount after the update is more than the remaining amount before the update, as a result of a user's further deposit, the payment amount calculation unit 104 determines that the user has not made a payment.

The clock unit 109 times a current time (date and time including day, month, and year) and notifies it to the most-likely visited facility identification unit 105A.

When a plurality of facilities are chosen as candidates in the facility candidate information 13a that is notified by the facility candidate search unit 103A, the most-likely visited facility identification unit 105A selects, from those facilities, a facility corresponding to the current time notified by the clock unit 109 and the payment amount calculated by the payment amount calculation unit 104, and determines the facility as a facility where the user has actually visited. In summary, the most-likely visited facility identification unit 105A identifies as a visited facility a facility corresponding to the money amount and the date and time (payment date and time) of the user's payment, from the facility candidates indicated in the facility candidate information 13a.

The identified-facility accumulation unit 106A stores in time series, as historical data 16a, the facility (visited facility) identified by the most-likely visited facility identification unit 105A, under the control of the most-likely visited facility identification unit 105A.

FIG. 2 is a diagram that depicts details of the facility information 12a stored in the facility database 102A.

The facility information 12a includes: a position field A1 that stores a position indicated by longitude and latitude, or the like; an identifier field A2 that stores an identifier of a facility that is located at the position; a facility name field A3 that stores a name of the facility (facility name); a morning payment amount field A4 that stores a user's average payment amount at a facility in the morning (for example, from 5:00 until 11:00); an afternoon payment amount field A6 that stores a user's average payment amount at a facility in the afternoon (for example, from 11:00 until 17:00); and a night payment amount field A5 that stores a user's average payment amount at a facility at night (for example, from 17:00 until 5:00).

Note that the identifier is assigned to each facility in order to uniquely identify the facility. Also note that the average payment amount refers to an average of money amounts that general users have spent at each facility (so-called an average sales per customer).

For example, the position field A1 stores positions "LAT:1 N/LNG:1 E", "LAT:2 N/LNG:2 E", and the like, the identifier field A2 stores an identifier "Facility 2" associated with the position "LAT:2 N/LNG:2 E", and the facility name field A3 stores a facility name "Legalo's Restaurante" associated with the identifier "Facility 2". Further, the morning payment amount field A4 stores "600 yen" as a user's average payment amount in the morning at the facility "Legalo's Restaurante", the afternoon payment amount field A5 stores "900 yen" as a user's average payment amount in the afternoon at the facility "Legalo's Restaurante", and the night payment amount field A6 stores "1500 yen" as a user's average payment amount at night at the facility "Legalo's Restaurante".

Note that when a building accommodates a plurality of facilities (shops), the identifiers, names and the like of these facilities are associated with the same position.

For example, when a building at a position "LAT:3 N/LNG:3 E" accommodates facilities "Bos Berger", "Citi Cinema" and "ConveniP-Mart", the identifiers, facility names and average payment amounts regarding those facilities are associated with the position "LAT:3 N/LNG:3 E" as shown in the facility information 12a of FIG. 2.

Furthermore, when a facility does not provide service because it is closed during its closing hours or other reasons, information representing that an average payment amount is not identified (for example, a dash "-" shown in FIG. 2) is stored, in association with a time period during which the service is not provided, into the payment amount field in the facility information 12a.

While the facility information 12a shown in FIG. 2 has been described to store the average payment amounts per a user for the time periods of a day divided into morning, afternoon and night, but it should be appreciated that, based on sales data of each facility, the facility information 12a may store the amounts for further segmented time periods (early morning, morning, afternoon, evening, night, midnight, and the like) or for each day of a week. Moreover, instead of averaging the payment amounts in order to indicate the payment amount information, it should be appreciated that it is also possible to indicate the information by setting maximum and minimum payment amounts, by dispersing as well as averaging the payment amounts to learn their statistical distribution, or by using a membership function of fuzzy logic.

FIG. 3 is a diagram that depicts details of the facility candidate information 13a which is notified to the most-likely visited facility identification unit 105A by the facility candidate search unit 103A.

The facility candidate information 13a includes: an identifier field B1 that stores identifiers of the facilities searched in the facility candidate search unit 103A; a facility name field B2 that stores facility names of the facilities; a morning payment amount field B3 that stores user's average payment amounts at respective facilities in the morning; and an afternoon payment amount field B4 that stores user's average payment amounts at respective facilities in the afternoon; and a night payment amount field B5 that stores user's average payment amounts at respective facilities at night.

For example, the facility candidate search unit 103A searches, based on the current position determined by the current position determination unit 101, the facility information 12a shown in FIG. 2 for facilities that are located within an area corresponding to positions "LAT:2 N/LNG:2 E" and "LAT:3 N/LNG:3 E", and retrieves information regarding facilities "Legalo's Restaurante", "Bos Berger" and "Citi Cinema" from the facility information 12a. The facility candidate search unit 103A then creates the facility candidate information 13a shown in FIG. 3 by storing the retrieved facility information as follows: identifiers into the identifier field B1; facility names into the facility name field B2; average payment amounts in the morning into the morning payment amount field B3; average payment amounts in the afternoon into the afternoon payment amount field B4; and average payment amounts at night into the night payment amount field B5.

FIG. 4 is a diagram that depicts details of the historical data 16a stored in the identified-facility accumulation unit 106A.

The historical data 16a includes: a date/time field C1 that stores a date and time when the user has made a payment; a money amount field C2 that stores an amount of the payment at that date and time; and an identifier field C3 that stores an identifier of the facility where the payment has been made.

For example, the most-likely visited facility identification unit 105A that has obtained the facility candidate information 13a shown in FIG. 3 from the facility candidate search unit 103A, receives from the payment amount calculation unit 104 a notice indicating that a money amount "250 yen" has been paid, further receives from the clock unit 109 a notice indicating that a payment date and time is "Apr. 6, 2003 7:00" in order to determine, based on the date and time, that such payment has been made in the morning. The most-likely visited facility identification unit 105A then searches facilities "Legalo's Restaurante", "Bos Berger", "Citi Cinema" and "ConveniP-Mart" indicated in the facility candidate information 13a for a facility whose average payment amount in the morning is included in a predetermined range of amount calculated using "250 yen", and identifies the facility "ConveniP-Mart" as a visited facility. Note that the above predetermined range is, for example, ±20% from the payment amount, which is "between 200 and 300 yen" in this case.

When the most-likely visited facility identification unit 105A identifies a plurality of facilities whose average payment amounts are included in a predetermined range of amount calculated using the payment amount, the most-likely visited facility identification unit 105A identifies from these facilities, as a visited facility, the most matching facility whose average payment amount is the closest to the payment amount.

After identifying the visited facility, the most-likely visited facility identification unit 105A adds a date and time "Apr. 6, 2003 7:00" to the date/time field C1 in the historical data 16a, and further adds the payment amount "250 yen" to the money amount field C2 in association with the date and time, and stores an identifier "Facility 5" of the identified facility "ConveniP-Mart" into the identifier field C3 in association with the payment amount as well as the payment date and time. This means that the most-likely visited facility identification unit 105A records the information regarding the identified visited facility in time series in the historical data 16a.

If the most-likely visited facility identification unit 105A determines that there is no such a facility whose average payment amount is included in a predetermined range of amount calculated using the payment amount after searching the facilities indicating in the facility candidate information 13a, then stores a predetermined identifier representing that no visited facility is identified (for example, "Facility 0") into the identifier field C3 of the historical data 16a.

As described in the first embodiment, a facility corresponding to a money amount as well as a date and time of a user's payment is identified as a visited facility from several facilities chosen as candidates using the GPS so that it is possible to identify a user's visited place with high accuracy. For example, when the user visits a shopping mall that packs a plurality of facilities, a multi-tenant building that accommodates a plurality of independent shops, or the like, it is difficult to identify, based on only a user's current position determined by the GPS and the like, which facility the user has visited. However it is possible even in such a case to identify accurately the visited facility, by the electronic money unit 108 and the payment amount calculation unit 104 detecting payment behavior of the user. Furthermore, the first embodiment enables to accurately learn user's behavior patterns using the historical data 16a, because identified visited facilities have been stored in the historical data 16a. As a result, the first embodiment enables to presume a user's future behavior and provide the user with useful information such as information of facilities at the destination.

The following describes steps performed in the visited-place identification apparatus according to the first embodiment with reference to FIG. 5.

FIG. 5 is a flowchart that depicts the steps performed in the visited-place identification apparatus according to the first embodiment.

Firstly, the visited-place identification apparatus receives position information from the GPS satellites at predetermined time intervals, and determines a user's current position based on the position information (Step S101).

Next, the visited-place identification apparatus extracts as a visited facility candidate, from the facility information 12a in the facility database 102A, facilities that are located within a predetermined area measured from the current position identified at Step S101 as its center (Step S102).

At this stage, the visited-place identification apparatus determines whether or not a remaining amount of money has been updated (Step S103). If the determination is made that the remaining amount of money has been updated (Y at Step S103), then the visited-place identification apparatus further determines, based on the update, whether or not the user has made a payment (Step S104). On the other hand, if the determination is made that the remaining amount of money has not been updated (N at Step S103), then the visited-place identification apparatus repeats the steps from Step S101.

If the determination is made that the user has made a payment at Step S104 (Y at Step S104), then the visited-place identification apparatus calculates how much the user has paid (Step S105). For example, when remaining amounts before and after the payment are {3000, 2180} respectively, a payment amount is calculated as 820 yen=3000−2180. On the other hand, if the determination is made that the user has not made any payment at Step S104 (N at Step S104), then the visited-place identification apparatus repeats the steps from Step 5101.

After calculating the payment amount at Step 5105, the visited-place identification apparatus compares average payment amounts corresponding to the payment date and time of the respective visited facility candidates searched at Step S102 and the calculated payment amount, and determines whether or not there is, from those visited facility candidates, a facility whose average payment amount is included in a predetermined range of amount calculated using the payment amount (Step S106).

For example, in the case where a predetermined range is set as ±20% from the payment amount, a predetermined range calculated using the payment amount "820 yen" is between 656 yen and 984 yen. In such a case, when the user makes a payment in the afternoon, the visited-place identification apparatus determines, from the visited facility candidates in the facility candidate information 13a shown in FIG. 3, facilities "Legalo's Restaurante" and "Bos Berger" as the facilities whose average payment amounts are included in a predetermined range of amount calculated using the payment amount.

At Step 106, if the determination is made that there is a facility whose average payment amount is included in a predetermined range of amount calculated using the payment amount (Y at Step S106), then the visited-place identification apparatus identifies the facility as a user's visited facility, and stores an identifier of the facility in association with the payment amount as well as the payment date and time (Step S107). When the visited-place identification apparatus determines that there are a plurality of such facilities, it identifies a facility whose average payment amount is the closest to the payment amount, as a visited facility, and stores an identifier of the facility. For example, in the above case, the visited-place identification apparatus identifies, from facilities "Legalo's Restaurante" and "Bos Bergers", the facility "Bos Berger" whose average payment amount is the closest to the payment amount, and stores an identifier "Facility 3" of the facility in association with the payment amount as well as the payment date and time On the other hand, if the determination is made that there is no facility whose average payment amount is included in a predetermined range of amount calculated using the payment amount at Step S106 (N at Step S106), then the visited-place identification apparatus stores a predetermined identifier, for example "Facility 0", representing that no visited facility is identified, in association with the payment amount as well as the payment date and time (Step S108).

Second Embodiment

The following describes the second embodiment according to the present invention with reference to the drawings.

Figure 6:
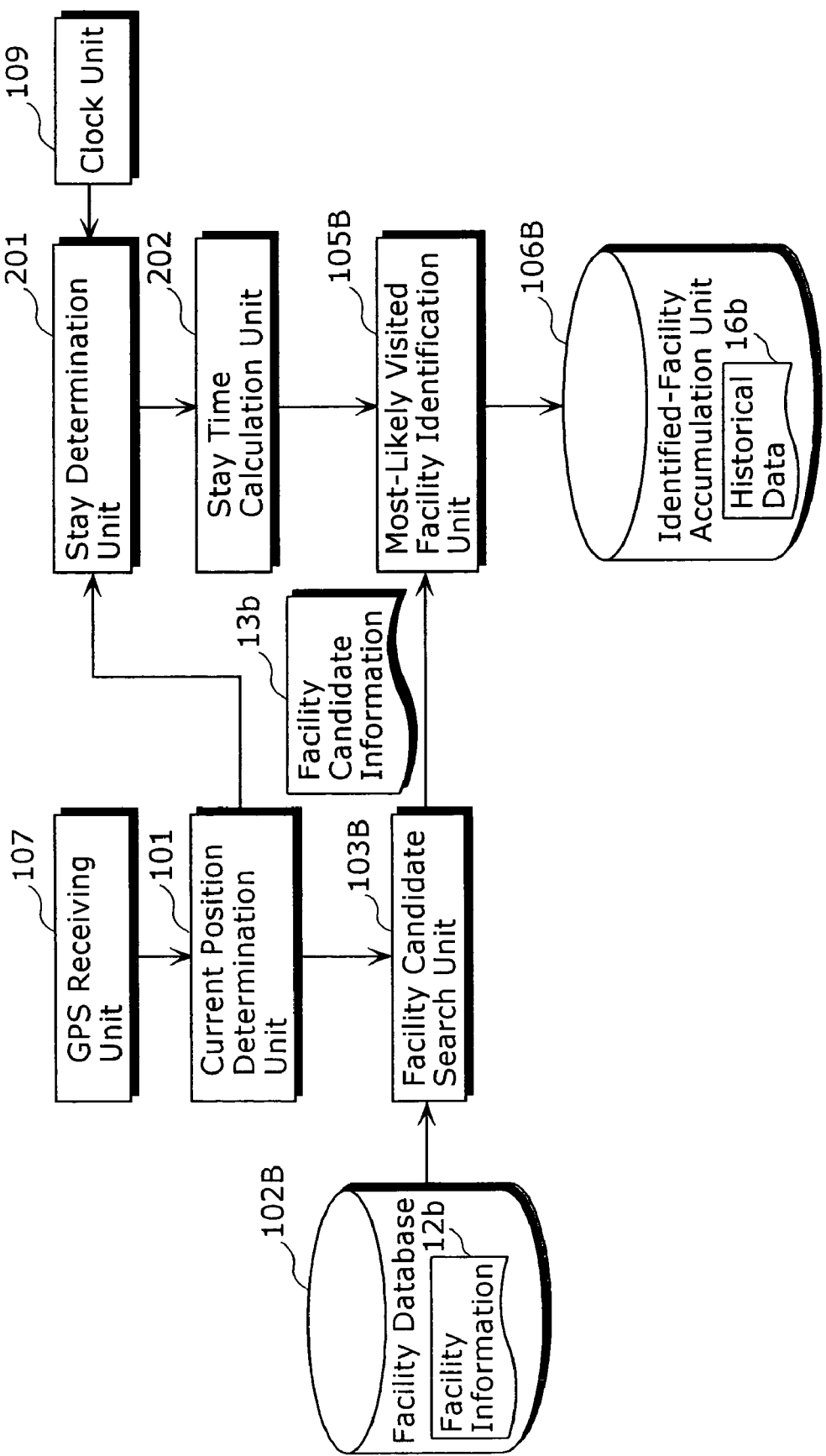
FIG. 6 is a block diagram that depicts a structure of the visited-place identification apparatus according to the second embodiment of the present invention.

FIG. 6 is a block diagram that depicts a structure of the visited-place identification apparatus according to the second embodiment of the present invention.

The visited-place identification apparatus according to the second embodiment identifies a user's visited facility with high accuracy, and accumulates a history of such identified visited facilities. The visited-place identification apparatus includes a GPS receiving unit 107, a current position determination unit 101, a facility database 102B, a facility candidate search unit 103B, a stay determination unit 201, a stay time calculation unit 202, a most-likely visited facility identification unit 105B, a clock unit 109 and an identified-facility accumulation unit 106B. Note that the visited-place identification apparatus according to the second embodiment is embedded in portable terminals, such as a portable telephone and a Personal Digital Assistant (PDA), and on mobile terminals using a vehicular navigation system, for example, and then carried by the user.

In the second embodiment, the same components are designated by the same reference numerals in the first embodiment, and their structures and functions are the same as described above.

The facility database 102B stores beforehand facility information 12b that indicates a position, an average stay time, and the like for each facility.

The facility candidate search unit 103B searches the facility information 12b stored in the facility database 102B, based on a current position determined by the current position determination unit 101, for a facility that is located within a predetermined area measured from the current position as its center. The above predetermined area is assumed to have been set with an appropriate value according to positioning accuracy of the GPS. The facility candidate search unit 103B retrieves, from the facility information 12b, information such as an average stay time regarding the searched facility, and then notifies the most-likely visited facility identification unit 105B of the facility candidate information 13b indicating the retrieved results.

In summary, the facility candidate search unit 103B chooses a candidate for a user's visited facility using the GPS positioning, and outputs the results as the facility candidate information 13b.

The clock unit 109 times a current time (date and time including day, month, and year) and notifies it to the stay determination unit 201.

The stay determination unit 201, based on the current position notified by the current position determination unit 101 and the current time notified by the clock unit 109, determines whether or not the visited-place identification apparatus has been staying within a predetermined area for more than a predetermined time period, in other words, whether or not the user has started staying in the predetermined area for more than the predetermined time period. If the determination is made that the stay has started, the stay determination unit 201 notifies a start time (start date and time) of the stay to the stay time calculation unit 202. The stay determination unit 201 further determines whether or not the visited-place identification apparatus has moved out from the predetermined area, in other words, whether or not the user has finished staying at the facility. If the determination is made that the user has finished staying, the stay determination unit 201 notifies an ending time (ending date and time) of the stay to the stay time calculation unit 202.

Note that the above predetermined time period is assumed to have been set with an appropriate value according to an average stay time regarding each facility, or set with the same value for every facility.

The stay time calculation unit 202 receives a notice indicating the start time and the ending time of the stay from the stay determination unit 201, and calculates stay time of the user as stay time=[the stay ending time]−[the stay start time]. Then the stay time calculation unit 202 notifies the most-likely visited facility identification unit 105B of the calculated stay time and the stay start time.

When a plurality of facilities are chosen as candidates in the facility candidate information 13b notified by the facility candidate search unit 103B, the most-likely visited facility identification unit 105B, from these facilities, selects a facility corresponding to the stay time calculated by the stay time calculation unit 202 and the stay start time, and determines the selected facility as a visited facility which the user has been actually visited. In summary, the most-likely visited facility identification unit 105B, from the facility candidates indicated in the facility candidate information 13b, identifies, as a visited facility, a facility corresponding to the user's stay time and the stay start time.

The identified-facility accumulation unit 106B stores the visited facility identified in the most-likely visited facility identification unit 105B into the historical data 16b in time series, under the control of the most-likely visited facility identification unit 105B.

FIG. 7 is a diagram that depicts details of the facility information 12b stored in the facility database 102B.

The facility information 12b includes: a position field D1 that stores a position indicated by longitude and latitude, or the like; an identifier field D2 that stores an identifier of facility that is located at the position; a facility name field D3 that stores a name of facility (facility name); a morning stay time field D4 that stores user's average stay time at a facility in the morning (for example, from 5:00 until 11:00); an afternoon stay time field D5 that stores user's average stay time at a facility in the afternoon (for example, from 11:00 until 17:00); and a night stay time field D6 that stores user's average stay time at a facility at night (for example, from 17:00 until 5:00).

Note that the above identifier is assigned to each facility in order to uniquely identify the facility. Also note that the above average stay time refers to an average of time for which general users have spent at each facility.

For example, the position field D1 stores positions "LAT:1 N/LNG:1 E", "LAT:2 N/LNG:2 E", and the like, the identifier field D2 stores an identifier "Facility 2" associated with the position "LAT:2 N/LNG:2 E", and the facility name field D3 stores a facility name "Legalo's Restaurante" associated with the identifier "Facility 2". Further, the morning stay time field D4 stores "30 min" as user's average stay time at the facility "Legalo's Restaurante" in the morning, the afternoon stay time field D5 stores "45 min" as user's average stay time at the facility "Legalo's Restaurante" in the afternoon, and the night stay time field D6 stores "90 min" as user's average stay time at the facility "Legalo's Restaurante" at night.

Note that when a plurality of facilities (shops) are located at the same premise, their identifiers, names, and the like are associated with the same position.

For example, when facilities "Noodle Stand" and "Park" are on the same premise at a position "LAT:4 N/LNG:4 E", their identifiers, facility names and average stay time regarding these facilities are associated with the position "LAT:4 N/LNG:4 E" as shown in the facility information 12b in FIG. 7.

Furthermore, when a facility does not provide service because it is closed during its closing hours or other reasons, information representing that average stay time is not identified (for example, a dash "-" shown in FIG. 7) is stored, in association with a time period during which the service is not provided, into the stay time field in the facility information 12b.

While the facility information 12b shown in FIG. 7 has been described to store the average stay time per a user for the time periods of a day divided into morning, afternoon and night, but it should be appreciated that, based on customer data of each facility, the facility information 12b may store the average stay time for more segmented time periods (early morning, morning, afternoon, evening, night, midnight, and the like) or for each day of a week. Moreover, instead of averaging the stay time in order to indicate the information of stay time, it should be appreciated that it is also possible to indicate the information by dispersing as well as averaging the stay time to learn their statistical distribution, or by using a membership function of fuzzy logic.

FIG. 8 is a diagram that depicts details of the facility candidate information 13b which is notified to the most-likely visited facility identification unit 105B by the facility candidate search unit 103B.

The facility candidate information 13b includes: an identifier field E1 that stores an identifier of the facility searched by the facility candidate search unit 103B; a facility name field E2 that stores a facility name of the facility; a morning stay time field E3 that stores user's average stay time at the facility in the morning; an afternoon stay time field E4 that stores user's average stay time at the facility in the afternoon; and a night stay time field E5 that stores user's average stay time at the facility at night.

For example, when the facility candidate search unit 103B searches the facility information 12b shown in FIG. 7 for facilities that are located within a circle with radius 20 m measured from a current position determined by the current position determination unit 101 including positions "LAT:1 N/LNG:1 E" and "LAT:4 N/LNG:4 E", the facility candidate search unit 103B retrieves information regarding facilities "Cutt Salon", "Noodle Stand", and "Park" from the facility information 12a. The facility candidate search unit 103B then creates the facility candidate information 13b shown in FIG. 8 by storing the retrieved facility information as follows: the identifiers into the identifier field E1; the facility names into the facility name field E2; the average morning stay time into the morning stay time field E3; the average evening stay time into the evening stay time field E4; and the average night stay time into the night stay time field E5.

FIG. 9 is a diagram that depicts details of the historical data 16b stored in the identified-facility accumulation unit 106B.

The historical data 16b includes: a date/time field F1 that stores a stay start time (date and time) when the user has started staying at a facility; a stay time field F2 that stores stay time of the stay; and an identifier field F3 that stores an identifier of the facility where the user has stayed.

For example, the most-likely visited facility identification unit 105B obtains the facility candidate information 13b shown in FIG. 8 from the facility candidate search unit 103B, then receives a notice indicating that the user has been staying at the facility candidate for stay time "60 min" since a date and time "Apr. 6, 2003, 10:05", from the stay time calculation unit 202, and determines, based on the date and time, that the user stayed at the facility in the morning. Then the most-likely visited facility identification unit 105B searches the facilities "Cutt Salon", "Noodle Stand" and "Park" shown in the facility candidate information 13b for a facility whose average stay time in the morning is included in a predetermined range of time period calculated using the stay time "60 min", and identifies a facility "Cutt Salon" as a visited facility. Note that the above predetermined time period is, for example, ±10% from stay time, which is "between 54 minutes and 66 minutes" in this case.

Also note that when the most-likely visited facility identification unit 105B identifies a plurality of facilities whose respective average stay time are included in a predetermined range of time period calculated using the stay time, the most-likely visited facility identification unit 105B determines, as a visited facility, the most matching facility whose average stay time is the closest to the stay time.

After identifying the visited facility, the most-likely visited facility identification unit 105B adds a date and time "Apr. 6, 2003, 10:05" to the date/time field F1 in the historical data 16b, and further adds the stay time "60 min" to the stay time field F2 in association with the date and time, and stores an identifier "Facility 1" of the identified facility "Cutt Salon" into the identifier field F3 in association with the stay time as well as the date and time. This means that the most-likely visited facility identification unit 105B records the information regarding the identified visited facility in time series into the historical data 16b.

If the most-likely visited facility identification unit 105B determines that there is no such a facility whose average stay time is included in a predetermined range of time period calculated using the stay time after making a search the facilities indicated in the facility candidate information 13b, then stores a predetermined identifier representing that no visited facility is identified (for example, "Facility 0") into the identifier field F3 of the historical data 16b.

As described in the second embodiment, a facility corresponding to the stay time as well as the date and time regarding the user's stay is identified as a visited facility from several facilities chosen as candidates using the GPS, so that it is possible to identify a user's visited facility with high accuracy. Furthermore, the second embodiment enables to accurately learn user's behavior patterns using the historical data 16b, because identified visited facilities have been recorded as a history in the historical data 16b.

Figure 10:
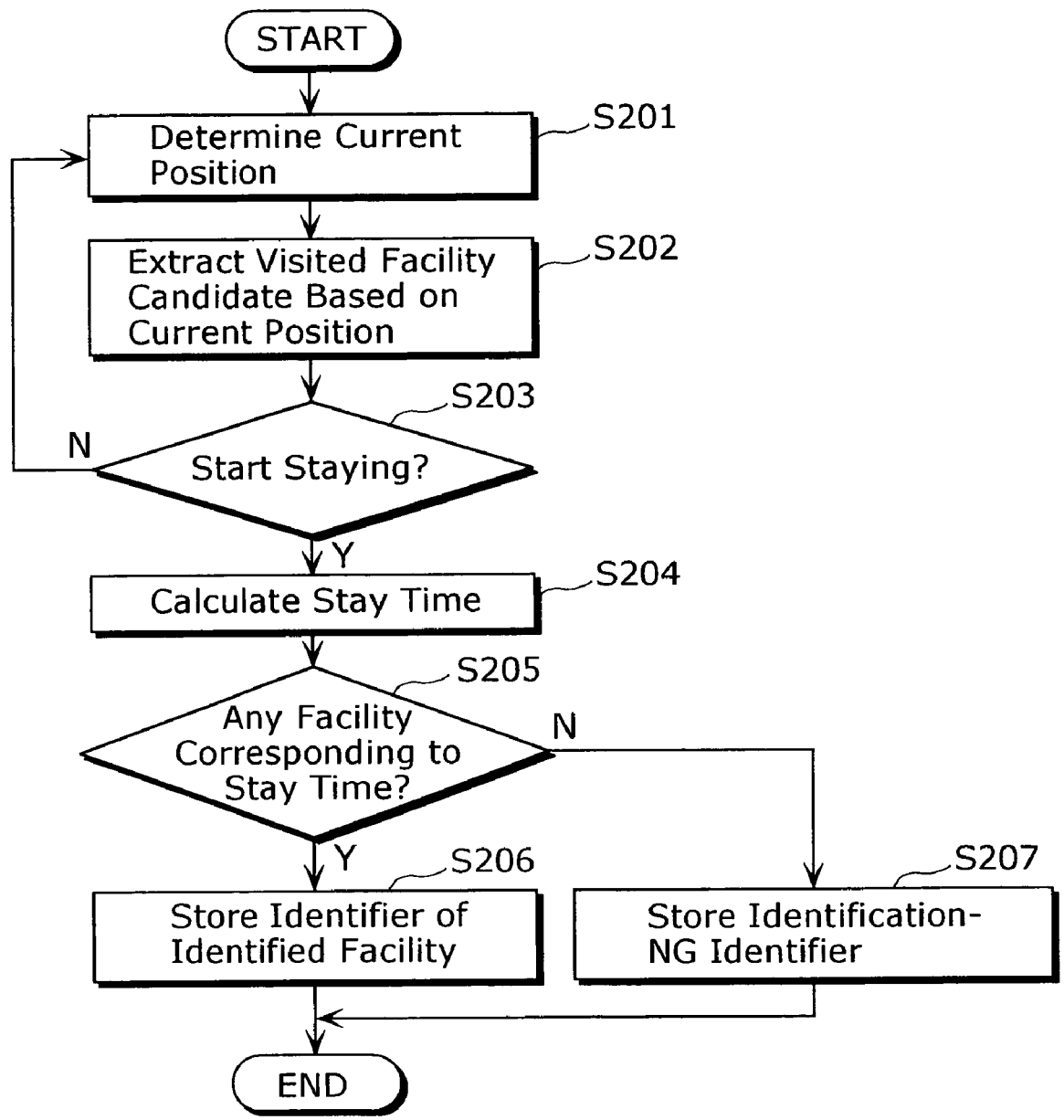
FIG. 10 is a flowchart that depicts steps performed in the visited-place identification apparatus according to the second embodiment of the present invention.

The following describes steps performed in the visited-place identification apparatus according to the second embodiment with reference to FIG. 10.

FIG. 10 is a flowchart that depicts the steps performed in the visited-place identification apparatus according to the second embodiment.

Firstly, the visited-place identification apparatus receives position information from the GPS satellites at predetermined time intervals, and determines a user's current position based on the position information (Step S201).

Next, the visited-place identification apparatus extracts as visited facility candidates, from the facility information 12b in the facility database 102B, facilities that are located within a predetermined area measured from the current position identified at Step S201 as its center (Step S202).

At this stage, the visited-place identification apparatus determines whether or not the user has started staying (Step S203). If the determination is made that the user has started staying (Y at Step S203), then the visited-place identification apparatus further calculates the stay time (Step S204). For example, if a start time and an ending time of the stay are {10:05, 11:05} respectively, then the stay time is calculated as 60 (min)=11:05-10:05. On the other hand, if the determination is made that the user has not started staying (N at step S203), then the visited-place identification apparatus repeats the steps from Step S201.

After calculating the stay time at Step S204, the visited-place identification apparatus compares average stay time corresponding to the stay start time of the visited facility candidates searched at Step S202 and the calculated stay time, and determines whether or not there is, from those visited facility candidates, a facility whose average stay time is included in a predetermined range of time period calculated using the stay time (Step S205).

For example, in the case where the predetermined range is set as ±10% from the stay time, a predetermined range calculated using the stay time "60 min" is between 54 minutes and 66 minutes. In such a case, when the stay start time is 12:30 in the afternoon, the visited-place identification apparatus determines, from the visited facility candidates in the facility candidate information 13b shown in FIG. 8, a facility "Cutt Salon" as a facility whose average stay time is included in the predetermined range of time period calculated using the stay time.

At Step 205, if the determination is made that there is a facility whose average stay time is included in a predetermined range of time period calculated using the stay time (Y at Step S205), then the visited-place identification apparatus identifies the facility as a user's visited facility, and stores an identifier of the facility in association with the stay start time and the stay time (Step S206). For example, in the above case, the visited-place identification apparatus stores an identifier "facility 1" of the facility "Cutt Salon". When the visited-place identification apparatus determines that there are a plurality of such facilities, it identifies a facility whose average stay time is the closest to the stay time, as a visited facility, and stores an identifier of the facility.

On the other hand, if the determination is made that there is no facility whose stay time is included in a predetermined range of time period calculated using the stay time at Step S205 (N at Step S205), then the visited-place identification apparatus stores a predetermined identifier, for example "Facility 0", representing that no visited facility is identified, in association with the stay start time and the stay time (Step S207).

Third Embodiment

The following describes the third embodiment according to the present invention with reference to the drawings.

Figure 11:
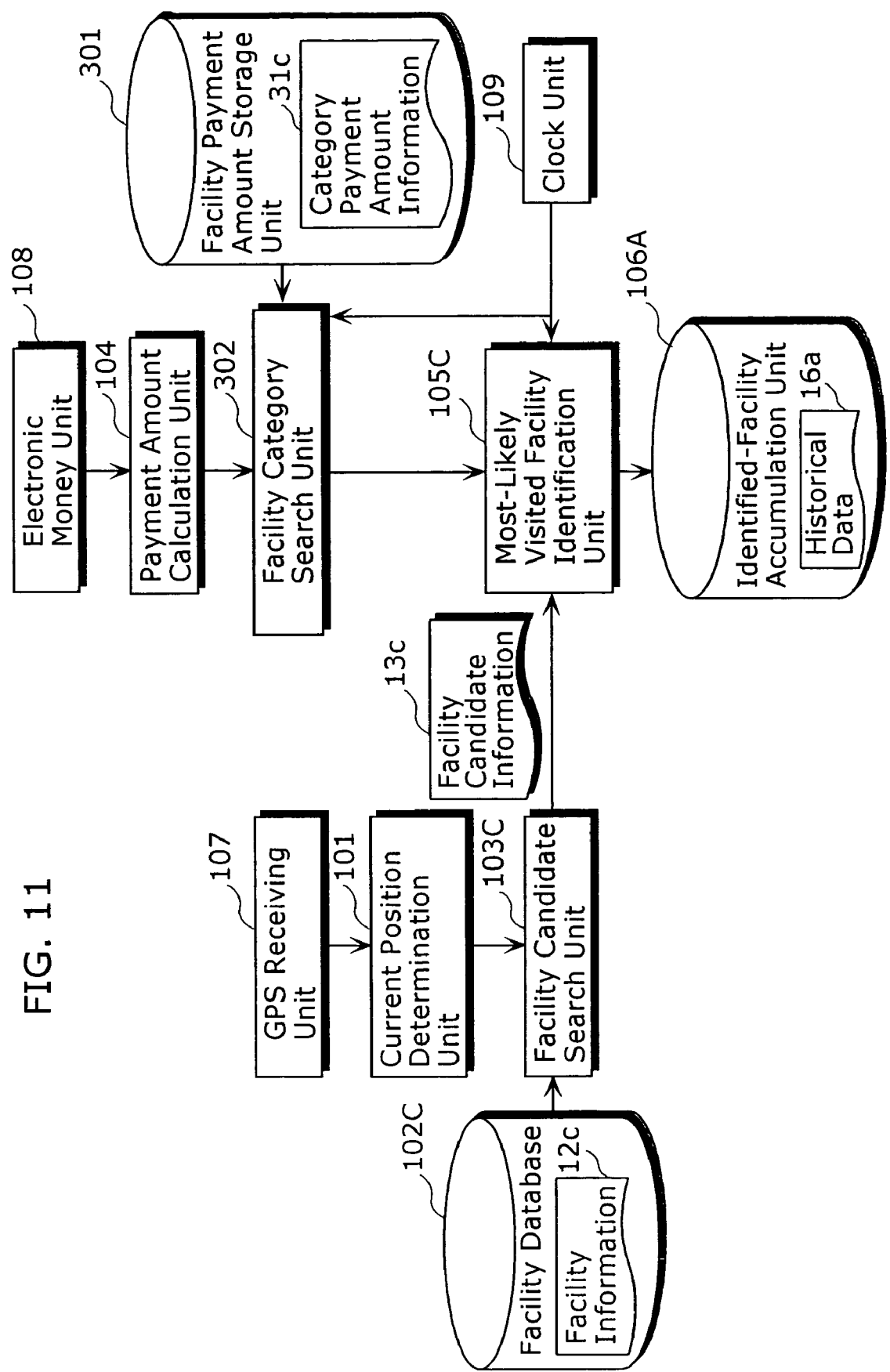
FIG. 11 is a block diagram that depicts a structure of the visited-place identification apparatus according to the third embodiment of the present invention.

FIG. 11 is a block diagram that depicts a structure of the visited-place identification apparatus according to the third embodiment of the present invention.

The visited-place identification apparatus according to the third embodiment identifies a user's visited facility with high accuracy and accumulates a history of such identified visited facilities. The visited-place identification apparatus includes a GPS receiving unit 107, a current position determination unit 101, a facility database 102C, a facility candidate search unit 103C, an electronic money unit 108, a payment amount calculation unit 104, a most-likely visited facility identification unit 105C, a clock unit 109, an identified-facility accumulation unit 106A, a facility category search unit 302, and a facility payment amount storage unit 301. The visited-place identification apparatus according to the third embodiment is, in the same manner as described in the first embodiment, embedded in portable terminals, such as a portable telephone, a Personal Digital Assistant (PDA) and the like, and carried by the user.

In the third embodiment, the same components are designated by the same reference numerals in the first and second embodiments, and their structures and functions are the same as described above.

The facility database 102C stores beforehand facility information 12c that indicates a position, a category, and the like for each facility.

The facility candidate search unit 103C searches, based on the current position determined by the current position determination unit 101, the facility information 12c stored in the facility database 102C for facilities that are located within a predetermined area measured from the current position as its center. The above predetermined area is assumed to have been set with an appropriate value according to positioning accuracy of the GPS. The facility candidate search unit 103C retrieves, from the facility information 12c, information such as categories to which the searched facilities belong, and notifies the most-likely visited facility identification unit 105C of the facility candidate information 13c indicating the retrieved results.

In summary, the facility candidate search unit 103C chooses candidates for a user's visited facility using the GPS positioning, and outputs the results as the facility candidate information 13c.

The clock unit 109 times a current time (date and time including day, month, and year) and notifies it to the facility category search unit 302 and the most-likely visited facility identification unit 105C.

The facility payment amount storage unit 301 stores category payment amount information 31c that indicates an average payment amount of the user for each facility category.

The facility category search unit 302 searches facility categories indicated in the category payment amount information 31c of the facility payment amount storage unit 301 for a category corresponding to the payment amount calculated by the payment amount calculation unit 104 and also corresponding to a payment date and time based on the current time notified by the clock unit 109, and notifies the most-likely visited facility identification unit 105C of the corresponding category and the payment amount.

The most-likely visited facility identification unit 105C selects, from the facilities indicated in the facility candidate information 13c notified by the facility candidate search unit 103C, a facility corresponding to the category searched by the facility category search unit 302, and determines the facility as a facility where the user has actually visited. In summary, the most-likely visited facility identification unit 105C, from the facility candidates indicated in the facility candidate information 13c, identifies, as a visited facility, a facility corresponding to the payment amount as well as payment day and time of the user.

The identified-facility accumulation unit 106A stores in time series, as the historical data 16a, the facility (visited facility) identified by the most-likely visited facility identification unit 105C, under the control of the most-likely visited facility identification unit 105C.

FIG. 12 is a diagram that depicts details of the facility information 12c stored in the facility database 102C.

The facility information 12c includes: a position field G1 that stores a position indicated by longitude and latitude, or the like; an identifier field G2 that stores an identifier of a facility that is located at the position; a facility name field G3 that stores a name of the facility (facility name); and a category field G4 that stores a category to which the facility belongs.

Note that the identifier is assigned to each facility in order to uniquely identify the facility. Also note that the average payment amount refers to an average of money amounts that general users have spent at each facility (so-called an average sales per customer).

For example, the position field G1 stores positions "LAT:1 N/LNG:1 E", "LAT:2 N/LNG:2 E", and the like, the identifier field G2 stores an identifier "Facility 2" associated with the position "LAT:2 N/LNG:2 E", and the facility name field G3 stores a facility name "Legalo's Restaurante" associated with the identifier "Facility 2". Furthermore, the category field G4 stores a category "restaurant" to which the facility "Legalo's Restaurante" belongs. Note that, in the same manner as described for the facility information 12a in the first embodiment, when a building accommodates a plurality of facilities (shops), the identifiers, names and the like of these facilities are associated with the same position.

FIG. 13 is a diagram that depicts details of the category payment amount information 31c stored in the facility payment amount storage unit 301.

The category payment amount information 31c includes: a category field H1 that stores a category to which a facility belongs; a morning payment amount field H2 that stores a user's average payment amount in the morning regarding the category (for example, from 5:00 until 11:00); an afternoon payment amount field H3 that stores a user's average payment amount in the afternoon regarding the category (for example, from 11:00 until 17:00); and a night payment amount field H4 that stores a user's average payment amount at night regarding the category (for example, from 17:00 until 5:00).

For example, the category payment amount information 31c shown in FIG. 13 stores: a category "fast food" into the category field H1; an average payment amount in the morning "400 yen" into the morning payment amount field H2 in association with the category; an average payment amount in the afternoon "800 yen" into the afternoon payment amount field H3 in association with the category; and information representing that no average payment amount at night is identified because the facility is closed during its closing hours or other reasons (for example, a dash "-" shown in FIG. 13) into the afternoon payment amount field H4.

While the category payment amount information 31c shown in FIG. 13 has been described to store the average payment amounts per a user for the time periods of a day divided into morning, afternoon and night, but it should be appreciated that, based on sales data of each facility, the category payment amount information 31c may store the amounts for further segmented time periods (early morning, morning, afternoon, evening, night, midnight, and the like) or for each day of a week. Moreover, instead of averaging the payment amounts in order to indicate the payment amount information, it should be appreciated that it is also possible to indicate the information by setting maximum and minimum payment amounts, by dispersing as well as averaging the payment amounts to learn their statistical distribution, or by using a membership function of fuzzy logic.

For example, when the payment amount calculation unit 104 calculates "820 yen" as a payment amount, and the facility category search unit 302 determines that the payment date and time is the afternoon based on the current time notified by the clock unit 109, the facility category search unit 302 searches the categories shown in the category payment amount information 31c shown in FIG. 13 for a category whose average payment amount in the afternoon is included in a predetermined range of amount calculated using the payment amount "820 yen". As a result, the facility category search unit 302 finds a category "fast food", and notifies the most-likely visited facility identification unit 105C of the category "fast food". Note that the above predetermined range is, for example, ±20% from the payment amount, which is "between 656 and 984 yen" in this case. When the facility category search unit 302 finds a plurality of categories whose average payment amounts are included in a predetermined range of amount calculated using the payment amount, it selects from these categories the most matching category whose average payment amount is the closest to the payment amount of the user. If the facility category search unit 302 determines that there is no such a category whose average payment amount is included in a predetermined range of amount calculated using the payment amount after making a search from categories indicating in the category payment amount information 31c, then notifies the most-likely visited facility identification unit 105C that no such a category is found.

FIG. 14 is a diagram that depicts details of the facility candidate information 13c which is notified to the most-likely visited facility identification unit 105C by the facility candidate search unit 103C.

The facility candidate information 13c includes: an identifier field I1 that stores an identifier of a facility searched by the facility candidate search unit 103C; a facility name field I2 that stores a facility name of the facility; and a category field I3 that stores a category of the facility.

For example, the facility candidate search unit 103C searches, based on the current position determined by the current position determination unit 101, the facility information 12c shown in FIG. 12 for facilities that are located within an area including positions "LAT:2 N/LNG:2 E" and "LAT:3 N/LNG:3 E", and retrieves information regarding facilities "Legalo's Restaurante", "Bos Berger", "Citi Cinema", and "ConveniP-Mart" from the facility information 12c. The facility candidate search unit 103C then creates the facility candidate information 13c shown in FIG. 14 by storing the retrieved information as follows: facility identifiers into the identifier field I1; facility names into the facility name field I2; and categories into the category field I3.

When the most-likely visited facility identification unit 105C is notified of a category "fast food" by the facility category search unit 302, obtains the facility candidate information 13c shown in FIG. 14, further learns that a date and time of the payment is "Apr. 6, 2003, 7:00" based on a current time notified by the clock unit 109, the most-likely visited facility identification unit 105C searches facilities "Legalo's Restaurante", "Bos Berger", "Citi Cinema", and "ConveniP-Mart" shown in the facility candidate information 13c for a facility belonging to a category "a fast food", and identifies the facility "Bos Berger" as a visited facility. After identifying the visited facility, the most-likely visited facility identification unit 105C stores a payment date and time "Apr. 6, 2003, 7:00", the payment amount "820 yen", and an identifier "Facility 3" of the identified facility ""Bos BergerBt" into the historical data 16a in association with one another. If the most-likely visited facility identification unit 105C determines that there is no such a facility that belongs to the category notified by the facility category search unit 302 from the facilities indicated in the facility candidate information 13c, or if the most-likely visited facility identification unit 105C receives a notice indicating that no such a category is found from the facility category search unit 302, then the most-likely visited facility identification unit 105C stores a predetermined identifier representing that no visited facility is identified (for example, "Facility 0") into the identifier field C3 of the historical data 16a.

As described in the third embodiment, the facility corresponding to the money amount and the date and time of the user's payment is identified as the visited facility from several facilities chosen as a candidate using the GPS so that it is possible to identify a user's visited place with high accuracy. Further, the third embodiment enables to accurately learn user's behavior patterns using the historical data 16a, because identified visited facilities have been stored as a history in the historical data 16a.

Still further, in the third embodiment, the facility information 12c stores categories, not average payment amounts or stay time, so that it is possible to reduce the amount of information stored in the facility information 12c more than that stored in the facility information 12a and 12b in the first and second embodiments respectively in order to effectively use the storage space of the facility database 102C. It is also possible in the third embodiment to build the facility information 12c easily.

Figure 15:
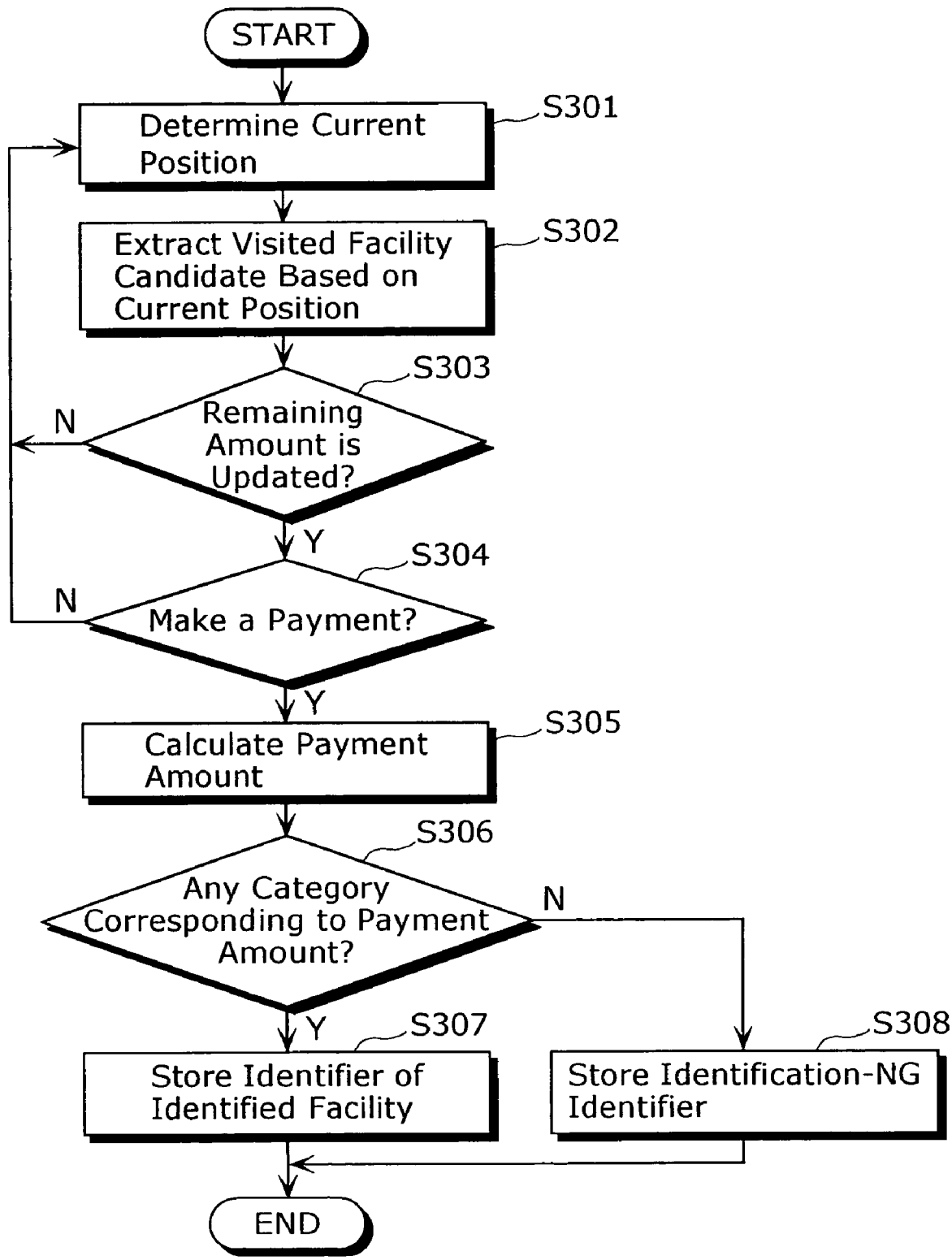
FIG. 15 is a flowchart that depicts steps performed in the visited-place identification apparatus according to the third embodiment of the present invention.

The following describes steps performed in the visited-place identification apparatus according to the third embodiment with reference to FIG. 15.

FIG. 15 is a flowchart that depicts the steps performed in the visited-place identification apparatus according to the third embodiment.

Firstly, the visited-place identification apparatus receives position information from the GPS satellites at predetermined time intervals, and determines a user's current position based on the position information (Step S301).

Next, the visited-place identification apparatus extracts as visited facility candidates, from the facility information 12c in the facility database 102C, facilities that are located within a predetermined area measured from the current position determined at Step S301 as its center (Step S302).

At this stage, the visited-place identification apparatus determines whether or not a remaining amount of money has been updated (Step S303). If the determination is made that the remaining amount of money has been updated (Y at Step S303), then the visited-place identification apparatus further determines, based on the update, whether or not the user has made a payment (Step S304). On the other hand, if the determination is made that the remaining amount of money has not been updated (N at Step S303), then the visited-place identification apparatus repeats the steps from Step S301.

If the determination is made that the user has made a payment at Step S304 (Y at Step S304), then the visited-place identification apparatus calculates a money amount of the user's payment (Step S305). For example, when remaining amounts before and after the payment are {3000, 2180} respectively, a payment amount is calculated as 820 yen=3000-2180. On the other hand, if the determination is made that the user has not made any payment at Step S304 (N at Step S304), then the visited-place identification apparatus repeats the steps from Step S301.

After calculating the payment amount at Step S305, the visited-place identification apparatus compares average payment amounts corresponding to the payment date and time indicated in the category payment amount information 31c and the calculated payment amount, and determines whether or not there is, from those categories in the category payment amount information 31c, a category whose average payment amount is included in a predetermined range of amount calculated using the payment amount (Step S306).

If the determination is made that there is a category whose average payment amount is included in a predetermined range of amount calculated using the payment amount (Y at Step S306), then the visited-place identification apparatus finds, from the extracted facilities at Step 302, a facility belonging to the category whose average payment amount is included in a predetermined range of amount calculated using the payment amount, then identifies the facility as a visited facility, and stores an identifier of the facility in association with the payment amount as well as the payment date and time (Step S307).

On the other hand, if the determination is made that there is no category whose average payment amount is included in a predetermined range of amount calculated using the payment amount at Step S306 (N at Step S306), then the visited-place identification apparatus stores a predetermined identifier, for example "Facility 0", representing that no visited facility is identified, in association with the payment date and time as well as the payment amount (Step S308).

Fourth Embodiment

The following describes the fourth embodiment according to the present invention with reference to the drawings.

Figure 16:
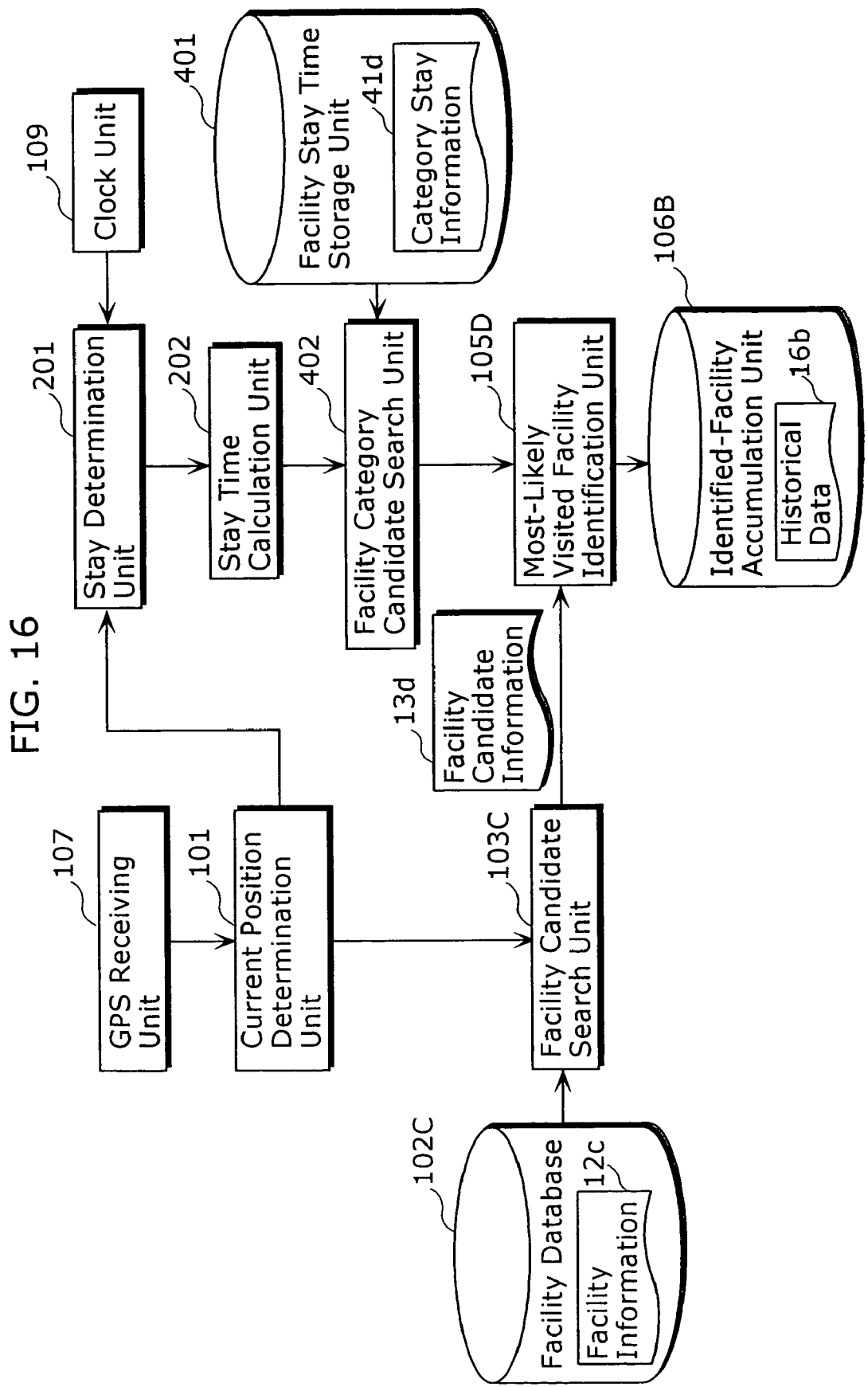
FIG. 16 is a block diagram that depicts a structure of the visited-place identification apparatus according to the fourth embodiment of the present invention.

FIG. 16 is a block diagram that depicts a structure of the visited-place identification apparatus according to the fourth embodiment of the present invention.

The visited-place identification apparatus according to the fourth embodiment identifies a user's visited facility with high accuracy and accumulates a history of such identified visited facilities. The visited-place identification apparatus includes a GPS receiving unit 107, a current position determination unit 101, a facility database 102C, a facility candidate search unit 103C, a stay determination unit 201, a stay time calculation unit 202, a facility category search unit 402, a facility stay time storage unit 401, a most-likely visited facility identification unit 105D, a clock unit 109, and an identified-facility accumulation unit 106B. Note that the visited-place identification apparatus according to the fourth embodiment is, in the same manner as described in the second embodiment, embedded in portable terminals, such as a portable telephone, a Personal Digital Assistant (PDA) and the like, and on mobile terminals using a vehicular navigation system, and carried by the user.

In the fourth embodiment, the same components are designated by the same reference numerals in the first to third embodiments, and their structures and functions are the same as described above.

The facility candidate search unit 103C, in the same manner as described in the third embodiment, searches the facility information 12c for facilities that are located within a predetermined area measured from the current position determined by the current position determination unit 101 as its center. The facility candidate search unit 103C retrieves, from the facility information 12c, information such as a category to which the searched facility belongs, and notifies the most-likely visited facility identification unit 105D of facility candidate information 13d indicating the retrieved results.

The stay time calculation unit 202 receives a notice indicating a start time and an ending time of the stay from the stay determination unit 201, and calculates stay time of the user as the stay time=[the stay ending time]-[the stay start time]. Then the stay time calculation unit 202 notifies the facility category search unit 402 of the calculated stay time and the stay start time (date and time).

The facility stay time storage unit 401 stores category stay information 41d that indicates average stay time of the user at a facility for each category.

The facility category search unit 402 searches categories indicated in the category stay information 41d of the facility stay time storage unit 401 for a category corresponding to the stay time calculated by the stay time calculation unit 202 and the stay start time, and notifies the most-likely visited facility identification unit 105D of the corresponding category, and the stay time and the stay start time.

The most-likely visited facility identification unit 105D selects, from those facilities indicated in the facility candidate information 13d notified by the facility candidate search unit 103C, a facility belonging to the category searched by the facility category search unit 402, and identifies the selected facility as a facility where the user has actually visited. In summary, the most-likely visited facility identification unit 105D identifies as a visited facility, from the facility candidates indicated in the facility candidate information 13d, a facility corresponding to the stay time and the stay start time of the user.

The identified-facility accumulation unit 106B stores in time series, as historical data 16b, the visited facility identified by the most-likely visited facility identification unit 105D, under the control of the most-likely visited facility identification unit 105D.

FIG. 17 is a diagram that depicts details of category stay information 41d stored in the facility stay time storage unit 401.

The category stay information 41d includes: a category field J1 that stores a category to which a facility belongs; a morning stay time field J2 that stores user's average stay time in the morning regarding a category (for example, from 5:00 until 11:00); an afternoon stay time field J3 that stores user's average stay time in the afternoon regarding a category (for example, from 11:00 until 17:00); and a night stay time field J4 that stores user's average stay time at night regarding a category (for example, from 17:00 until 5:00).

For example, the category stay information 41d shown in FIG. 17 stores: a category "barbershop/beauty salon" into the category field J1; average stay time in the morning "60 min" into the morning stay time field J2 in association with the category; average stay time in the afternoon "60 min" into the afternoon stay time field J3 in association with the category; and information representing that average payment amount at night is not identified because it is closed during its closing hours or other reasons (for example, a dash "-" shown in FIG. 17) into the night stay time field J4.

While the example shown in FIG. 17 has been described to store the average stay time per a user for the time periods of a day divided into morning, afternoon and night, but it is also possible, based on customer data of each facility, to store the average stay time for further segmented time periods (early morning, morning, afternoon, evening, night, midnight, and the like) or for each day of a week. Moreover, instead of averaging the stay time in order to indicate the information of the stay time, it should be appreciated that it is also possible to indicate the information by dispersing as well as averaging the stay time to learn their statistical distribution, or by using a membership function of fuzzy logic.

For example, when the facility category search unit 402 receives a notice indicating that stay time is "60 min" and a stay start time is "10:5" from the stay time calculation unit 202, the facility category search unit 402 determines that the user stayed at a facility belonging to the category in the morning, and searches the categories indicated in the category stay information 41d shown in FIG. 17, a category whose average stay time in the morning is included in a predetermined range of time period calculated using the stay time "60 minutes", finds a category "barbershop/beauty salon", and notifies the category "barbershop/beauty salon" to the most-likely visited facility identification unit 105D. Note that the above predetermined range is, for example, ±10% from the stay time, which is "between 54 minutes and 66 minutes" in this case. When the facility category search unit 402 identifies a plurality of categories whose average stay time are included in a predetermined range of time period calculated using the stay time, the facility category search unit 402 identifies from these categories the most matching category whose average stay time is the closest to the stay time. If the facility category search unit 402 determines that there is no such a category whose average stay time is included in a predetermined range of time period calculated using the stay time after searching the categories indicating in the category stay information 41d, then notifies the most-likely visited facility identification unit 105D that the no such a category is found.

FIG. 18 is a diagram that depicts details of the facility candidate information 13d which is notified to the most-likely visited facility identification unit 105D by the facility candidate search unit 103C.

The facility candidate information 13d includes, in the same manner as described for the facility candidate information 13c in the third embodiment: an identifier field K1 that stores identifiers of the facilities searched in the facility candidate search unit 103C; a facility name field K2 that stores facility names of the respective facilities; and a category field K3 that stores categories to which the facilities belongs.

For example, when the facility candidate search unit 103C searches, based on a current position determined by the current position determination unit 101, the facility information 12c shown in FIG. 12 for facilities that are located within an area including positions "LAT:1 N/LNG:1 E" and "LAT:4 N/LNG:4 E", the facility candidate search unit 103 retrieves information of facilities "Cutt Salon", "Noodle Stand" and "Park" from the facility information 12c. The facility candidate search unit 103C then creates the facility candidate information 13d shown in FIG. 18 by storing the retrieved information as follows: the identifiers of the facilities into the identifier field K1; the facility names into the facility name field K2; and the categories into the category field K3.

Then, the most-likely visited facility identification unit 105D receives a notice of a category "barbershop/beauty salon" from the facility category search unit 402, obtains the facility candidate information 13d shown in FIG. 18, then retrieves the facility whose category is "barbershop/beauty salon" from the facilities "Cutt Salon", "Noodle Stand", and "Park" indicated in the facility candidate information 13d, and identifies the facility "Cutt Salon" as a visited facility. After identifying the visited facility, the most-likely visited facility identification unit 105D stores the stay start time "Apr. 6, 2003, 7:00", the stay time "60 min", and the identifier "Facility 1" of the identified facility "Cutt Salon" notified by the facility category search unit 402 into the historical data 106b in association with one another. If the most-likely visited facility identification unit 105D determines that no such a facility category notified by the facility category search unit 302 is found from the facilities indicated in the facility candidate information 13d, or if it receives a notice indicating that no such a facility is found in the facility category search unit 402, then it stores a predetermined identifier representing that no visited facility is identified (for example, "Facility 0") into the identifier field F3 of the historical data 16b.

As described in the fourth embodiment, the facility corresponding to the user's stay time and date and time of the stay is identifies as the visited facility from several facilities chosen as a candidate using the GPS so that it is possible to identify a user's visited place with high accuracy. Furthermore, the fourth embodiment enables to accurately learn user's behavior patterns using the historical data 16b, because identified visited facilities have been stored as a history in the historical data 16b.

Still further, in the fourth embodiment, in the same manner as described in the third embodiment, the facility information 12c stores categories, not average payment amounts or stay time, so that it is possible to reduce the amount of information stored in the facility information 12c more than that stored in the facility information 12a and 12b in the first and second embodiments respectively in order to effectively use the storage space of the facility database 102C. It is also possible in the fourth embodiment to build the facility information 12c easily.

Figure 19:
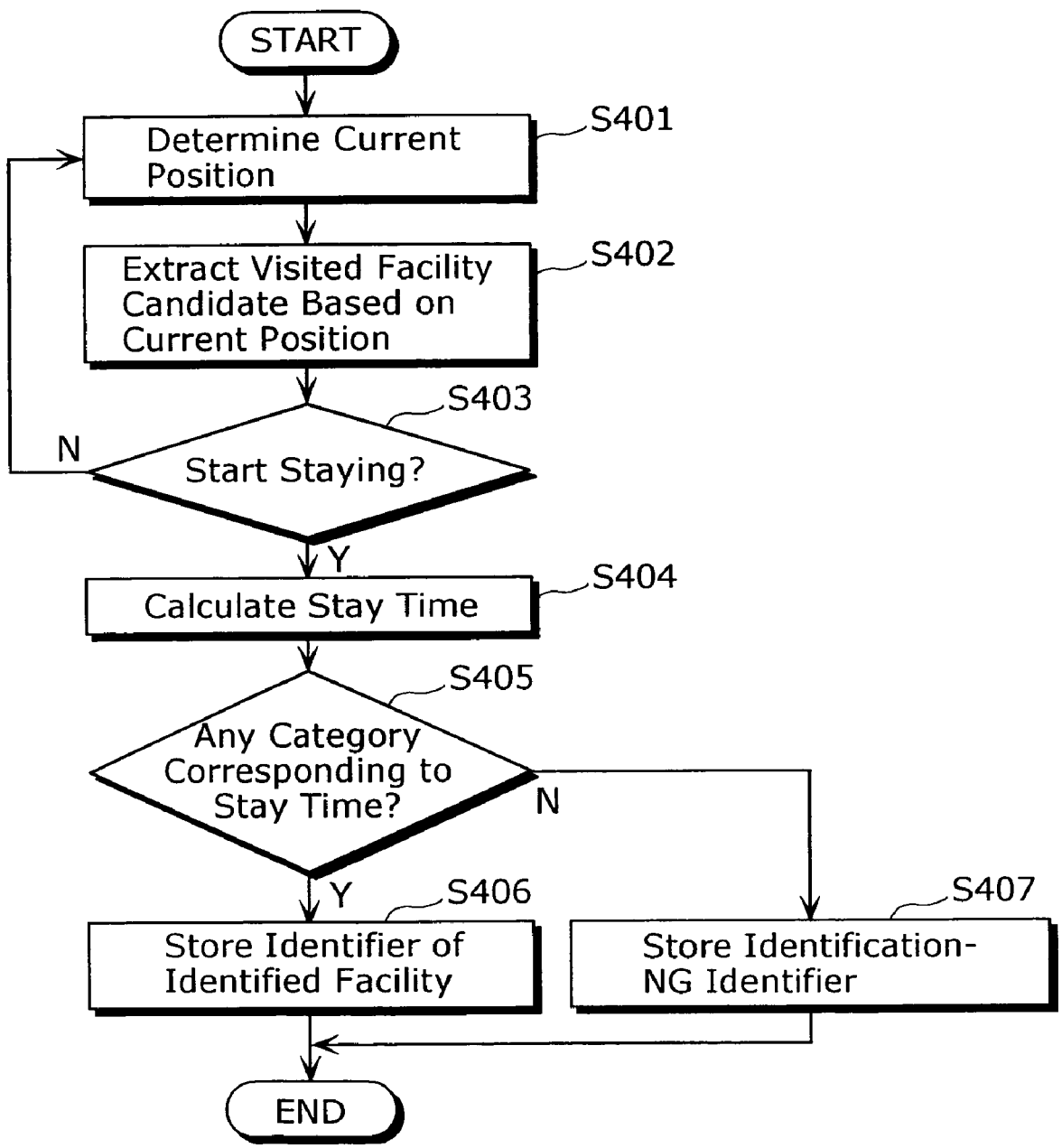
FIG. 19 is a flowchart that depicts steps performed in the visited-place identification apparatus according to the fourth embodiment of the present invention.

The following describes steps performed in the visited-place identification apparatus according to the fourth embodiment with reference to FIG. 19.

FIG. 19 is a flowchart that depicts the steps performed in the visited-place identification apparatus according to the fourth embodiment.

Firstly, the visited-place identification apparatus receives position information from the GPS satellites at predetermined time intervals, and determines a user's current position based on the position information (Step S401).

Next, the visited-place identification apparatus extracts as visited facility candidates, from the facility information 12c in the facility database 102C, facilities that are located within a predetermined area measured from the current position determined at Step S401 as its center (Step S402).

At this stage, the visited-place identification apparatus determines whether or not the user has started staying (Step S403). If the determination is made that the user has started staying (Y at Step S403), then the visited-place identification apparatus further calculates the stay time (Step S404). For example, if a start time and an ending time of the stay are {10:05, 11:05} respectively, then the stay time is calculated as 60 (min)=11:05-10:05. On the other hand, if the determination is made that the user has not started staying (N at step S403), then the visited-place identification apparatus repeats the steps from Step S401.

After calculating the stay time at Step S404, the visited-place identification apparatus compares average stay time corresponding to the stay start time indicated in the category stay information 41d and the calculated stay time, and determines whether or not there is, from those categories in the category stay information 41d, a category whose average stay time is included in a predetermined range of time period calculated using the stay time (Step S405).

At Step 405, if the determination is made that there is a category whose average stay time is included in a predetermined range of time period calculated using the stay time (Y at Step S405), then the visited-place identification apparatus identifies from the facilities extracted at Step S402 the facility as a user's visited facility, and stores an identifier of the facility in association with the stay start time and the stay time (Step S406).

On the other hand, if the determination is made that there is no facility whose stay time is included in a predetermined range of time period calculated using the stay time at Step S405 (N at Step S405), then the visited-place identification apparatus stores a predetermined identifier, for example "Facility 0", representing that no visited facility is identified, in association with the stay start time and the stay time (Step S407).

Fifth Embodiment

The first and third embodiments identify the most-likely visited facility using the user's payment amounts, while the second and fourth embodiments identify the most-likely visited facility using the user's stay time.

The following fifth embodiment identifies the most-likely visited facility using user's travel distance or travel direction.

More specifically, the visited-place identification apparatus according to the fifth embodiment includes: some components that are embedded on a portable terminal such as a portable telephone or a PDA; and the other components that have a GPS function in a vehicular navigation system equipped in a vehicle. This visited-place identification apparatus detects a travel distance and a travel direction of the portable terminal carried by the user, and utilizes the detected results and position results determined by the GPS function of vehicular navigation system. This means that when the user carries the portable terminal and get out of the vehicle, this visited-place identification apparatus identifies the user's most-likely visited facility based on a position of the vehicle, and a travel distance and a travel direction of the user from the position.

Figure 20:
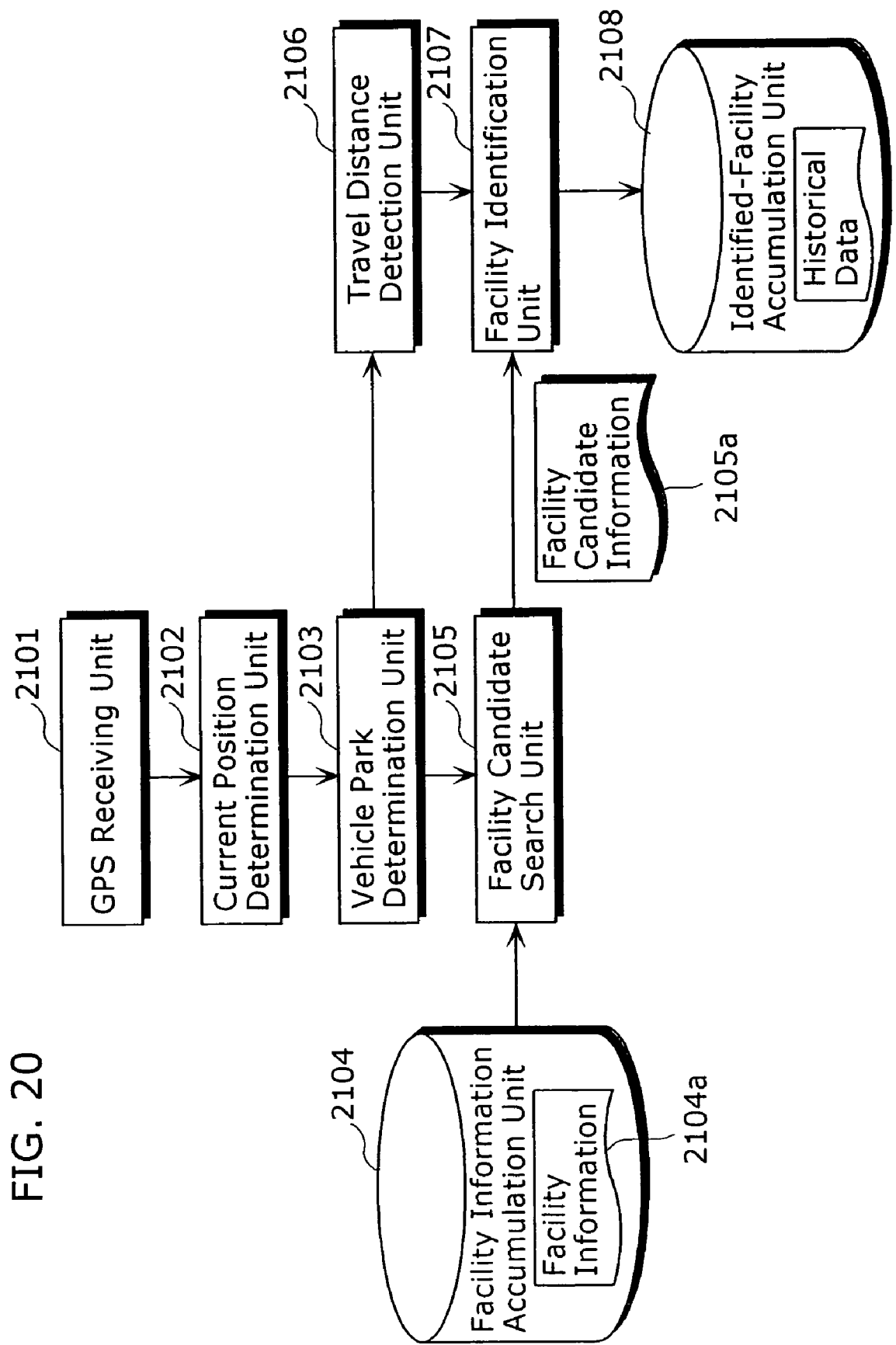
FIG. 20 is a block diagram that depicts a structure of the visited-place identification apparatus according to the fifth embodiment of the present invention.

FIG. 20 is a block diagram that depicts a structure of the visited-place identification apparatus according to the fifth embodiment of the present invention.

The visited-place identification apparatus includes a GPS receiving unit 2101, a current position determination unit 2102, a facility information accumulation unit 2104, a facility candidate search unit 2105, a travel distance detection unit 2106, a vehicle park determination unit 2103, a facility identification unit 2107, and an identified-facility accumulation unit 2108.

The GPS receiving unit 2101 receives position information regarding a current position from the GPS satellites.

The current position determination unit 2102 obtains the position information from the GPS receiving unit 2101, and determines, based on the position information, a vehicle's current position.

The GPS receiving unit 2101 and the current position determination unit 2102 are embedded in the vehicular navigation system equipped with the vehicle.

The vehicle park determination unit 2103 accumulates the current positions determined by the current position determination unit 2102 as a history so that the vehicle park determination unit 2103 determines whether or not the vehicle has been parked, and also determines a position where the vehicle has been parked (a parked position). For example, based on changes in the vehicle's current positions within a predetermined time period, it is possible to determine whether or not the vehicle has been parked. The vehicle park determination unit 2103, however, does not determine that the vehicle has been parked when the vehicle stops to wait at the red light in traffic. The vehicle park determination unit 2103 may determine that the vehicle has been parked, when the user place a vehicle gear in the "Park" position. Moreover, the vehicle park determination unit 2103 may also determine that the vehicle has been parked, when the user shuts off a vehicle engine.

The facility information accumulation unit 2104 accumulates the facility information 2104*a* that is information regarding each facility.

Figure 21:
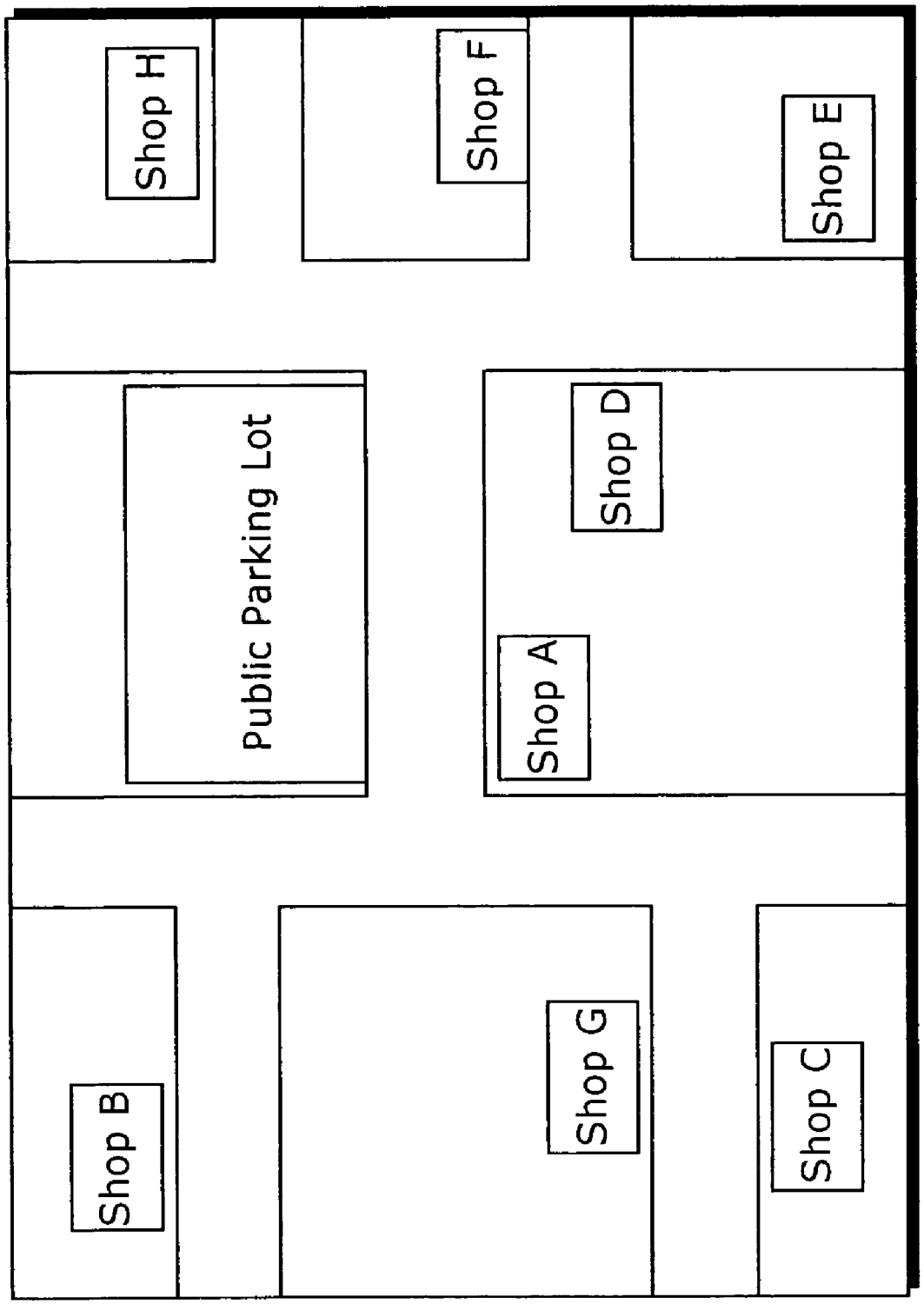
FIG. 21 is a diagram showing a positional relationship among facilities.

FIG. 21 is a diagram showing a positional relationship among facilities.

Referring to FIG. 21, for example, there are some facilities (Shops A to H) in the vicinity of a public parking lot where the vehicle is to be parked.

FIG. 22 is a diagram that depicts details of facility information 2104*a*.

The facility information 2104*a* indicates a name and a location (latitude, longitude) of each facility shown in FIG. 21.

The facility candidate search unit 2105 searches facilities indicated in the facility information 2104*a* of the facility information accumulation unit 2104, as candidates for a user's visited place, for facilities that are located in the vicinity of the parked position determined by the vehicle park determination unit 2103. For example, the facility candidate search unit 2105 searches the facility information 2104*a* for facilities that are located within a circle with 1 km radius measured from the parked position as its center, and notifies the facility identification unit 2107 of the facility candidate information 2105*a* indicating the names and the locations of these facilities.

The travel distance detection unit 2106 begins to measure a user's travel distance when the vehicle park determination unit 2103 detects that the vehicle has been parked. More specifically, the travel distance detection unit 2106 includes 3D gyro so that it can measure the travel distance which the user travels carrying the portable terminal. Also, the travel distance detection unit 2106 may include a pedometer or the like so that it can measure the user's travel distance by counting user's steps.

The facility identification unit 2107 identifies a user's most-likely visited facility from the facility candidates searched by the facility candidate search unit 2105, based on the travel distance detected by the travel distance detection unit 2106. The travel distance detection unit 2106 enables to detect the user's travel distance after the vehicle has been parked. When the user lefts the vehicle and visits a shop, a distance that the user travels to the shop and returns to the vehicle is detected as a travel distance. The facility identification unit 2107 calculates a distance D that is a half of the detected travel distance, and identifies, as a most-likely visited facility, a facility that is located within a circle with radius D measured from the vehicle's parked position as its center. In this case, if the user visits, among the facilities that are located within the circle with radius D measured from the vehicle's parked position, a facility that is the nearest to the vehicle's parked position, the detected travel distance is too long. Therefore, the facility identification unit 2107 identifies, as a most-likely visited facility, a facility that is located within the circle with radius D measured from the vehicle's parked position as its center, and that is the farthest from the vehicle's parked position.

Figure 23:
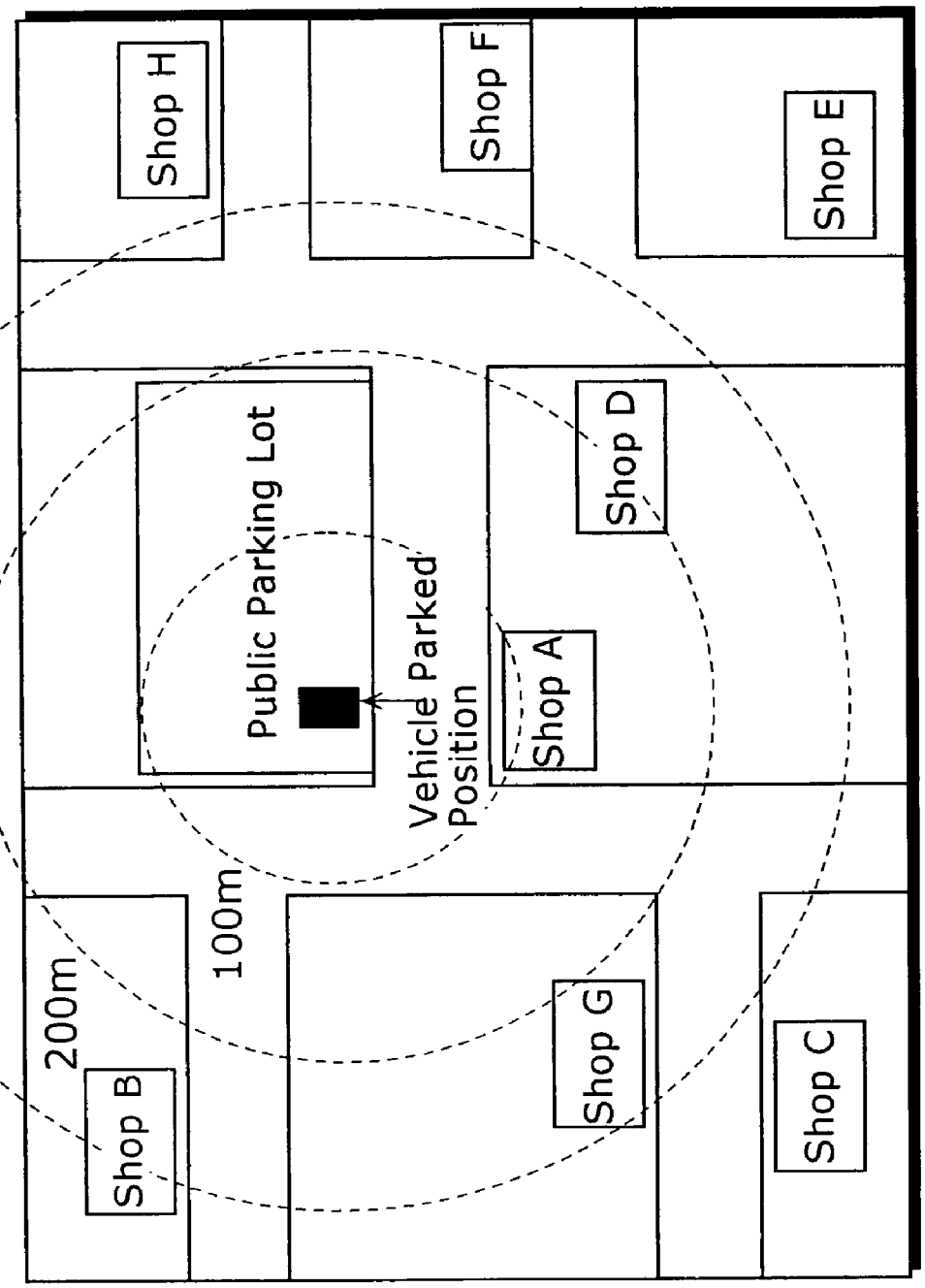
FIG. 23 is an explanatory diagram illustrating an example of methods for identifying a most-likely visited facility by a facility identification unit according to the fifth embodiment of the present invention.

FIG. 23 is an explanatory diagram illustrating an example of methods for identifying a most-likely visited facility by the facility identification unit 2107.

Referring to FIG. 23, for example, when a vehicle's parked position is determined and the radius D is calculated as 200 m, Shop A that is located within a circle with radius 200 m measured from the vehicle's parked position is identified as a most-likely visited facility. When the radius D is calculated as 300 m, Shops D and G are identified as the most-likely visited facilities. In this case, Shop A is not identified as the visited facility. Note that when there are a plurality of facilities that are located within a circle with radius D measured from the parked position and that are also located around the farthest positions from the parked position, the facility identification unit 2107 may notify the user of these shops so that the user can select one of them as the visited facility.

Figure 24:
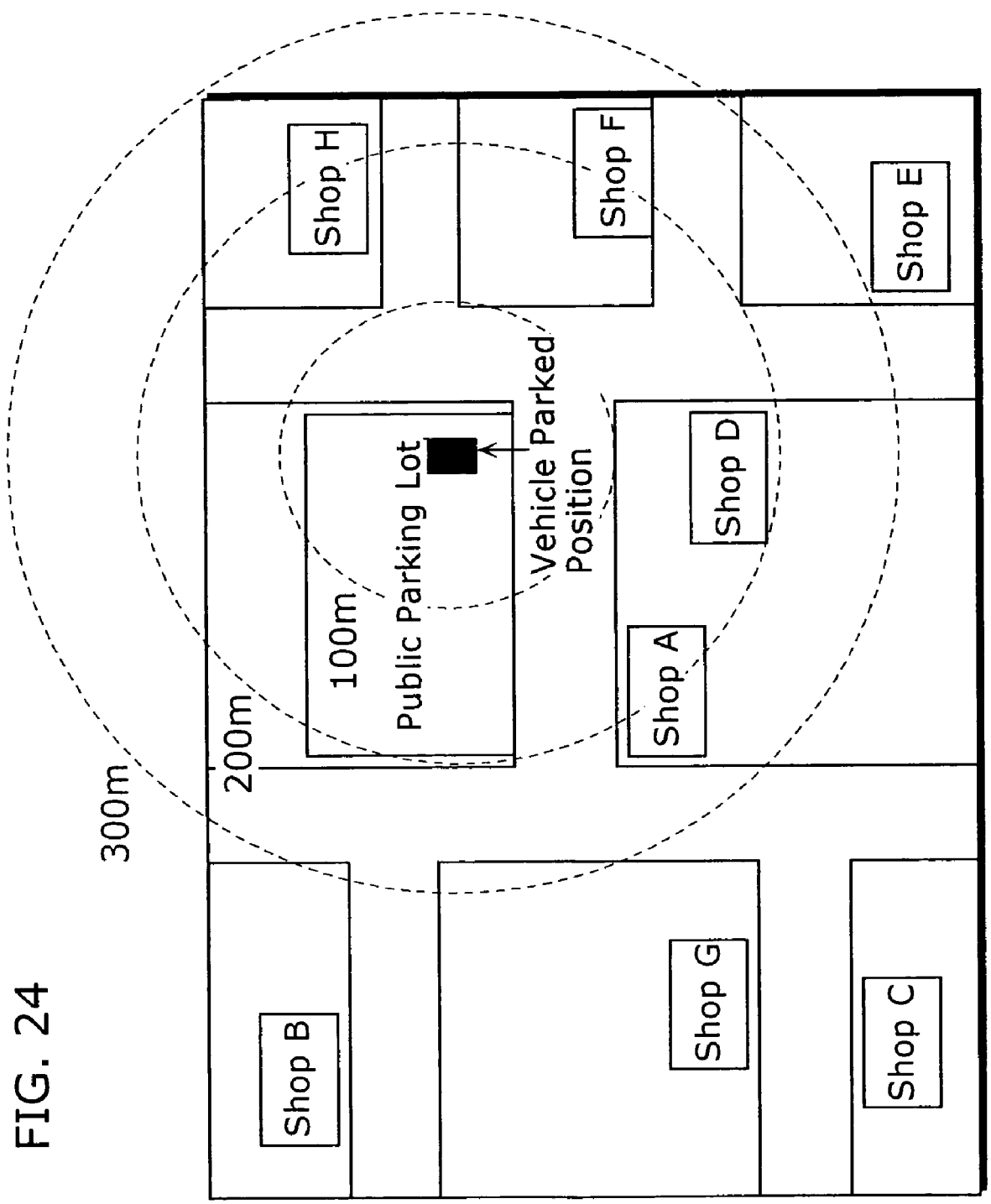
FIG. 24 is an explanatory diagram illustrating another example of methods for identifying the most-likely visited facility by the facility identification unit according to the fifth embodiment of the present invention.

FIG. 24 is an explanatory diagram illustrating another example of methods for identifying a most-likely visited facility by the facility identification unit 2107.

Referring to FIG. 24, even when a vehicle's parked position is different from that shown in FIG. 23, the facility identification unit 2107 identifies a most-likely visited facility based on a user's travel distance measured from the parked position.

Figure 25:
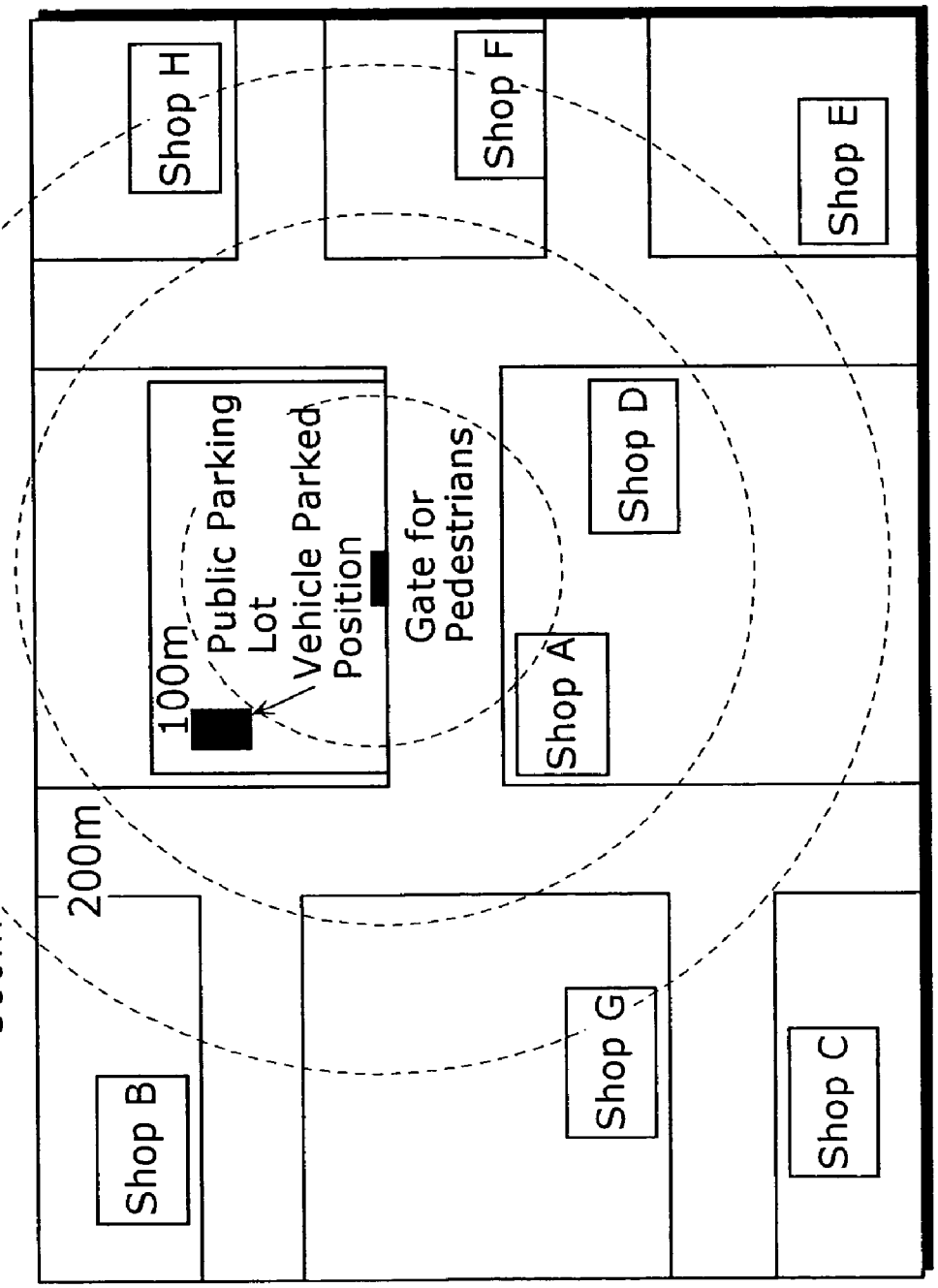
FIG. 25 is an explanatory diagram illustrating a further example of methods for identifying the most-likely visited facility by the facility identification unit according to the fifth embodiment of the present invention.

FIG. 25 is an explanatory diagram illustrating a further example of methods for identifying a most-likely visited facility by the facility identification unit 2107.

Referring to FIG. 25, the facility identification unit 2107 may identify a most-likely visited facility based on a user's travel distance measured from a gate for pedestrians in the parking lot. In this case, the current position determination unit 2102 determines, using map data or the like, the gate for pedestrians in the parking lot as a current position, and notifies the determined results to the facility identification unit 2107.

The identified-facility accumulation unit 2108 accumulates the visited facilities identified by the facility identification unit 2107 as the historical data.

While the fifth embodiment has described that the identified visited facilities are accumulated as a history, the identified visited facilities do not necessarily have to be accumulated as a history. For example, in the case where a most-likely visited facility is identified, it is possible to improve advertising effectiveness regarding the visited facility by providing the user with information regarding the visited facility as advertisement information, when the user returns to the vehicle and starts driving.

Note that when a plurality of shops are identified as most-likely visited facilities, a history recording that the user has visited one of those shops may be accumulated in the identified-facility accumulation unit 2108. In this case, when a user' behavior is presumed and a user's profile is created based on the history accumulated in the identified-facility accumulation unit 2108, it is necessary to consider important that the plurality of facilities which have not been identified as the most-likely visited facility are uncertain elements in the history.

Figure 26:
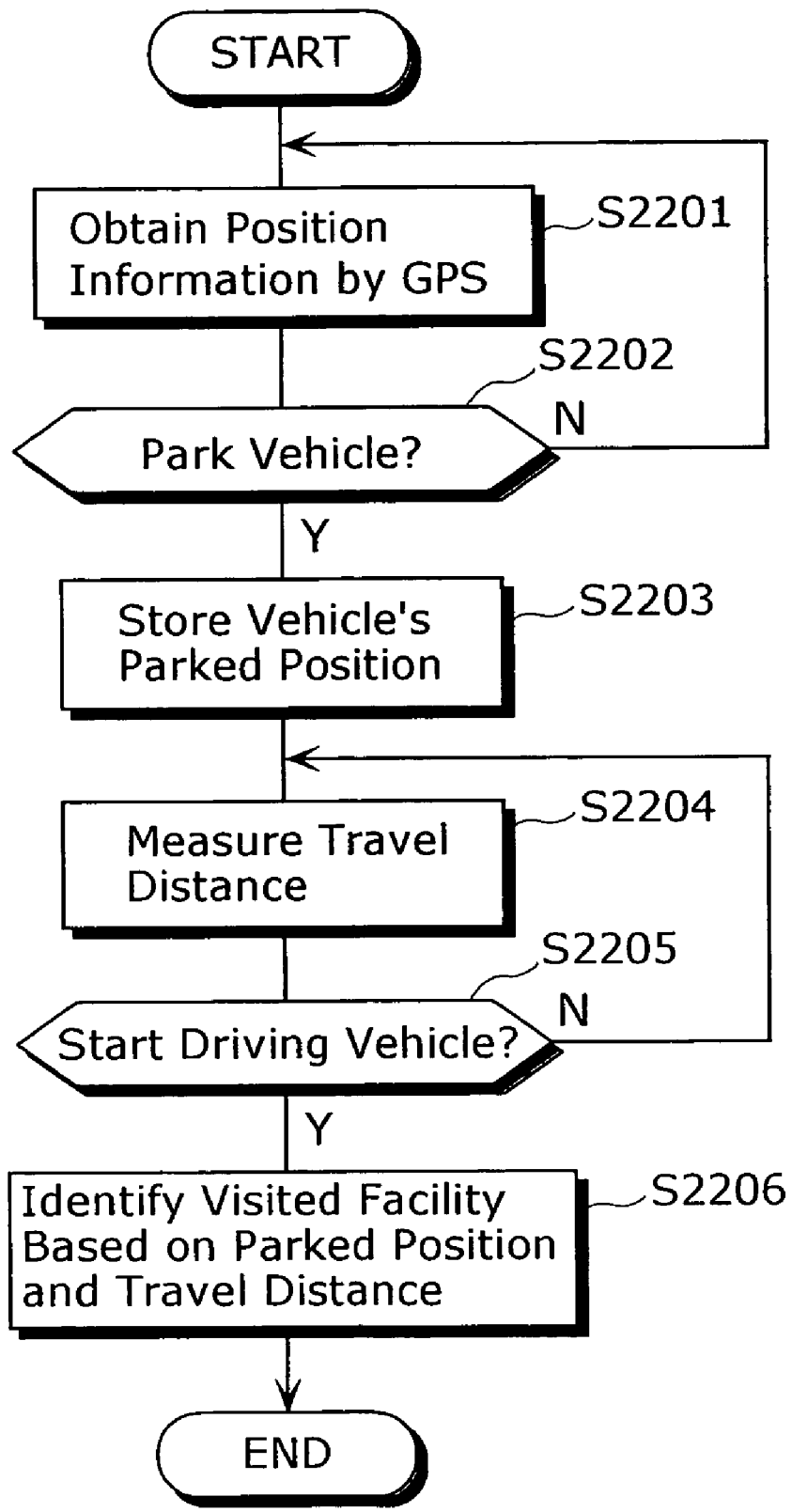
FIG. 26 is a flowchart that depicts steps performed in the visited-place identification apparatus according to the fifth embodiment of the present invention.

The following describes steps performed in the visited-place identification apparatus according to the fifth embodiment with reference to FIG. 26.

FIG. 26 is a flowchart that depicts steps performed in the visited-place identification apparatus according to the fifth embodiment.

Firstly, the visited-place identification apparatus obtains position information using the GPS and determines a vehicle's current position (Step S2201), and then determines whether or not the user has parked the vehicle, based on time-series changes of the current positions (Step S2202).

If the determination is made that the vehicle is not parked (N at Step S2202), then the visited-place identification apparatus repeats Step S2201. If the determination is made that the vehicle has been parked (Y at Step S2202), then the visited-place identification apparatus stores the current position as a vehicle's parked position (Step S2203).

Next, when the user carries a portable terminal and gets out of the vehicle, the visited-place identification apparatus begins to measure a user's travel distance (Step S2204). If the determination is made that the vehicle starts moving (Y at Step S2205), then the visited-place identification apparatus identifies a most-likely visited facility based on the vehicle's parked position and the user's travel distance (Step S2206). On the other hand, if the determination is made that the vehicle is still parked (N at Step S2205), then the visited-place identification apparatus repeats Step S2204.

The above steps enable to identify a user's most-likely visited facility based on the vehicle's parked position and the user's travel distance.

As described above, the fifth embodiment includes: a behavior detection unit that detects the user's travel behavior measured from the position determined by the position determination unit; and a most-likely facility identification unit that selects, from a plurality of facilities, a facility corresponding to the travel behavior detected by the behavior detection unit if the plurality of facilities are specified by the candidate specification unit, and identifies the selected facility as a most-likely visited place. Furthermore, in the fifth embodiment, the behavior detection unit detects a travel distance as the travel behavior of the user, and the most-likely facility identification unit identifies a facility corresponding to the travel distance as the most-likely visited place.

Accordingly, the fifth embodiment enables to identify the facility corresponding to the user's travel distance as the most-likely visited place so that it is possible to identify a user's visited place with high accuracy. Especially when a user's visit destination is far from a position determined by the position determination unit (for example, a vehicle's parked position), it is possible to identify with high accuracy where the user has visited.

(First Variation)

The fifth embodiment identifies the most-likely visited facility based on the user's travel distance measured by the travel distance detection unit 2106 that includes the pedometer, the 3D gyro, or the like.

The following describes the first variation in which the visited-place identification apparatus includes, instead of the travel distance detection unit 2106, a travel direction detection unit, such as an electronic compass, that automatically detects a user's travel direction and identifies the most-likely visited facility based on a vehicle's parked position and the user's travel direction.

Figure 27:
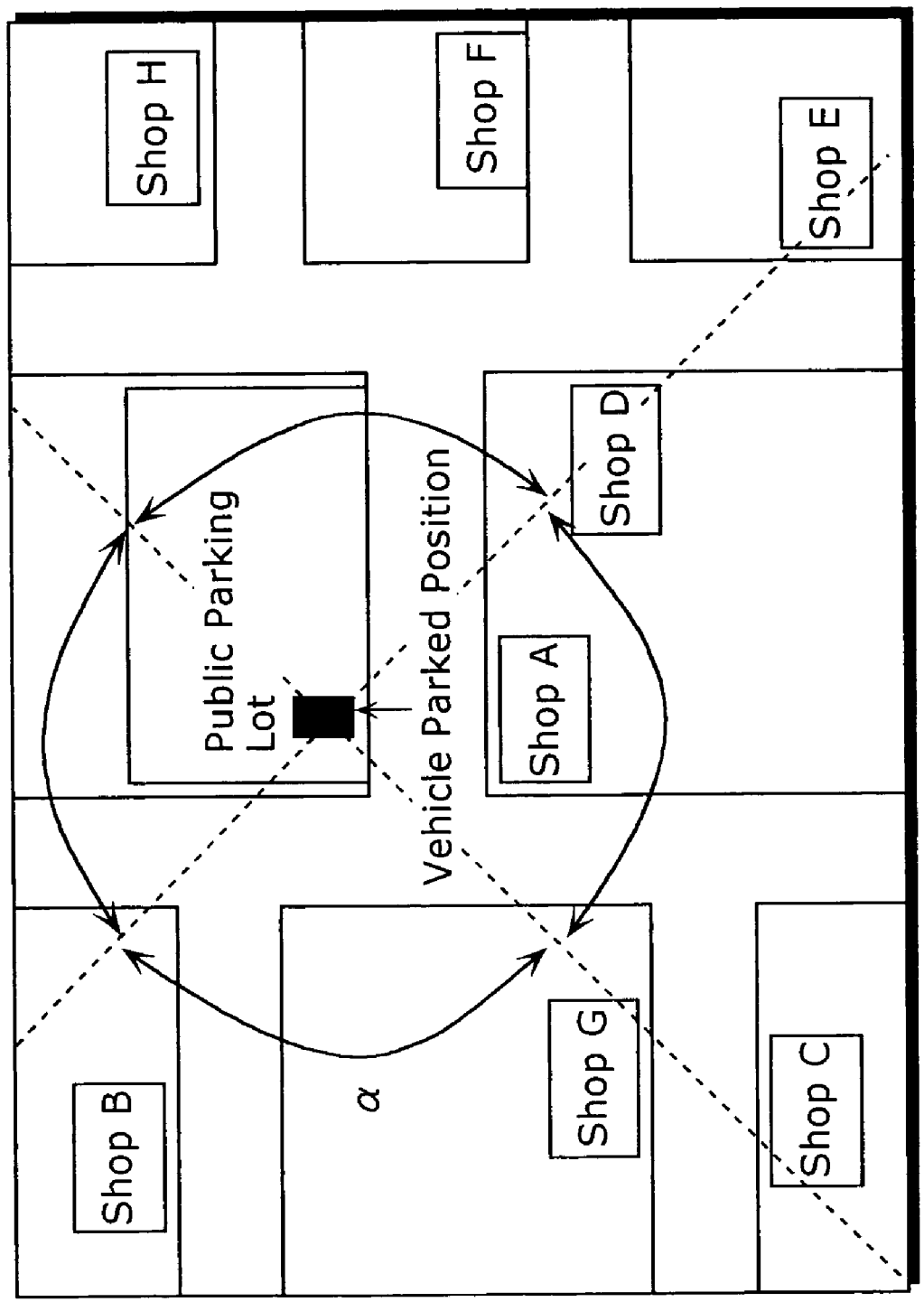
FIG. 27 is an explanatory diagram illustrating an example for identifying a visited facility based on a user's travel direction by the visited-place identification apparatus of the first variation according to the fifth embodiment of the present invention.

FIG. 27 is an explanatory diagram illustrating an example for identifying a visited facility based on the user's travel direction.

Referring to FIG. 27, directions from the vehicle's parked position to Shops A to H are determined by the facility information 2104a shown in FIG. 22. When the travel direction detection unit detects a user's travel direction a, the facility identification unit 2107 identifies Shop B or Shop G as user's most-likely visited facilities.

Note that the visited-place identification apparatus may identify the visited facility based on a user's travel distance and a travel direction.

As described above, the first variation includes: the behavior detection unit that detects a travel direction as the user's travel behavior; and the most-likely facility identification unit that identifies a facility corresponding to the travel direction as a most-likely visited place. Accordingly, the first variation enables to identify a facility corresponding to the user's travel direction as the most-likely visited place so that it is possible to identify with high accuracy a user's visited place.

(Second Variation)

The following describes the second variation in which the visited-place identification apparatus identifies the most-likely visited facility based on a path of a user's travel.

When the user drives a vehicle and then parks it, the visited-place identification apparatus according to the second variation determines a vehicle's parked position based on position information received by the GPS receiving unit 2101, and derives a path of travel starting from the parked position based on the detected results of the travel distance and travel direction of the user. The visited-place identification apparatus identifies a most-likely visited facility based on the path of travel. The travel distance detection unit 2106 according to the second variation detects the travel distance of a portable terminal, using the 3D gyro, the electronic compass, or the like, and derives the path of user's travel.

Figure 28:
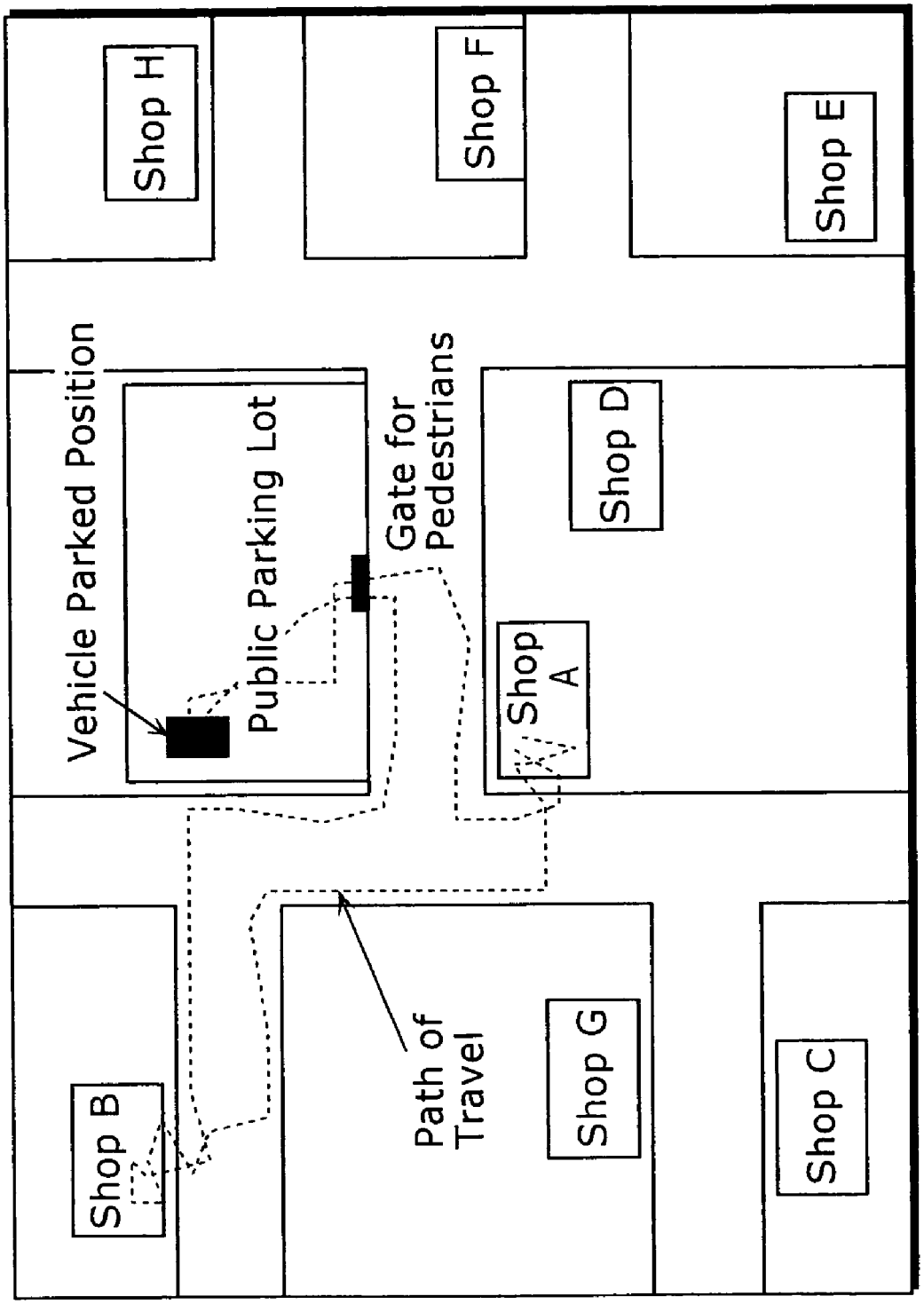
FIG. 28 is an explanatory diagram illustrating an example for identifying the visited facility based on a path of travel by the visited-place identification apparatus of the second variation according to the fifth embodiment of the present invention.

FIG. 28 is an explanatory diagram illustrating an example for identifying a visited facility based on the path of travel.

Referring to FIG. 28, when the user has parked a vehicle and then visits Shop B and A carrying a portable terminal, the visited-place identification apparatus derives a path of user's travel based on the path of travel and the facility information 2104*a*, and determines that Shop B and A are most-likely visited facilities.

Note that the visited-place identification apparatus according to the second variation may notify the user of a message indicating that the user should return to a parking lot.

In this case, the facility information accumulation unit 2104 in the visited-place identification apparatus accumulates estimated time required to get to the public parking lot from each shop.

FIG. 29 is a diagram that depicts details of information of the required time.

Referring to FIG. 29, the required time information 2104*b* stores estimated time required to get to the public parking lot from each shop.

The facility identification unit 2107 in the visited-place identification apparatus obtains parking information that indicates a start time of parking (parking start time), an ending time of parking (parking ending time), and the like, from an apparatus equipped in the parking lot. For example, if the vehicle is parked from the parking start time up to the parking ending time, a parking fee is free, while the parking fee is charged if the vehicle is still parked after the parking ending time.

More specifically, when the facility identification unit 2107 in the visited-place identification apparatus identifies a visiting place based on the path of travel, the facility identification unit 2107 determines whether or not the user should return to the parking lot at a current time, based on required time to return from the visited facility indicated in the required time information 2104*b*, a current time, and a parking ending time.

Figure 30:
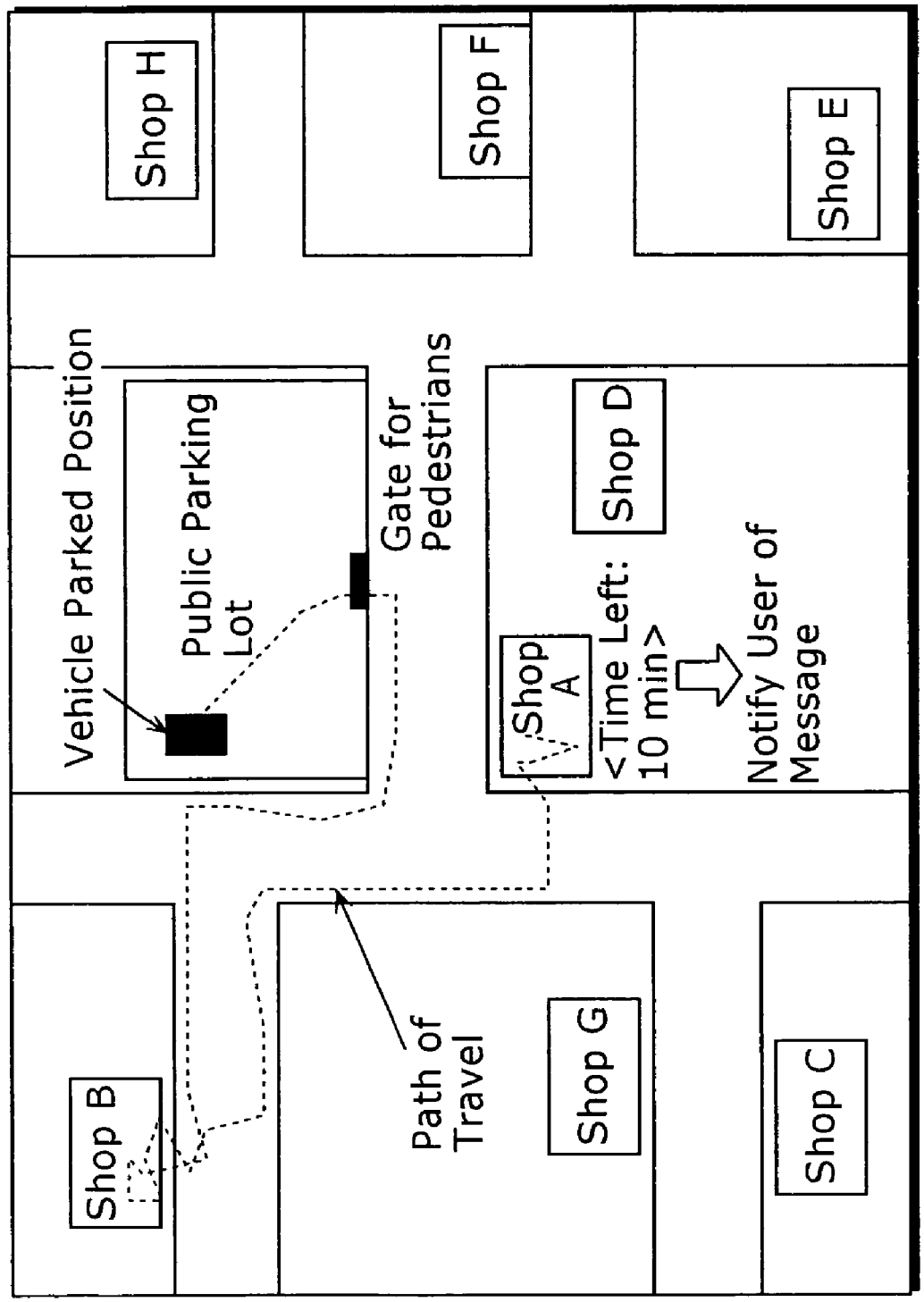
FIG. 30 is an explanatory diagram illustrating an example of a timing when the visited-place identification apparatus notifies the user of a message in the second variation according to the fifth embodiment of the present invention.

FIG. 30 is an explanatory diagram illustrating an example of a timing when the visited-place identification apparatus notifies the user of a message.

Referring to FIG. 30, when the facility identification unit 2107 in the visited-place identification apparatus determines that an user's visited place is Shop A, the facility identification unit 2107 adds estimated time required to get to the parking lot from Shop A (10 minutes) indicated in the required time information 2104*b* to a current time (For example, 15:20), and calculates an arrival schedule time (15:30) for arriving at the parking lot if the user starts returning to the parking lot at the current time. Then the facility identification unit 2107 compares the arrival schedule time with the parking ending time, and if the arrival schedule time matches or is near to the parking ending time, then the facility identification unit 2107 notifies the user of a message indicating that the user should return to the parking lot or the user should pay a parking fee. Furthermore, it is understood from the required time information 2104*b* shown in FIG. 29 that the facility identification unit 2107 notifies such a message earlier to the user who is visiting Shops C, E, or the like.

(Third Variation)

The fifth embodiment, and the first and second variations identify the user's most-likely visited facility, based on the travel distance, the travel direction, and the path of the user's travel after the vehicle has been parked.

The visited-place identification apparatus according to the third variation provides the user with advertisement information regarding an identified visited facility when the user returns to the vehicle and starts its engine. This enables to provide the user with suitable advertisements.

Figure 31:
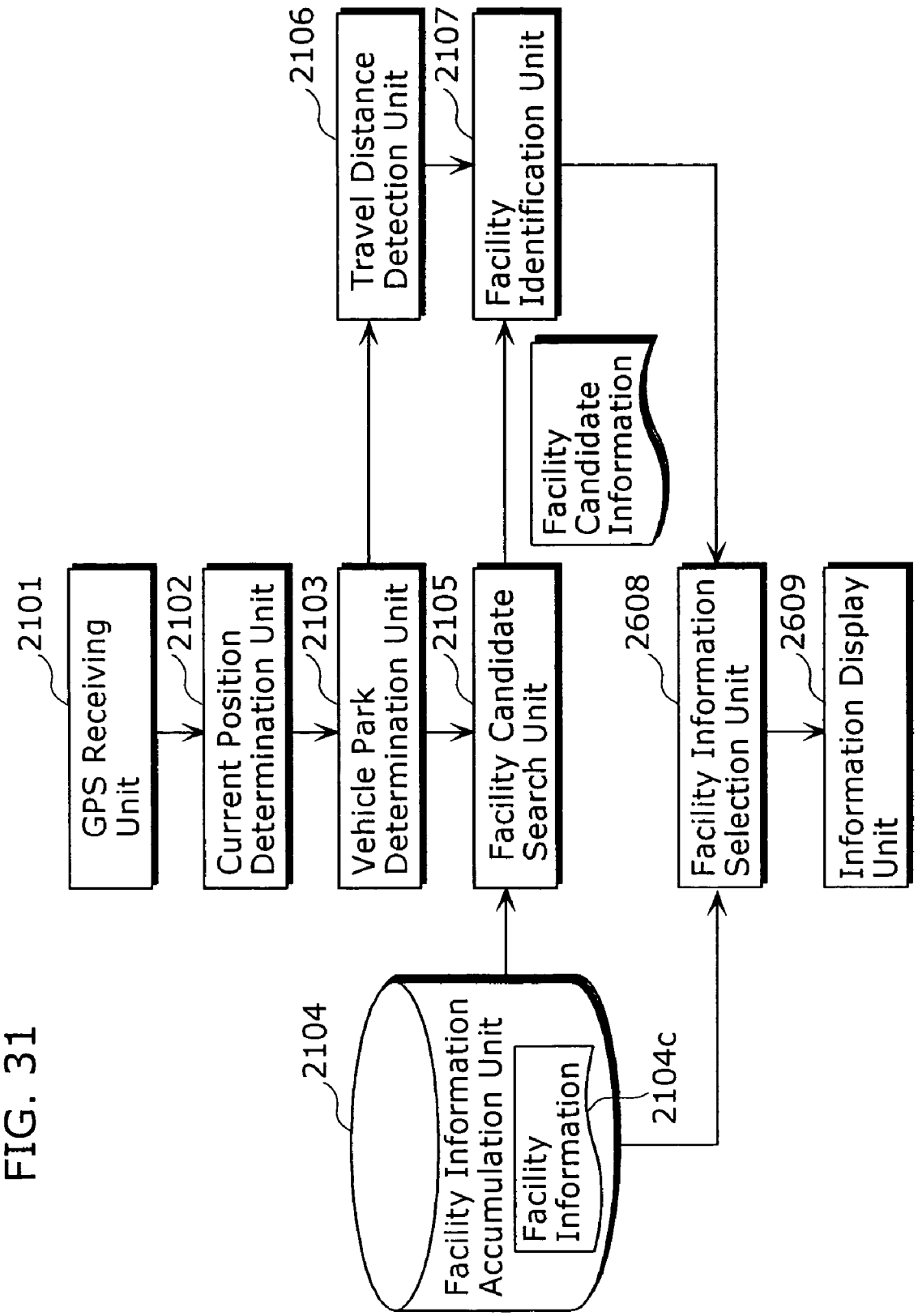
FIG. 31 is a block diagram that depicts a structure of the visited-place identification apparatus in the third variation according to the fifth embodiment of the present invention.

FIG. 31 is a block diagram that depicts a structure of the visited-place identification apparatus according to the third variation.

The visited-place identification apparatus according to the third variation includes a facility information selection unit 2608 and an information display unit 2609 in addition to the components included in the visited-place identification apparatus shown in FIG. 20. The facility information 2104*c* accumulated in the facility information accumulation unit 2104 according to the third variation includes information regarding an advertisement (advertisement information) in addition to the name and the position of a facility to be provided to the user who has visited the facility.

After the facility identification unit 2107 identifies a visited facility, the facility information selection unit 2608 searches the facility information 2104*c* in the facility information accumulation unit 2104 for advertisement information corresponding to the visited facility. If the corresponding advertisement information is found, then the facility information selection unit 2608 extracts the advertisement information from the facility information 2104*c*, and outputs it to the information display unit 2609.

The information display unit 2609 includes a liquid-crystal display or the like that is embedded in a vehicular navigation system in a vehicle or on a portable terminal, and shows the user details of the advertisement information obtained by the facility information selection unit 2608.

Figure 32:
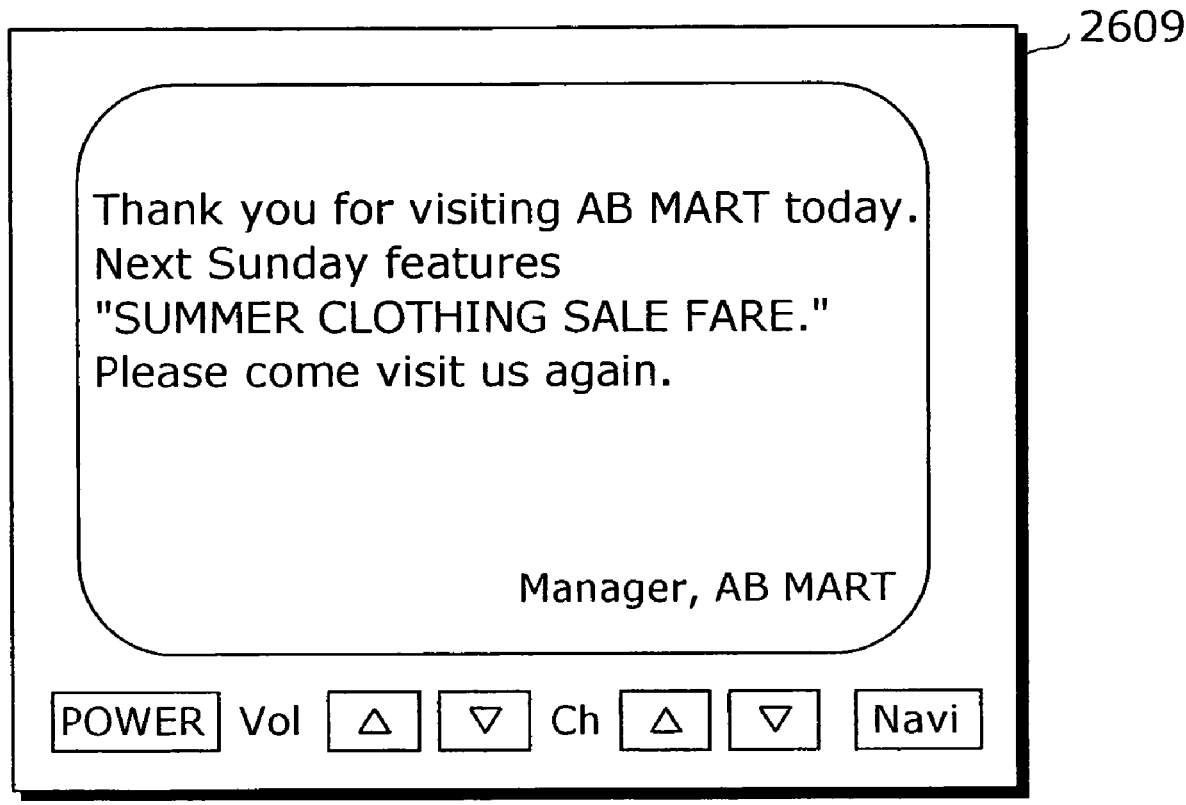
FIG. 32 is a diagram that depicts an example of details of advertisement information displayed by an information display unit in the third variation according to the fifth embodiment of the present invention.

FIG. 32 is a diagram that depicts an example of details of the advertisement information displayed by the information display unit 2609.

For example, when the facility identification unit 2107 identifies AB Mart as a visited facility, the information display unit 2609 provides the user with details of the advertisement information regarding AB Mart as shown in FIG. 32.

As described above, in the third variation, the visited-place identification apparatus includes: an information providing unit that obtains advertisement information regarding a facility identified by a most-likely facility identification unit and that provides the user with the obtained advertisement information. Accordingly, in the third variation, it is possible to provide the user with the advertisement information identified by the most-likely facility identification unit so that the user can browse advertisement information regarding a facility to which the user is interested. Moreover, this enables to improve effect of the advertisement of the facility, because advertisement of the shop which the user has visited is provided even after the user has left the shop so that the user gets familiar with the shop, resulting in increase of a possibility of user's future visits at the facility.

(Fourth Variation)

The fifth embodiment identifies the vehicle's parked position using the position information received by the GPS receiving unit 2101, and searches the vehicle's parked position for the facility candidates that the user can visit.

The visited-place identification apparatus according to the fourth variation obtains parking lot position information that indicates a position of a parking lot, from an apparatus equipped in a gate of the parking lot via a wireless communication medium, and uses the parking lot position indicated in the parking lot position information as the vehicle's parked position.

More specifically, the vehicle park determination unit 2103 according to the fourth variation merely obtains the parking lot position information and uses the position indicated in the parking lot position information instead of the vehicle's parked position, without determining the vehicle's parked position based on the position information received by the GPS receiving unit 2101. Note that when a vehicle engine is stopped after the parking lot position information is obtained, the vehicle park determination unit 2103 determines that the vehicle has been parked.

FIG. 33 is a diagram illustrating how the vehicle park determination unit 2103 according to the fourth variation obtains the parking lot position information.

More specifically, when the vehicle passes through a gate of the parking lot or when the gate opens and then closes, the vehicle park determination unit 2103 obtains the parking lot position information from a transmitter X1 equipped in the gate, and uses a position of the parking lot indicated in the parking lot position information as a vehicle's parked position. The facility candidate search unit 2105 searches facilities indicated in the facility information 2104a in the facility information accumulation unit 2104 for facilities that are located in the vicinity of the vehicle's parked position (the position of the parking lot) as candidates for a user's visited place.

The visited-place identification apparatus may obtain, from the transmitter X1 equipped in the gate, vicinity facility information regarding the facilities that are located in the vicinity of the parking lot in addition to the parking lot position information. The vicinity facility information includes, for example, names, locations and advertisements of the facilities that are located in the vicinity of the parking lot. In this case, the facility candidate search unit 2105 merely obtains the vicinity facility information, and outputs the vicinity facility information as the facility candidate information 2105a to the facility identification unit 2107.

(Fifth Variation)

The following describes the visited-place identification apparatus according to the fifth variation that enables to set proper parking fees in a parking lot.

In general, some public parking lots make contracts with certain shops. For example, some public parking lots make contracts with certain shops to provide the user with free of parking fee, if the user has visited such shops or if the user has paid a predetermined amount of money for purchase at the shops. Therefore, when the visited-place identification apparatus according to the fifth variation identifies such a contracted shop as a visited facility, it sets that a parking fee is not necessary. On the contrary, when the visited-place identification apparatus identifies a shop without such a contract as a visited facility, it sets that the parking fee is charged. The parking fee set as above is notified to a management system for managing the parking lot, and the management system opens a gate to let the vehicle pass through if the parking fee is paid. The determination is made whether or not the user has paid a predetermined amount of money for purchase at the shop, based on, for example, the payment amount calculated by the payment amount calculation unit 104 in the third embodiment, or based on a change in user's belongings identified in the sixth embodiment as described herein later. Furthermore, in the fifth variation, when the user has not paid a predetermined amount of money for purchase at the shop, the user may be notified of that.

Still further, the visited-place identification apparatus according to the fifth variation may set the parking fee according to a travel distance measured from the vehicle's parked position.

In such a case, however, the user would try to leave a portable terminal (an apparatus for measuring the travel distance) in the vehicle and visits a facility without it in order to reduce the parking fee by preventing the apparatus from accurately measuring the travel distance. Therefore, the management system of the parking lot opens a gate for pedestrians only when the system detects the portable terminal, and does not open the gate when the system does not detect the portable terminal.

Figure 34:
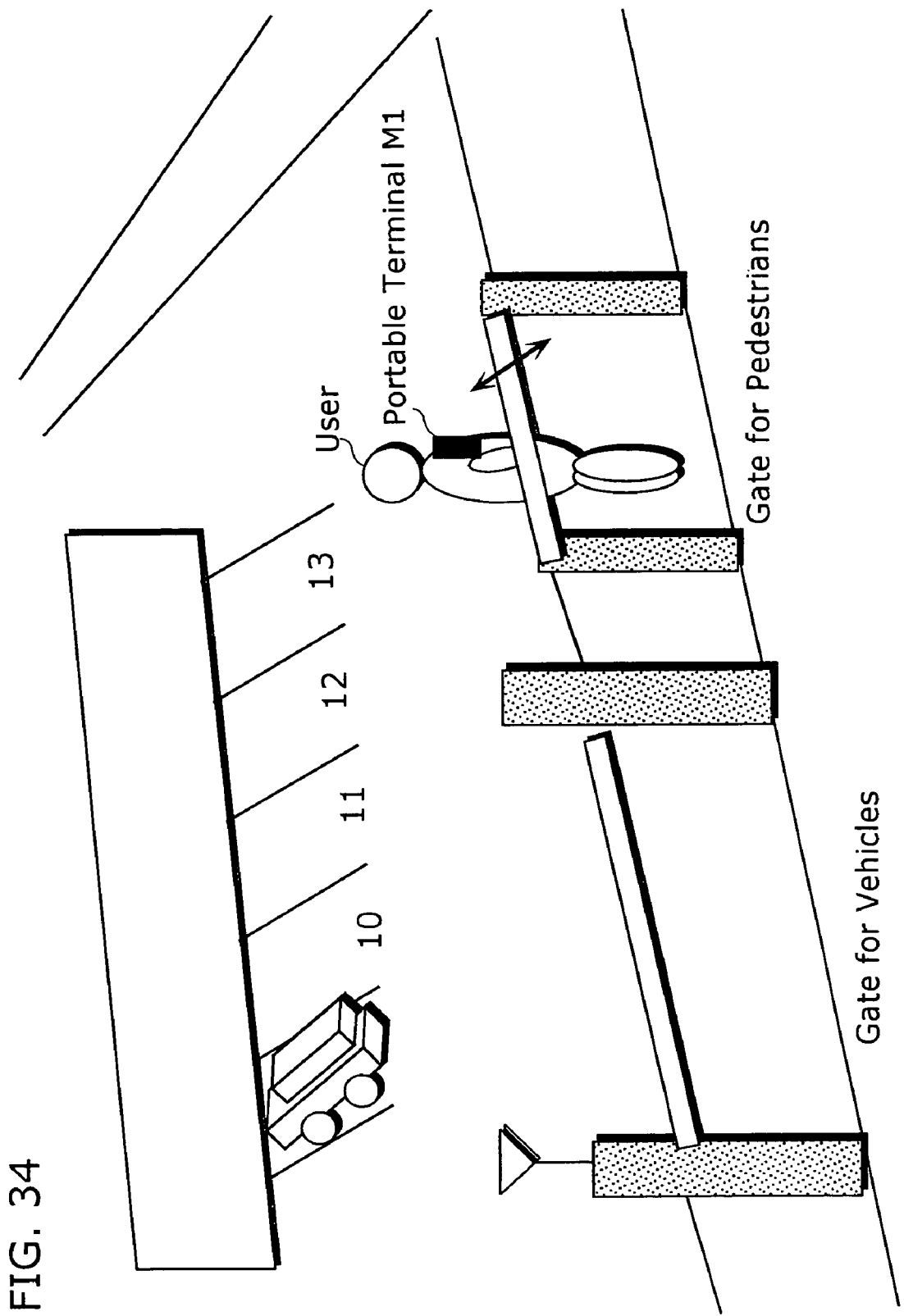
FIG. 34 is an explanatory diagram illustrating a gate that opens and closes depending on an existence of a portable terminal in the fifth variation according to the fifth embodiment of the present invention.

FIG. 34 is an explanatory diagram illustrating the gate that opens and then closes, depending on an existence of the portable terminal.

Referring to FIG. 34, when the user approaches the gate for pedestrians carrying a portable terminal M1, the management system detects the portable terminal M1 and opens the gate. On the other hand, when the user has left the portable terminal M1 in the vehicle and approaches the gate to get out of the parking lot, the management system does not detect the portable terminal M1 and keeps the gate closed. Note that a component, such as the travel distance detection unit 2106 in the visited-place identification apparatus, is embedded in the portable terminal M1.

In the circumstances, the user are expected to visit facilities always carrying the portable terminal M1, which enables to prevent the apparatus from being set with any fraudulent fee.

Furthermore, the visited-place identification apparatus according to the fifth variation may set the parking fee according to an identified visited facility, which enables to set the parking fee properly according to the visited facility, although the parking fee has conventionally been set according to time spent parking. Especially, this enables to distinguish the users parking vehicles for the long time, separating some who stay for visiting beauty salons, special schools for their hobbies, and the like, from the others who stay for other purposes without visiting any facility.

Furthermore, the visited-place identification apparatus according to the fifth variation may set the parking fee according to whether or not the user has visited any one of facilities that are located in the vicinity of the parking lot.

Some parking lots near railway stations provide free of parking fee for the user, for example, if the user has parked a vehicle for less than two hours. Such a parking lot sets the above parking fee system as service for the users who use facilities in the vicinity of the railway station. However, if the parking lot sets the parking fee according only to time spent parking, the parking fee to be charged becomes free even for a user who has parked a vehicle in the parking lot, but travels by a railway, uses facilities in a vicinity of another station, and returns to the parking lot within two hours, without using the facilities in the vicinity of that station.

Therefore, the visited-place identification apparatus according to the fifth variation determines, based on the path of the user's travel after parking of the vehicle, whether or not the user has visited any one of grouped facilities that are located in the vicinity of the parking lot and that make contracts with the parking lot to reduce or remit the user's parking fee. If the determination is made that the user has visited one of the grouped facilities, then the visited-place identification apparatus sets the parking fee reduced or remitted. On the other hand, if the determination is made that the user has not visited any of the grouped facilities, then the visited-place identification apparatus sets the parking fee normally without reducing or remitting it.

This enables the management system near the railway station to reduce or remit parking fees only for users who have parked vehicles for visiting facilities in the vicinity of the station, and to charge proper fees to users who have parked vehicles for other purposes.

Note that, in this case, the visited-place identification apparatus needs to determine only which of the facility groups in the vicinity of the station the user has visited, and not necessarily to identify a visited facility. Therefore, this enables to simplify the structure of the visited-place identification apparatus.

As described above, the visited-place identification apparatus according to the fifth variation includes: a fee calculation unit that calculates a parking fee according to the user's behavior detected by the behavior detection unit, when a position determined by the position determination unit is a parking lot. For example, the behavior detection unit detects the path of user's travel starting from the position determined by the position determination unit, and the fee calculation unit calculates the parking fee according to the path of user's travel detected by the behavior detection unit. Accordingly, the fifth variation enables to calculate the parking fee according to the user's behavior, which is the path of travel, which enables to charge the user a proper parking fee.

Meanwhile, it is possible to have a parking fee calculation system, separating from the visited-place identification apparatus. The parking fee calculation system includes: a vehicle park position determination unit that determines a vehicle's parked position; a behavior detection unit that detects a behavior of the user who uses the vehicle; and a fee calculation unit that calculates a parking fee, based on the behavior starting from the vehicle's parked position detected by the behavior detection unit, when the vehicle's parked position determined by the vehicle park position determination unit is a parking lot. For example, the vehicle park position determination unit is equipped with the vehicle, and the behavior detection unit and the fee calculation unit are embedded in the portable terminal. The parking fee calculated by the fee calculation unit is notified to the management system of the parking lot, and set in the management system.

Accordingly, the parking fee calculation system can calculate a proper parking fee suitable to the user's behavior regardless of time spent parking of the vehicle.

Sixth Embodiment

The fifth embodiment identifies the user's most-likely visited place by receiving the absolute position information using the GPS for the vehicle, and by detecting the relative travel distance using the portable terminal carried by the user, such as the 3D gyro or the pedometer.

The following describes the sixth embodiment in which a visited place is identified based on information accessed from a portable terminal such as a portable telephone.

More specifically, the visited-place identification apparatus according to the sixth embodiment is embedded in the portable terminal, such as a portable telephone or a PDA, that has a communication function, and identifies the user's most-likely visited place by utilizing details of the information accessed by the communication function and a position determined by the GPS.

Figure 35:
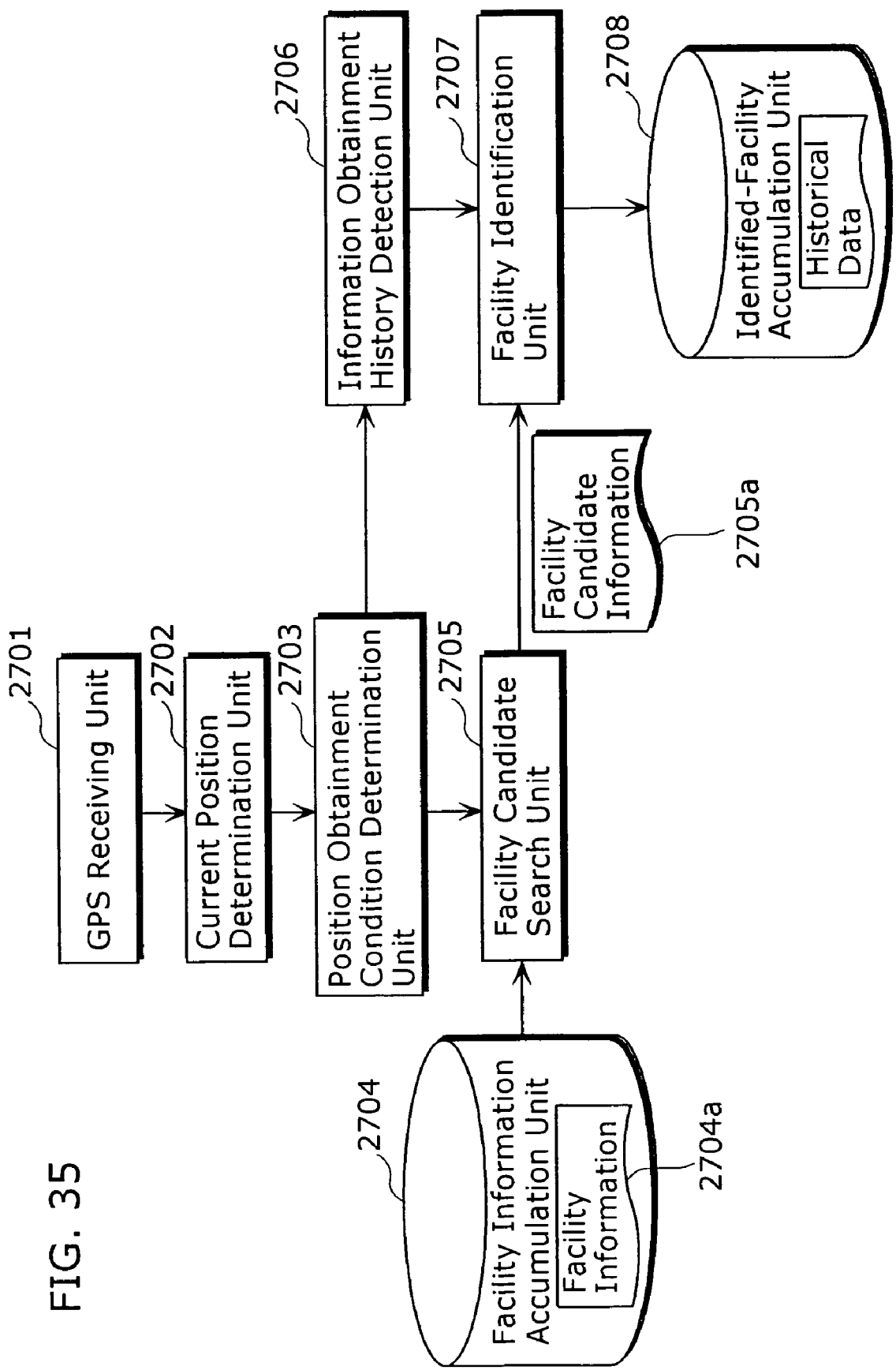
FIG. 35 is a block diagram that depicts a structure of the visited-place identification apparatus according to the sixth embodiment of the present invention.

FIG. 35 is a block diagram that depicts a structure of the visited-place identification apparatus according to the sixth embodiment.

The visited-place identification apparatus includes a GPS receiving unit 2701, a current position determination unit 2702, a facility information accumulation unit 2704, a facility candidate search unit 2705, an information obtainment history detection unit 2706, a position obtainment condition determination unit 2703, a facility identification unit 2707, and an identified-facility accumulation unit 2708.

The GPS receiving unit 2701 receives position information regarding a current position from the GPS satellites.

The current position determination unit 2702 obtains the position information from the GPS receiving unit 2701, and determines, based on the position information, a current position of the visited-place identification apparatus, which is a user's current position.

The GPS receiving unit 2701 and the current position determination unit 2702 are embedded in a portable terminal together with other components.

The position obtainment condition determination unit 2703 determines whether or not the position information has been received by the GPS. This means that if the GPS receiving unit 2701 has not received the position information, consequently the current position determination unit 2702 cannot determine the current position. Therefore, the position obtainment condition determination unit 2703 determines whether or not the current position determination unit 2702 has determined a vehicle's current position based on the position information. If the current position determination unit 2702 has determined the vehicle's current position, in other words, if the position information can be received, then the position obtainment condition determination unit 2703 notifies the facility candidate search unit 2705 of the determined current position. If the current position determination unit 2702 has not determined the vehicle's current position, in other words, if the position information cannot be received, then the position obtainment condition determination unit 2703 notifies the facility candidate search unit 2705 of a current position that was determined last time (hereafter referred to as "latest current position"). If the position information cannot be received, then the position obtainment condition determination unit 2703 notifies the information obtainment history detection unit 2706 that the position information cannot be received.

Figure 36:
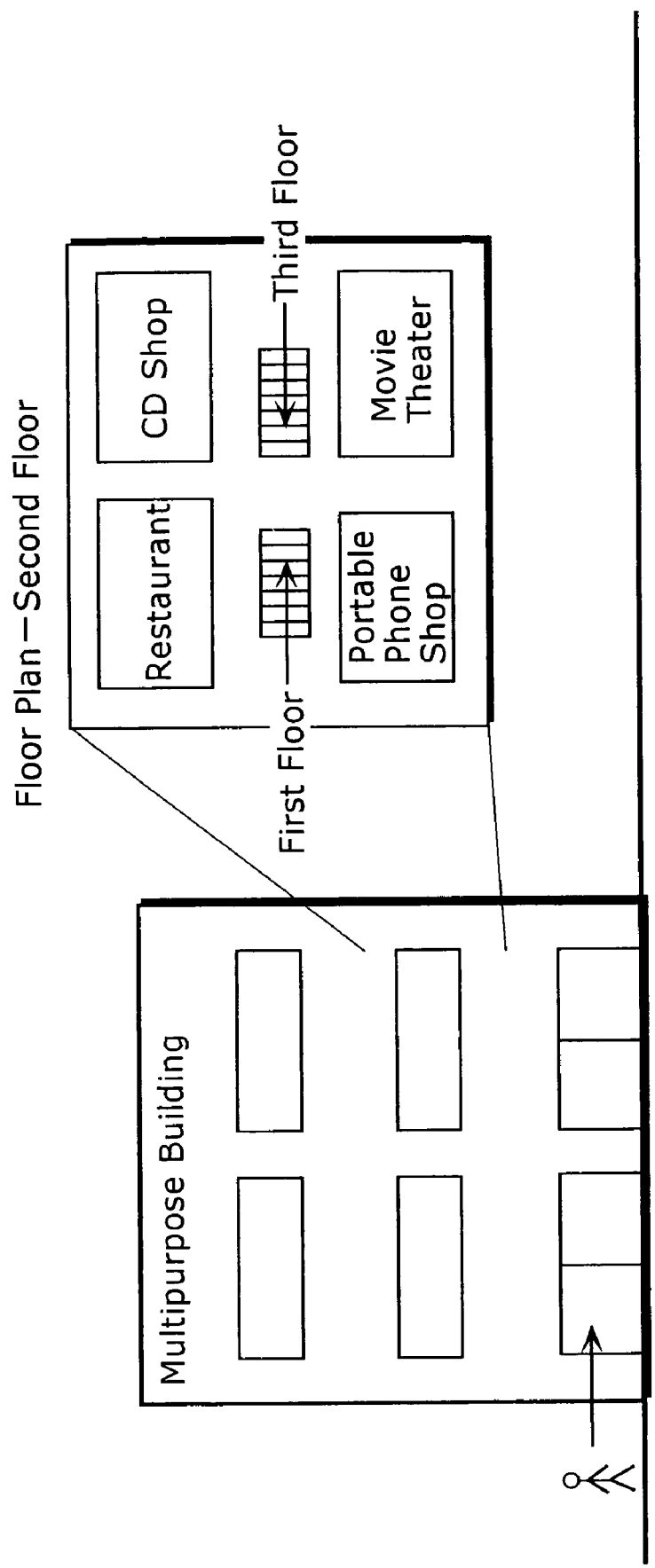
FIG. 36 is an explanatory diagram illustrating how a GPS receiving unit fails to receive position information according to the sixth embodiment of the present invention.

FIG. 36 is an explanatory diagram illustrating how the GPS receiving unit 2701 fails to receive the position information.

Referring to FIG. 36, for example, when the user carrying the portable terminal is out of doors, the GPS receiving unit 2701 receives the position information. As a result, the current position determination unit 2702 determines a user's current position based on the received position information.

However, when the user is in a building such as a multi-tenant building or in an underground shopping center, the GPS receiving unit 2701 cannot receive the position information. As a result, the current position determination unit 2702 cannot determine a user's current position. For example, the multi-tenant building accommodates a plurality of facilities, such as a restaurant and a movie theater, so that it is impossible to identify a user's visited facility. Therefore, the sixth embodiment uses information that the user has accessed via the Internet from the portable terminal and the like.

The facility information accumulation unit 2704 accumulates facility information 2704a that is information regarding each facility.

FIG. 37 is a diagram that depicts details of the facility information 2704a.

The facility information 2704a indicates a name, a location (longitude, latitude), a key word, and a Uniform Resource Locator (URL) of each facility.

When the facility candidate search unit 2705 receives the notice of the current position from the position obtainment condition determination unit 2703, the facility candidate search unit 2705 searches facilities indicated in the facility information 2104a of the facility information accumulation unit 2704 for a facility that is located at the current position or is located the nearest to the current position as a candidate for a user's visited place.

When the facility candidate search unit 2705 receives the notice of the late current position from the position obtainment condition determination unit 2703, the facility candidate search unit 2705 searches facilities indicated in the facility information 2704a of the facility information accumulation unit 2704 for facilities that are located in the vicinity of the late current position as candidates for a user's visited place.

The facility candidate search unit 2705 extracts information (a name, an URL, and the like of the facility) regarding the facility corresponding to the searched results from the facility information 2704a, creates the facility candidate information 2705a, and notifies the facility identification unit 2707 of the facility candidate information 2705a. When the facility candidate information 2705a is notified, the facility candidate search unit 2705 notifies the facility identification unit 2707 whether the facility candidate information 2705a has been created based on the current position or based on the latest current position.

When the information obtainment history detection unit 2706 receives from the position obtainment condition determination unit 2703 the notice indicating that the position information cannot be received, it then obtains information (access information) accessed by the communication function of the portable terminal, and accumulates the access information. For example, as shown in FIG. 36, when the user enters the multi-tenant building, it becomes impossible to receive the position information. Therefore, the information obtainment history detection unit 2706 obtains access information that is accessed after the user enters the building, and accumulates such access information.

The facility identification unit 2707 identifies a user's most-likely visited facility from the facility candidate searched by the facility candidate search unit 2705. More specifically, when the facility identification unit 2707 obtains the facility candidate information 2705a created using the current position, it determines that the facility indicated in the facility candidate information 2705a is the user's most-likely visited facility.

On the other hand, when the facility identification unit 2707 obtains the facility candidate information 2705a created using the latest current position, it obtains the access information accumulated in the information obtainment history detection unit 2706. Then, the facility identification unit 2707 searches the facilities indicated in the facility candidate information 2705a for a facility relating to the access information, and identifies the facility corresponding to the searched results as the user's most-likely visited facility.

For example, after the user enters the multi-tenant building and the position information cannot be received, the user accesses menu information of a restaurant via the Internet by operating the portable terminal, and browses details of the menu information. In this case, the visited-place identification apparatus uses the menu information as the access information, and searches the facilities in the multi-tenant building for a facility relating to the menu information. Then, the visited-place identification apparatus determines that a restaurant corresponding to the searched results is the user's most-likely visited facility. When the user accesses music information, the visited-place identification apparatus determines that a CD shop is the user's most-likely visited facility.

The identified-facility accumulation unit 2708 accumulates the visited facility identified by the facility identification unit 2707 as historical data.

As described above, the sixth embodiment enables to identify, as the user's most-likely visited facility, a facility that is located at the current position or is located the nearest to the current position when the current position can be determined by the GPS. Even if the current position cannot be determined by the GPS, the sixth embodiment enables to identify the user's most-likely visited facility based on the access information and the current position that was determined last time.

Figure 38:
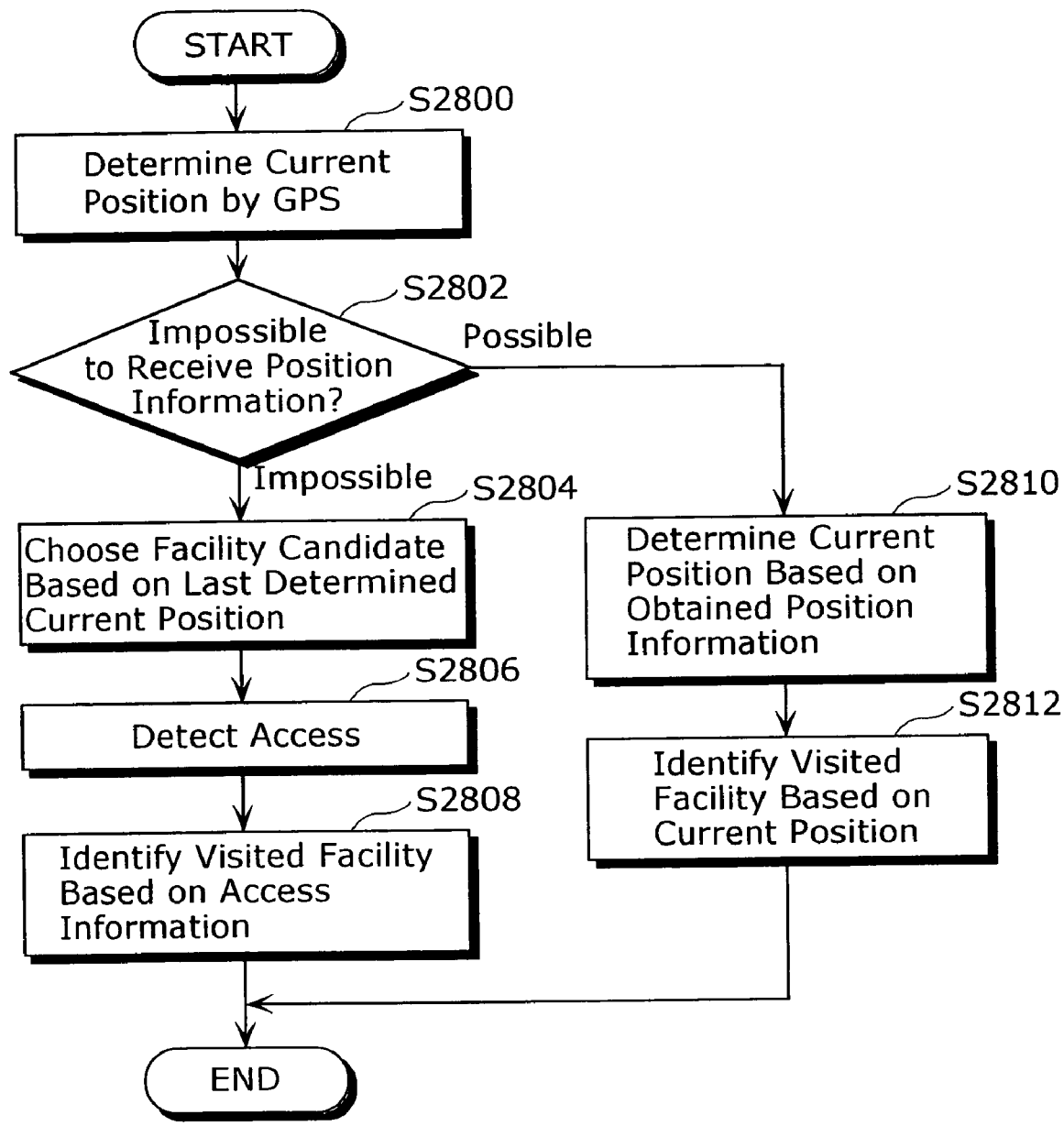
FIG. 38 is a flowchart that depicts steps performed in the visited-place identification apparatus according to the sixth embodiment of the present invention.

The following describes steps performed in the sixth embodiment with reference to FIG. 38.

FIG. 38 is a flowchart that depicts the steps performed in the visited-place identification apparatus according to the sixth embodiment.

Firstly, the visited-place identification apparatus receives position information using the GPS, and determines a user's current position (Step S2800).

Next, the visited-place identification apparatus determines whether or not it is impossible to obtain the position information (Step S2802). If the determination is made that it is impossible to obtain the position information (Impossible at Step S2802), then the visited-place identification apparatus searches for a facility candidate based on a current position that was determined last time (latest current position), which is the current position determined at Step 2800 (Step S2804).

Note that when the visited-place identification apparatus detects a user's access to access information via the Internet from the portable terminal (Step S2806), it searches the facility candidates searched at Step S2804 for a facility relating to the access information, and identifies the facility corresponding to the searched results as a user's most-likely visited facility (Step S2808).

On the other hand, If the determination is made that it is possible to obtain the position information at Step S2802 (Possible at Step S2802), then the visited-place identification apparatus receives the position information, and determines a current position in the same manner as Step S2800 (Step S2810). Then, the visited-place identification apparatus identifies a visited facility based on the current position determined at Step S2810 (Step S2812).

Above steps enable to identify a user's visited place based on the latest current position and the access information even if the position information cannot be obtained.

In summary, the sixth embodiment includes: a behavior detection unit that detects browse information browsed by the user; and a most-likely facility identification unit that selects from a plurality of facilities a facility relating to the browse information detected by the behavior detection unit, and that identifies the selected facility as a most-likely visiting place, when the plurality of facilities are specified by the candidate specification unit. Accordingly, the sixth embodiment enables to identify the facility relating to the browse information in which the user is interested as a visiting place so that it is possible to identify with high accuracy a user's most-likely visited place, especially when the user is in a building or in an underground shopping center.

While the sixth embodiment has described that the visited facility is identified using the accumulation of the user's access information, it should be appreciated that it can also be identified using accumulation of changes in user's surrounding temperatures or noises. For example, when the user's surrounding temperature decreases, the visited-place identification apparatus determines that the user's visiting place is a facility where the temperature is adjusted by an air conditioner, or when the user's surrounding noise is large, the visited-place identification apparatus determines that the user's visiting place is a game center or the like.

Furthermore, the sixth embodiment enables to identify a visited place in the same manner as described above, when the user has parked a vehicle in a parking lot in a multi-tenant building.

Moreover, the sixth embodiment also enables to identify a visited place using changes in user's belongings.

Figure 39:
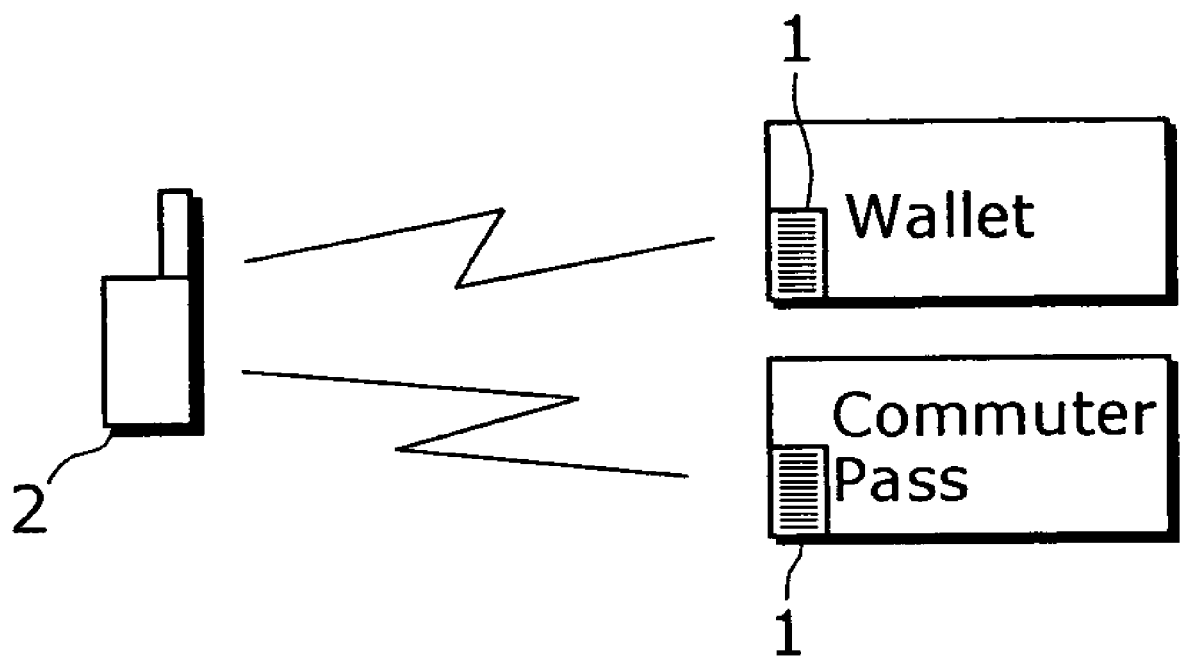
FIG. 39 is a diagram illustrating the visited-place identification apparatus and user's belongings according to the sixth embodiment of the present invention.

FIG. 39 is a diagram illustrating the visited-place identification apparatus and the user's belongings.

Referring to FIG. 39, for example, an IC tag (a RF ID tag) 1 is assigned to each personal belonging of the user, such as a wallet and a commuter pass. The visited-place identification apparatus includes a tag reader for communicating with the IC tag 1, and is embedded in a portable telephone 2.

Such a visited-place identification apparatus can identify a change in the user's belongings based on communication of the tag reader with the IC tag 1.

FIG. 40 is a diagram illustrating an example of a change in the user's belongings.

Referring to FIG. 40, for example, while the position information can be received, the visited-place identification apparatus identifies a wallet, a commuter pass, a music player and a house key as the user's belongings based on communication results of the tag reader with the tag 1. When the position information cannot be obtained, the visited-place identification apparatus detects, based on the communication results of the tag reader with the IC tag 1, that a music CD is added to the user's belongings. As a result, the visited-place identification apparatus determined that the user's visited place is a CD shop because the added belonging is the music CD.

The above example includes: a behavior detection unit that detects a belonging which is added to or deleted from personal belongings carried by the user; and a most-likely facility identification unit that selects from a plurality of facilities a facility corresponding to the belonging detected by the behavior detection unit, and that identifies the selected facility as a most-likely visiting place, when the candidate specification unit specifies the plurality of facilities. Accordingly, the above example enables to identify the most-likely visiting place based on the user's belongings so that it is possible to identify with high accuracy a user's visited place, especially where the user makes some purchases.

While the visited-place identification apparatus according to the present invention has been described in the first to sixth embodiments and the variations, it should be understood that the present invention is not limited only to the description as herein disclosed.

For example, while the first and third embodiments have described that the visited-place identification apparatus includes the electronic money unit 108 and the payment amount calculation unit 104 that detect the payment behavior of the user, and the second and fourth embodiments have described that the visited-place identification apparatus includes the stay determination unit 201 and the stay time calculation unit 202 that detects the stay behavior of the user, but it should be appreciated that the visited-place identification apparatus may include the electronic money unit 108, the payment amount calculation unit 104, the stay determination unit 201, and the stay time calculation unit 202 that detect both payment behavior and stay behavior of the user. In this case, the visited-place identification apparatus selects a facility corresponding to the payment behavior and the stay behavior of the user from the facilities indicated in the facility candidate information, and identifies the facility as a visited facility so that it is possible to identify with high accuracy the visited facility.

This means that the detection of the payment behavior is useful when the visited-place identification apparatus determines a facility such as a kiosk in a railway station and a convenience store where the user usually stays relatively for a short time, while the detection of the stay behavior is useful when the apparatus determines a facility such as a park and a public facility where the user does not make a payment. Therefore, it is possible to improve the accuracy of the identification of the visited facility by detecting and using both payment behavior and stay behavior to overcome their disadvantages each other.

Furthermore, the first to fourth embodiments may include a unit that detects whether the user is in or out of doors to identify a visited facility based on the behavior. For example, the unit obtains weather information indicating the weather and determines the weather. If it is fine, then the unit determines that the user is probably out of doors; while if it is rainy, the unit determines that the user is probably in doors. Then, in the case where a movie theater and a park are specified as candidates for a visited facility, if the user is determined to be in doors, the movie theater is identified as the visited facility. Furthermore, the facility information has been described to store the average payment amounts or the average stay time for the time periods of a day divided into morning, afternoon and night, but it should be appreciated that the facility information may store them according to the weather divided into rainy, cloudy, and fine.

Furthermore, while the first to sixth embodiments have been described to include the facility database or the facility information accumulation unit, it should be appreciated that they may not include the facility database nor the facility information accumulation unit, but the facility candidate search unit may access an external server via a network and search for a facility from facility information stored in the server. Furthermore, in the first to sixth embodiments, the facility database or the facility information accumulation unit stores beforehand the facility information, but it is also possible to download the facility information from the external server via a network, and store the facility information into the facility database or the facility information accumulation unit.

Furthermore, while the third embodiment has been described to include the facility payment amount storage unit 301, and the fourth embodiment has been described to include the facility stay time storage unit 401, but it should be appreciated that, in the same manner as described above for the facility database, the visited-facility identification apparatus may not include the facility payment amount storage unit 301 nor the facility stay time storage unit 401, but may download the category payment amount information 31c and the category stay information 41d from the external server. Needless to say, the above-mentioned server that the visited-facility identification apparatus can access via a network may be added in the components of the visited-facility identification apparatus according to the first to sixth embodiments in order to utilize the server.

Furthermore, while the first to sixth embodiments have described to determine the current position based on the position information obtained from the GPS satellites received by the GPS receiving unit 107, it should be appreciated that the present invention is not limited only to the above but may determine the current position using a RF tag, measurement by a wireless base station, or the like.

Furthermore, while the first and third embodiments have described that the electronic money unit 103 has the function serving as the prepaid card, it should be appreciated that the electronic money unit 103 may not have such a function, but may have a function for learning a remaining amount of money that was deposited beforehand. Furthermore, it is possible to have a unit, instead of the electronic money unit 103 and the payment amount calculation unit 104, for electronically obtaining a payment statement of a credit card, a debit card, or the like and for calculating a user's payment amount using the payment statement. In this case, the payment statement is delivered not upon the user's payment but at a later date so that the facility candidate search unit stores the searched results, and identifies a visited facility from facilities stored in the facility candidate search unit when the payment statement is delivered. Note that the payment statement does not include information for uniquely identifying a facility where the user has made a payment so that the visited-place identification apparatus according to the present invention identifies a visited facility, based on the payment behavior indicated in the payment statement and the positioning result by the GPS.

Furthermore, the electronic money unit 103 may have a function serving as a credit card. In this case, the electronic money unit 103 learns a remaining amount of money in a bank account which the user opened beforehand. Then the payment amount paid by the electronic money unit 103 of the user is withdrawn from the user's bank account in order to be deposited in a bank account of the facility owner.

Furthermore, while the first to fourth embodiments have been described to use the facility information that stores the average payment amounts and the average stay time of the general users, it should be appreciated that the facility information may store the average payment amounts and the average stay time of each user. For example, the facility information stores the average payment amounts and the average stay time of the general users at initialization, and the payment amount calculation unit or the stay time calculation unit updates the stored data according to a use of each user, which enables to identify with high accuracy the user's visited facility. Furthermore, the facility database may store facility information regarding the general users and facility information regarding each user, which enables to improve usability of the user by using the facility information separately.

Furthermore, while the first to sixth embodiments have described that when a visited facility is not identified, the identifier representing that the visited facility is not identified is stored in the historical data, it is also possible to store identifiers of all facilities indicated as candidates in the facility candidate information 13a or to store the most matching facility in the historical data. The structure of details of the historical data may be updatable. In this case, even if the user has made a payment or stayed at a facility, and the visited facility has not been identified, the historical data is updated with a identifier of the visited facility when the facility is identified later.

The visited-place identification apparatus according to the present invention is capable of identifying with high accuracy a user's visited place, and suited for use, for example, as a device embedded in a portable telephone, a vehicular navigation system, and the like which analyzes behavior patterns of the user and provides the user with an information providing service corresponding to the behavior patterns.

The invention claimed is:

1. A visited-place identification apparatus for identifying a visited place of a user, comprising:
   a position determination unit operable to determine a position of the user;
   a candidate specification unit operable to specify, as a candidate for the visited place, at least one facility that is located within a predetermined area including the position determined by said position determination unit;
   a behavior detection unit operable to detect a behavior of the user; and
   a most-likely facility identification unit operable to identify a place most-likely visited by selecting from a plurality of facilities a facility corresponding to the behavior detected by said behavior detection unit, when the plurality of facilities are specified by said candidate specification unit,
   wherein said behavior detection unit is operable to detect a payment amount that the user has paid at the facility, and
   said most-likely facility identification unit is operable to identify the place most-likely visited by selecting from the plurality of facilities a facility corresponding to the payment amount detected by said behavior detection unit, when the plurality of facilities are specified by said candidate specification unit.

2. The visited-place identification apparatus according to claim 1,
   wherein said candidate specification unit comprises:
   a facility information storage unit operable to previously store identification information for identifying the plurality of facilities, facility position information indicating positions of the respective facilities, and payment amount information regarding the payment amounts that are paid at the respective facilities; and
   a candidate extraction unit operable to search the facilities whose information are stored in said facility information storage unit for the facility whose position indicated in the facility position information is within the predetermined area including the position determined by said position determination unit, and to extract the identification information and the payment amount information of the searched facilities, and
   said most-likely facility identification unit is operable to select the identification information of the facility whose payment amount information corresponds to the payment amount detected by said behavior detection unit, when the identification information and the payment amount information regarding a plurality of facilities are extracted by said candidate extraction unit.

3. The visited-place identification apparatus according to claim 1,
   wherein said candidate specification unit comprises:
   a facility information storage unit operable to previously store identification information for identifying the plurality of facilities, facility position information indicating positions of the respective facilities, and categories of the respective facilities; and
   a candidate extraction unit operable to search the facilities whose information are stored in said facility information storage unit for the facility whose position indicated by the facility position information is within a predetermined area including the position determined by said position determination unit, and to extract the identification information and the category of the searched facilities, and
   said most-likely facility identification unit comprises:
   a category storage unit operable to previously store the categories of the plurality of facilities and category payment amount information regarding payment amounts that are paid at facilities belonging to the respective categories;
   a category extraction unit operable to extract, from the categories stored by said category storage unit, a category whose category payment amount information corresponds to the payment amount detected by said behavior detection unit; and a selection unit operable to select the identification information of a facility whose category corresponds to the category extracted by said category extraction unit, when the identification information and the categories of a plurality of facilities are extracted by said candidate extraction unit.

4. A visited-place identification apparatus for identifying a visited place of a user, comprising:
a position determination unit operable to determine a position of the user;
a candidate specification unit operable to specify, as a candidate for the visited place, at least one facility that is located within a predetermined area including the position determined by said position determination unit;
a behavior detection unit operable to detect a behavior of the user; and
a most-likely facility identification unit operable to identify a place most-likely visited by selecting from a plurality of facilities a facility corresponding to the behavior detected by said behavior detection unit, when the plurality of facilities are specified by said candidate specification unit,
wherein said behavior detection unit is operable to detect stay time that is a time period the user spent at a facility, and
said most-likely facility identification unit is operable to select, from the plurality of facilities, a facility corresponding to the stay time detected by said behavior detection unit, when the plurality of facilities are specified by said candidate specification unit.

5. The visited-place identification apparatus according to claim 4,
wherein said candidate specification unit comprises:
a facility information storage unit operable to previously store identification information for identifying the plurality of facilities, facility position information indicating positions of the respective facilities, and stay time information regarding stay time at the respective facilities; and
a candidate extraction unit operable to search the facilities whose information are stored in said facility information storage unit for a facility whose position indicated in the facility position information is within a predetermined area including the position determined by said position determination unit, and to extract the identification information and the stay time information of the searched facilities, and
said most-likely facility identification unit is operable to select the identification information of a facility whose stay time information corresponds to the stay time detected by said behavior detection unit, when the identification information and the stay time information of a plurality of facilities are extracted by said candidate extraction unit.

6. The visited-place identification apparatus according to claim 4,
wherein said candidate specification unit comprises:
a facility information storage unit operable to previously store identification information for identifying the plurality of facilities, facility position information indicating positions of the respective facilities, and categories of the respective facilities; and
a candidate extraction unit operable to search the facilities whose information are stored in said facility information storage unit for a facility whose position indicated in the facility position information is within a predetermined area including the position determined by said position determination unit, and to extract the identification information and the category of the searched facilities, and
said most-likely facility identification unit comprises:
a category storage unit operable to previously store the categories of the plurality of facilities and category stay information regarding stay time at facilities belonging to the respective categories;
a category extraction unit operable to extract, from the categories stored by said category storage unit, a category whose category stay information corresponds to the stay time detected by said behavior detection unit; and
a selection unit operable to select the identification information of a facility whose category corresponds to the category extracted by said category extraction unit, when the identification information and the categories of a plurality of facilities are extracted by said candidate extraction unit.

7. A visited-place identification apparatus for identifying a visited place of a user, comprising:
a position determination unit operable to determine a position of the user;
a candidate specification unit operable to specify, as a candidate for the visited place, at least one facility that is located within a predetermined area including the position determined by said position determination unit;
a behavior detection unit operable to detect a behavior of the user; and
a most-likely facility identification unit operable to identify a place most-likely visited by selecting from a plurality of facilities a facility corresponding to the behavior detected by said behavior detection unit, when the plurality of facilities are specified by said candidate specification unit,
wherein said behavior detection unit is operable to detect browse information that has been browsed by the user, and
said most-likely facility identification unit is operable to identify the place most-likely visited by selecting from the plurality of facilities a facility corresponding to the browse information detected by said behavior detection unit, when the plurality of facilities are specified by said candidate specification unit.

8. A visited-place identification apparatus for identifying a visited place of a user, comprising:
a position determination unit operable to determine a position of the user;
a candidate specification unit operable to specify, as a candidate for the visited place, at least one facility that is located within a predetermined area including the position determined by said position determination unit;
a behavior detection unit operable to detect a behavior of the user; and
a most-likely facility identification unit operable to identify a place most-likely visited by selecting from a plurality of facilities a facility corresponding to the behavior detected by said behavior detection unit, when the plurality of facilities are specified by said candidate specification unit,
wherein said behavior detection unit is operable to detect a belonging that has been added to or deleted from personal belongings carried by the user, and
said most-likely facility identification unit is operable to identify the place most-likely visited by selecting from the plurality of facilities a facility corresponding to the belonging detected by said behavior detection unit, when the plurality of facilities are specified by said candidate specification unit.

9. A visited-place identification apparatus for identifying a visited place of a user, comprising:
- a position determination unit operable to determine a position of the user;
- a candidate specification unit operable to specify, as a candidate for the visited place, at least one facility that is located within a predetermined area including the position determined by said position determination unit;
- a behavior detection unit operable to detect behavior of the user;
- a most-likely facility identification unit operable to identify a place most-likely visited by selecting from a plurality of facilities a facility corresponding to the behavior detected by said behavior detection unit, when the plurality of facilities are specified by said candidate specification unit; and
- a fee calculation unit operable to calculate a parking fee based on the behavior of the user detected by said behavior detection unit, when the position determined by said position determination unit is a parking lot, wherein said behavior detection unit is operable to detect a path of the user's travel, the path starting from the position determined by said position determination unit, and said fee calculation unit is operable to calculate the parking fee based on the path of the user's travel detected by said behavior detection unit.

10. A method for identifying a visited place of a user, comprising:
- determining, using a position determination unit, a position of the user;
- specifying, using a candidate specification unit, as a candidate for the visited place, at least one facility that is located within a predetermined area including the position determined in said determining of the position;
- detecting, using a behavior detection unit, a behavior of the user; and
- identifying, using a most-likely facility identification unit, a facility as a place most-likely visited by selecting from a plurality of facilities a facility corresponding to the behavior detected in said detecting, when a plurality of facilities are specified in said specifying of the candidate, wherein in said detecting, a payment amount that the user has paid at the facility is detected, and in said identifying, the place most-likely visited is identified by selecting, from the plurality of facilities, a facility corresponding to the payment amount detected in said detecting, when the plurality of facilities are specified in said specifying.

11. A program, which is stored on a non-transitory computer-readable storage medium, for identifying a visited place of a user, said program causing a computer to execute:
- determining a position of the user;
- specifying, as a candidate for the visited place, at least one facility that is located within a predetermined area including the position determined in said determining of the position;
- detecting a behavior of the user; and
- identifying a facility as a place most-likely visited by selecting from a plurality of facilities a facility corresponding to the behavior detected in said detecting, when a plurality of facilities are specified in said specifying of the candidate, wherein in said detecting, a payment amount that the user has paid at the facility is detected, and in said identifying, the place most-likely visited is identified by selecting, from the plurality of facilities, a facility corresponding to the payment amount detected in said detecting, when the plurality of facilities are specified in said specifying.

* * * * *